(12) United States Patent
Akiyoshi

(10) Patent No.: US 9,819,578 B2
(45) Date of Patent: Nov. 14, 2017

(54) COMMUNICATION DEVICE AND METHOD IN A COMMUNICATION SYSTEM, AND DEVICE AND METHOD FOR COMMUNICATION PATH CONTROL

(71) Applicant: Ippei Akiyoshi, Tokyo (JP)

(72) Inventor: Ippei Akiyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/468,824

(22) Filed: Aug. 26, 2014

(65) Prior Publication Data

US 2015/0071171 A1    Mar. 12, 2015

Related U.S. Application Data

(60) Provisional application No. 61/870,119, filed on Aug. 26, 2013.

(51) Int. Cl.
*H04W 40/02* (2009.01)
*H04L 12/723* (2013.01)
*H04L 12/931* (2013.01)
*H04L 12/713* (2013.01)
*H04L 12/715* (2013.01)

(52) U.S. Cl.
CPC ............ *H04L 45/50* (2013.01); *H04L 45/586* (2013.01); *H04L 45/64* (2013.01); *H04L 49/70* (2013.01)

(58) Field of Classification Search
CPC ...... H04W 40/02; H04W 88/16; H04L 49/70; H04L 45/50; H04L 45/64; H04L 45/586
See application file for complete search history.

(56) References Cited

U.S. PATENT DOCUMENTS

| | | | |
|---|---|---|---|
| 7,515,549 B2 | 4/2009 | Wing et al. |
| 7,936,754 B2 | 5/2011 | Napierala |
| 8,427,956 B1 | 4/2013 | Thai et al. |
| 8,478,902 B1 | 7/2013 | Holland et al. |
| 2005/0100010 A1 | 5/2005 | Jain et al. |

(Continued)

FOREIGN PATENT DOCUMENTS

| | | |
|---|---|---|
| EP | 0 883 265 A2 | 12/1998 |
| EP | 0 940 951 A2 | 9/1999 |

(Continued)

OTHER PUBLICATIONS

3GPP TS 23,401 V12.1.0 "Technical Specification Group Services and System Aspects; General Packet Radio Service (GPRS) enhancement for Evolved Universal Terrestrial Radio Access Network (E-UTRAN) Access".

(Continued)

*Primary Examiner* — Khaled Kassim
*Assistant Examiner* — Zhaohui Yang
(74) *Attorney, Agent, or Firm* — McGinn IP Law Group, PLLC

(57) ABSTRACT

A communication device performs communication over a communication path configured in a network, includes: a communication path identification section that can identify a communication path to which a received packet belongs; and a switching section that can forward the received packet to a network node associated with the communication path to which the received packet belongs, among multiple network nodes that can terminate the communication path.

20 Claims, 56 Drawing Sheets

(56) References Cited

U.S. PATENT DOCUMENTS

| | | |
|---|---|---|
| 2006/0121894 A1* | 6/2006 | Ganesan .................. 455/432.1 |
| 2008/0014961 A1* | 1/2008 | Lipps ................. H04L 65/1016 455/456.1 |
| 2008/0285560 A1 | 11/2008 | Curtis et al. |
| 2009/0003264 A1* | 1/2009 | Sastry ................... H04W 8/12 370/328 |
| 2009/0300605 A1 | 12/2009 | Edwards et al. |
| 2011/0040855 A1 | 2/2011 | Miklos et al. |
| 2011/0212723 A1* | 9/2011 | Kunz ............... H04W 36/0022 455/435.1 |
| 2012/0042084 A1* | 2/2012 | Dutta ................ H04L 65/1016 709/228 |
| 2013/0272253 A1* | 10/2013 | Veenstra ........... H04W 72/0486 370/329 |
| 2014/0169168 A1 | 6/2014 | Jalan et al. |
| 2016/0057050 A1 | 2/2016 | Ostrom et al. |

FOREIGN PATENT DOCUMENTS

| | | |
|---|---|---|
| EP | 1 024 610 A2 | 8/2000 |
| EP | 1 589 705 A2 | 10/2005 |
| JP | 2013-511862 A | 4/2013 |
| WO | WO 2006/038592 A1 | 4/2006 |
| WO | WO 2011/074659 A1 | 6/2011 |
| WO | WO 2011/118575 A1 | 9/2011 |
| WO | WO 2012/144203 A1 | 10/2012 |
| WO | WO 2013/121841 A1 | 8/2013 |

OTHER PUBLICATIONS

International Search Report (ISR) (PCT Form PCT/ISA/210), in PCT/JP2014/004362, dated Oct. 28, 2014.
Shigeaki Maeda, OpenFlow ver1.1 Oyobi ver1.2 no Tsuika Kino to Katsuyorei, Think IT, Feb. 23, 2012, (http://thinkit.co.jp/story/2012/02/23/3388).
International Search Report (ISR) (PCT Form PCT/ISA/210), in PCT/JP2014/004364, dated Oct. 28, 2014.
International Search Report (ISR) (PCT Form PCT/ISA/210), in PCT/JP2014/004363, dated Sep. 30, 2014.
International Search Report (ISR) (PCT Form PCT/ISA/210), in PCT/JP2014/004365, dated Sep. 30, 2014.
NTT Data, OSS Togo Un'yo Kanri Soft 'Hinemos' ga Kaso Network Kanri ni Taio, NTT Data News Release, Jun. 5, 2012.
International Search Report (ISR) (PCT Form PCT/ISA/210), in PCT/JP2014/004366, dated Sep. 30, 2014.
Extended European Search Report dated Apr. 12, 2017.
U.S. Office Action dated May 19, 2017 in U.S. Appl. No. 14/915,082.
U.S. Office Action dated Jun. 28, 2017, in U.S. Appl. No. 14/915,097.

* cited by examiner

SECOND EXEMPLARY EMBODIMENT

FIG. 8

ROUTING INFORMATION DB 50

| COMMUNICATION PATH | ASSOCIATED GATEWAY |
|---|---|
| COMMUNICATION PATH IDENTIFIER: (A) | GATEWAY (a) |
| COMMUNICATION PATH IDENTIFIER: (B) | GATEWAY (b) |
| COMMUNICATION PATH IDENTIFIER: (C) | GATEWAY (c) |
| ... | ... |

FIG. 32

FLOW ENTRY DB 53

| MATCHING RULE | INSTRUCTION |
|---|---|
| COMMUNICATION PATH IDENTIFIER: (A) | FORWARD TO GATEWAY (a) |
| COMMUNICATION PATH IDENTIFIER: (B) | FORWARD TO GATEWAY (b) |
| COMMUNICATION PATH IDENTIFIER: (C) | FORWARD TO GATEWAY (c) |
| ... | ... |

FIG. 35

ROUTING INFORMATION DB (42, 50)

| GROUP ID | COMMUNICATION PATH | | | | | | ASSOCIATED GATEWAY |
|---|---|---|---|---|---|---|---|
| | COMMUNICATION PATH IDENTIFIER: (A) | COMMUNICATION PATH IDENTIFIER: (B) | COMMUNICATION PATH IDENTIFIER: (C) | COMMUNICATION PATH IDENTIFIER: (D) | COMMUNICATION PATH IDENTIFIER: (E) | COMMUNICATION PATH IDENTIFIER: (F) | |
| (1) | | | | | | | GATEWAY (a) |
| (2) | | | | | | | GATEWAY (b) |
| ⋮ | | | | | | | ⋮ |

FIG. 37

ROUTING INFORMATION DB (42, 50)

| COMMUNICATION PATH | ASSOCIATED GATEWAY |
|---|---|
| HIGHER 24 BITS OF COMMUNICATION PATH IDENTIFIER: X | GATEWAY (a) |
| HIGHER 24 BITS OF COMMUNICATION PATH IDENTIFIER: Y | GATEWAY (b) |
| ... | ... |

COMMUNICATION PATH IDENTIFIERS (A)-(C) : HIGHER 24 BITS ARE "X"
COMMUNICATION PATH IDENTIFIERS (D)-(F) : HIGHER 24 BITS ARE "Y"

FIG. 38

FLOW ENTRY DB 46

| MATCHING RULE | INSTRUCTION |
|---|---|
| COMMUNICATION PATH IDENTIFIER: (A) | PROCESSING GROUP ID (1) |
| COMMUNICATION PATH IDENTIFIER: (B) | PROCESSING GROUP ID (1) |
| COMMUNICATION PATH IDENTIFIER: (C) | PROCESSING GROUP ID (1) |
| COMMUNICATION PATH IDENTIFIER: (D) | PROCESSING GROUP ID (2) |
| COMMUNICATION PATH IDENTIFIER: (E) | PROCESSING GROUP ID (2) |
| COMMUNICATION PATH IDENTIFIER: (F) | PROCESSING GROUP ID (2) |
| ... | ... |

GROUP TABLE 46a FOR FLOW ENTRY DB 46

| PROCESSING GROUP ID | INSTRUCTION |
|---|---|
| PROCESSING GROUP ID: (1) | FORWARD TO GATEWAY (a) |
| PROCESSING GROUP ID: (2) | FORWARD TO GATEWAY (b) |
| ... | ... |

FIG. 39

FLOW TABLE 46-1 FOR FLOW ENTRY DB 46

| MATCHING RULE | INSTRUCTION |
|---|---|
| COMMUNICATION PATH IDENTIFIER: (A) | ADD "ID (1)" TO HEADER |
| COMMUNICATION PATH IDENTIFIER: (B) | ADD "ID (1)" TO HEADER |
| COMMUNICATION PATH IDENTIFIER: (C) | ADD "ID (1)" TO HEADER |
| COMMUNICATION PATH IDENTIFIER: (D) | ADD "ID (2)" TO HEADER |
| COMMUNICATION PATH IDENTIFIER: (E) | ADD "ID (2)" TO HEADER |
| COMMUNICATION PATH IDENTIFIER: (F) | ADD "ID (2)" TO HEADER |
| ... | ... |

FLOW TABLE 46-2 FOR FLOW ENTRY DB 46

| MATCHING RULE | INSTRUCTION |
|---|---|
| ID (1) | ● DELETE "ID (1)" FROM HEADER<br>● FORWARD TO GATEWAY (a) |
| ID (2) | ● DELETE "ID (2)" FROM HEADER<br>● FORWARD TO GATEWAY (b) |
| ... | ... |

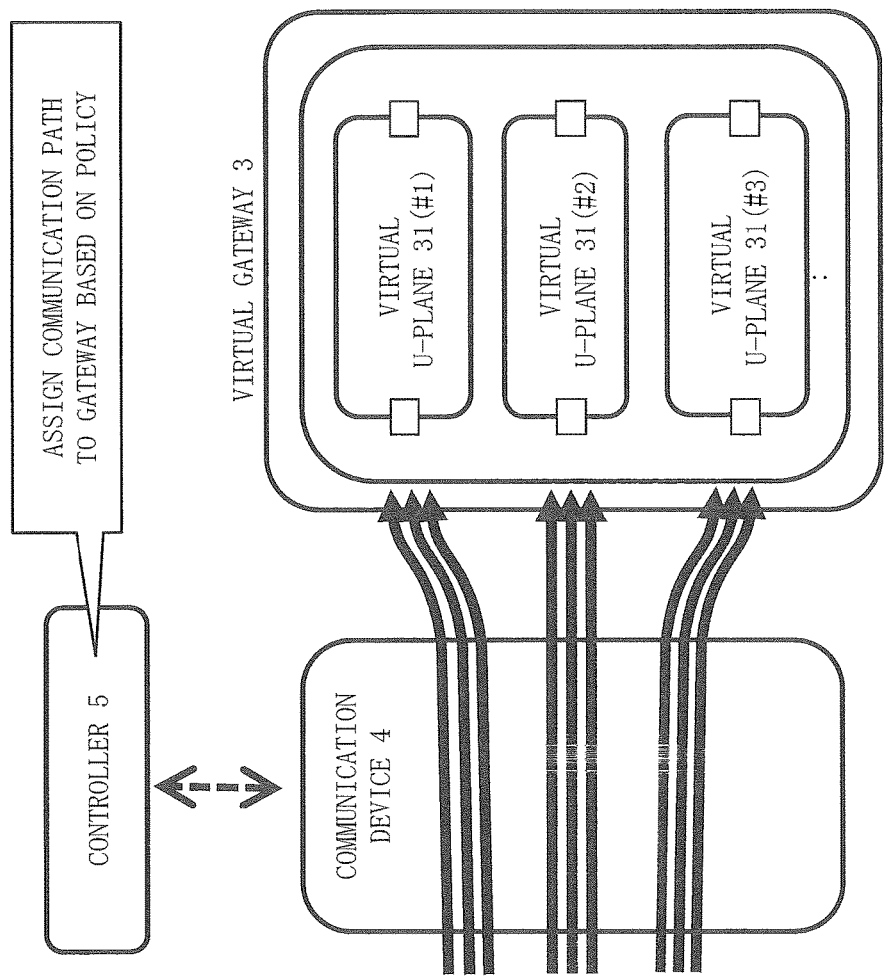

FIG. 42

| POLICY DB 54 | |
|---|---|
| QCI | PRIORITY |
| QCI: 5, 1, 3 | HIGH |
| QCI: 2, 4, 6 | MID |
| QCI: 7, 8, 9 | LOW |

FIG. 44

POLICY DB 54

| COMMUNICATION PATH IDENTIFIER | THRESHOLD |
|---|---|
| COMMUNICATION PATH IDENTIFIER: (A) | COMMUNICATION VOLUME: X (BYTES) |
| COMMUNICATION PATH IDENTIFIER: (B) | COMMUNICATION DURATION: 23H |
| COMMUNICATION PATH IDENTIFIER: (C) | COMMUNICATION DURATION: 3H |
| COMMUNICATION PATH IDENTIFIER: (D) | COMMUNICATION VOLUME: Y (BYTES) |
| ... | ... |

FIG. 46

POLICY DB 54

| COMMUNICATION PATH IDENTIFIER | PRIORITY |
|---|---|
| COMMUNICATION PATH IDENTIFIER: (A) | HIGH |
| COMMUNICATION PATH IDENTIFIER: (B) | LOW |
| COMMUNICATION PATH IDENTIFIER: (C) | MID |
| COMMUNICATION PATH IDENTIFIER: (D) | HIGH |
| ... | ... |

FIG. 52

ROUTING INFORMATION DB 50

| COMMUNICATION PATH | GROUP ID | ASSOCIATED GATEWAY |
|---|---|---|
| COMMUNICATION PATH IDENTIFIER: (A) | QCI: 1 | GATEWAY ID: X |
| COMMUNICATION PATH IDENTIFIER: (B) | | |
| COMMUNICATION PATH IDENTIFIER: (C) | | |
| COMMUNICATION PATH IDENTIFIER: (D) | QCI: 3 | GATEWAY ID: X |
| COMMUNICATION PATH IDENTIFIER: (E) | | |
| COMMUNICATION PATH IDENTIFIER: (F) | | |
| ... | ... | ... |

FIG. 56

ROUTING INFORMATION DB 50

| COMMUNICATION PATH | GROUP ID | ASSOCIATED GATEWAY |
|---|---|---|
| COMMUNICATION PATH IDENTIFIER: (A) | QCI: 1 | GATEWAY ID: X |
| COMMUNICATION PATH IDENTIFIER: (B) | | |
| COMMUNICATION PATH IDENTIFIER: (C) | | |
| COMMUNICATION PATH IDENTIFIER: (D) | QCI: 3 and IDLE | GATEWAY ID: X |
| COMMUNICATION PATH IDENTIFIER: (E) | QCI: 3 and CONNECTED | GATEWAY ID: X |
| COMMUNICATION PATH IDENTIFIER: (F) | | |
| ... | ... | ... |

COMMUNICATION DEVICE AND METHOD IN A COMMUNICATION SYSTEM, AND DEVICE AND METHOD FOR COMMUNICATION PATH CONTROL

BACKGROUND OF THE INVENTION

1. Field of the Invention

The present invention relates to a communication system which performs communication between communication devices via a communication path and, more particularly, to communication path control.

2. Description of the Related Art

In a mobile communication system, a communication terminal such as a mobile telephone communicates with a base station so as to access the Internet via a core network. The communication terminal performs communication over a communication path (e.g., a bearer) established with a device (e.g., a gateway) installed in the core network.

When a communication path is established, a core-network node (e.g., a gateway) for relaying the communication path is assigned to this communication path. A communication path establishment procedure is described in Sub-chapter 5.3.2 of 3GPP TS 23.401 V12.1.0 "Technical Specification Group Services and System Aspects; General Packet Radio Service (GPRS) enhancement for Evolved Universal Terrestrial Radio Access Network (E-UTRAN) Access", [retrieved on Aug. 26, 2013], the Internet <http://www.3gpp.org/ftp/Specs/html-info/23401.htm>.

As described above, a core-network node such as a gateway is assigned to an established communication path. Accordingly, when switching a communication path route, it is expected that a communication path reestablishment procedure is performed to reassign a core-network node to a new communication path. When the communication path reestablishment procedure is performed, it is expected that communication services are affected in various ways, such as, for example, interruption of communication that has been performed over a communication path before switching.

SUMMARY OF THE INVENTION

Accordingly, an object of the present invention is to provide a communication technique and a communication path control technique that can suppress effects on communication services caused when switching a communication path route.

A communication device according to the present invention performs communication over a communication path configured in a network and includes: a first section for identifying the communication path to which a received packet belongs; and a second section for forwarding the received packet to a network node associated with the communication path to which the received packet belongs, among multiple network nodes that can terminate the communication path.

A controller according to the present invention includes: a communication interface with a communication device which performs communication through a communication path configured in a network; a database which stores information on an association between the communication path and a network node which can terminate the communication path; and a control section for notifying the communication device of an instruction for forwarding a received packet to a network node associated with the communication path to which the received packet belongs among a plurality of network nodes based on the information.

A communication method according to the present invention performs communication over a communication path configured in a network and includes: identifying the communication path to which a received packet belongs; and forwarding the received packet to a network node associated with the communication path to which the received packet belongs, among multiple network nodes that can terminate the communication path.

A control method includes: communicating with a communication device through a communication path configured in a network; and notifying the communication device of an instruction for forwarding a received packet to a network node associated with the communication path to which the received packet belongs among a plurality of network nodes based on the information, based on a database which stores information on an association between the communication path and a network node which can terminate the communication path.

According to the present invention, it is possible to suppress effects on communication services caused when switching a communication path, and to provide a technique enabling various communication controls.

BRIEF DESCRIPTION OF THE DRAWINGS

FIG. 8 is a structural diagram showing an example of a routing information DB at the controller according to the second exemplary embodiment of the present invention.

FIG. 32 is a structural diagram showing an example of a flow entry DB at the controller according to the fifth exemplary embodiment of the present invention.

FIG. 35 is a structural diagram showing a first example of a routing information DB at a controller according to the sixth exemplary embodiment of the present invention.

FIG. 37 is a structural diagram showing a third example of the routing information DB at the controller according to the sixth exemplary embodiment of the present invention.

FIG. 38 is a structural diagram showing a fourth example of the routing information DB at the controller according to the sixth exemplary embodiment of the present invention.

FIG. 39 is a structural diagram showing a fifth example of the routing information DB at the controller according to the sixth exemplary embodiment of the present invention.

FIG. 40 is a schematic system architecture diagram for describing a first example of operation of a communication system according to a seventh exemplary embodiment of the present invention.

FIG. 42 is a structural diagram showing an example of a policy DB at the controller according to the seventh exemplary embodiment of the present invention.

FIG. 44 is a structural diagram showing an example of the policy DB at the controller in the communication system shown in FIG. 43.

FIG. 46 is a structural diagram showing an example of the policy DB at the controller in the communication system shown in FIG. 45.

FIG. 52 is a structural diagram showing a first example of a routing information DB at the management device according to the ninth exemplary embodiment of the present invention.

FIG. 56 is a structural diagram showing a third example of the routing information DB at the management device according to the ninth exemplary embodiment of the present invention.

DETAILED DESCRIPTION OF THE PREFERRED EMBODIMENTS

Hereinafter, exemplary embodiments of the present invention will be described. Each exemplary embodiment is for the purpose of illustration rather than to limit the present invention.

1. First Exemplary Embodiment 1.1) System

Hereinafter, an example of a LTE (Long Term Evolution) communication system will be illustrated as a communication system according to the present exemplary embodiment. However, communication systems to which the present invention is applied are not limited to those of LTE. For example, the present invention is also applicable to GPRS (General Packet Radio Service) and UMTS (Universal Mobile Telecommunication System).

Figure 1:
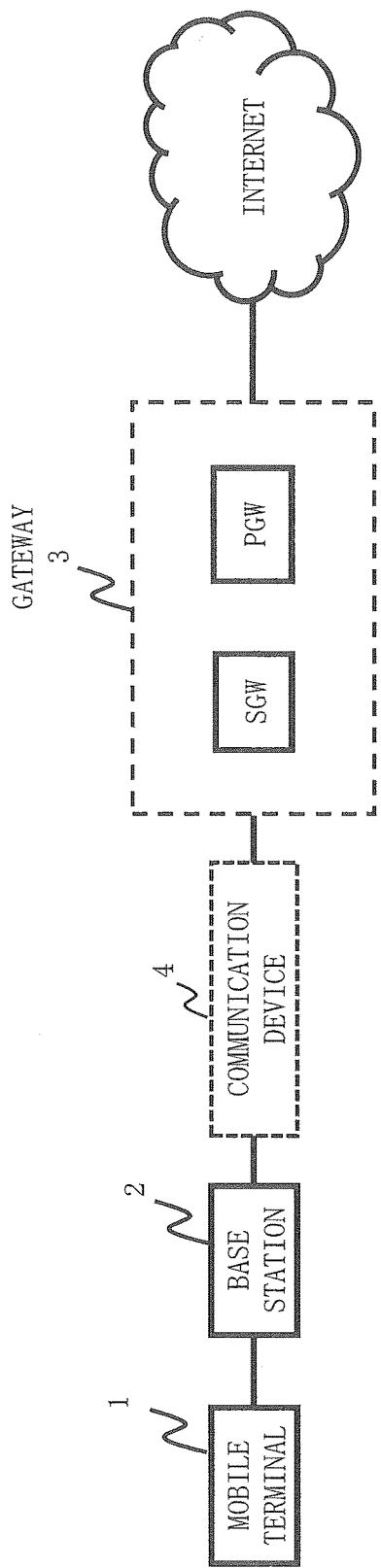
FIG. 1 is a system architecture diagram showing an example of a communication system to which a first exemplary embodiment of the present invention is applied.

Referring to FIG. 1, the communication system according to the present exemplary embodiment includes a mobile terminal 1 such as a mobile telephone, PC (Personal Computer) or mobile router, a base station (eNB) 2, and a gateway 3. The base station 2 provides a radio access function for the mobile terminal 1. The gateway 3 is a network node such as, for example, an S-GW (Serving Gateway) or a P-GW (Packet Data Network Gateway). Note that the gateway 3 may be a SGSN (Serving GPRS Support Node) or GGSN (Gateway GPRS Support Node). The gateway 3 provides, for example, a function of terminating a communication path (e.g., a bearer) configured in a network and a function as a connection point to an external network (e.g., the Internet).

Figure 2:
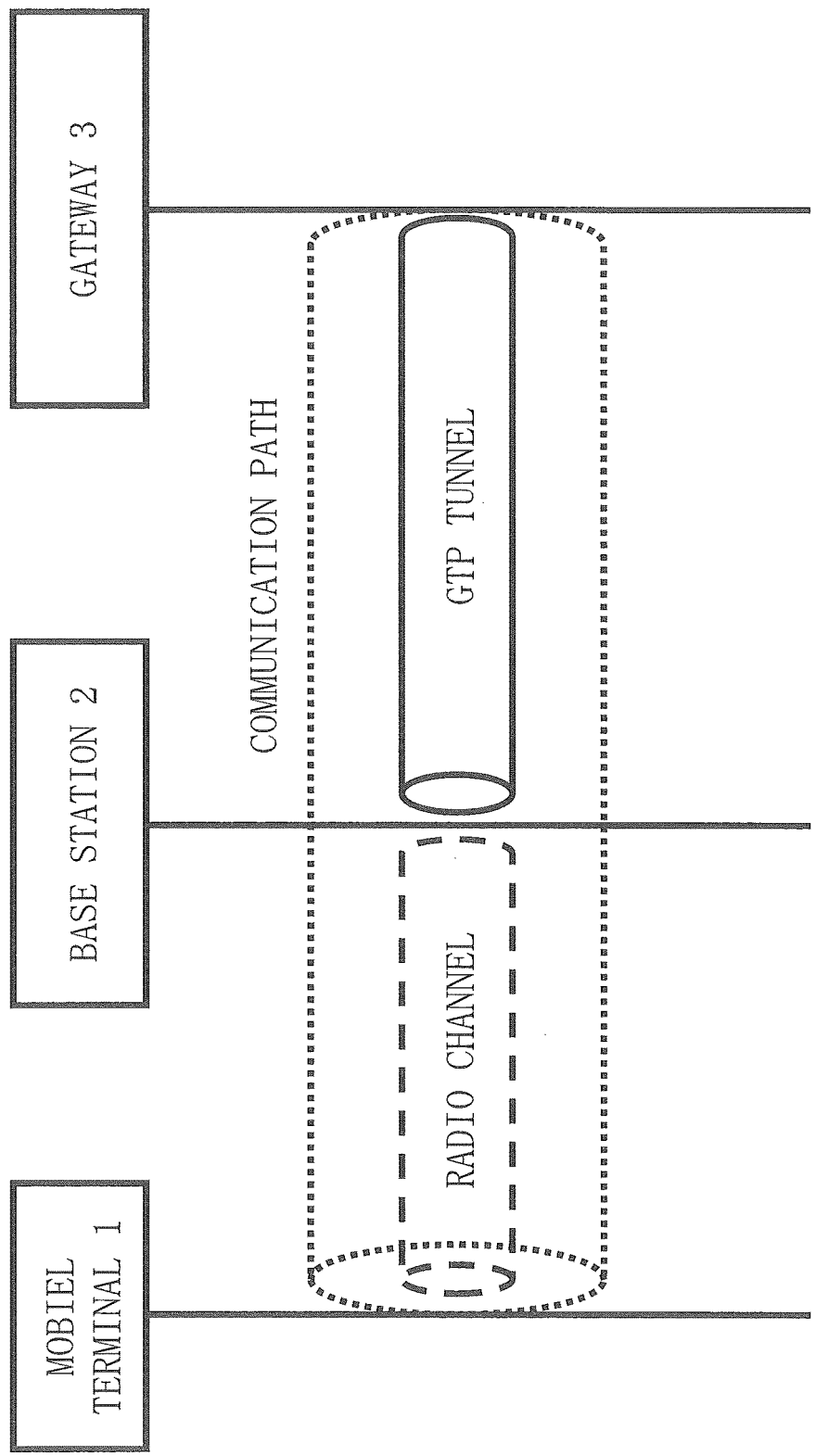
FIG. 2 is a schematic diagram showing an example of a communication path in the communication system shown in FIG. 1.

As shown in FIG. 2, the mobile terminal 1 sends and receives data over a communication path (e.g., a bearer) configured between the mobile terminal 1 and the gateway 3. The communication path is configured with, for example, a radio channel set up between the mobile terminal 1 and the base station and a GTP (GPRS Tunneling Protocol) tunnel with the gateway 3 as its end point.

In the communication system according to the present exemplary embodiment shown in FIG. 1, a communication device 4 is disposed which can switch a communication path route, for example, between the base station 2 and the gateway 3 or between the S-GW and the P-GW. For example, when switching a gateway 3 associated with a communication path, the communication device 4 can switch a packet transfer route so that a packet belonging to the communication path will be routed via a gateway 3 after switching. It is possible to conceal gateway switching from the mobile terminal 1 by the communication device 4 switching a packet transfer route on the course of a communication path route. Accordingly, even if switching is made between gateways 3 associated with before-switching and after-switching communication paths, respectively, the communication system can avoid performing a communication path reestablishment procedure.

1.2) Communication Device

The communication device 4 according to the present exemplary embodiment can switch among multiple gateways. However, to avoid complicating description, a description will be given below of a case, as an example, where switching is performed among three gateways.

Figure 3:
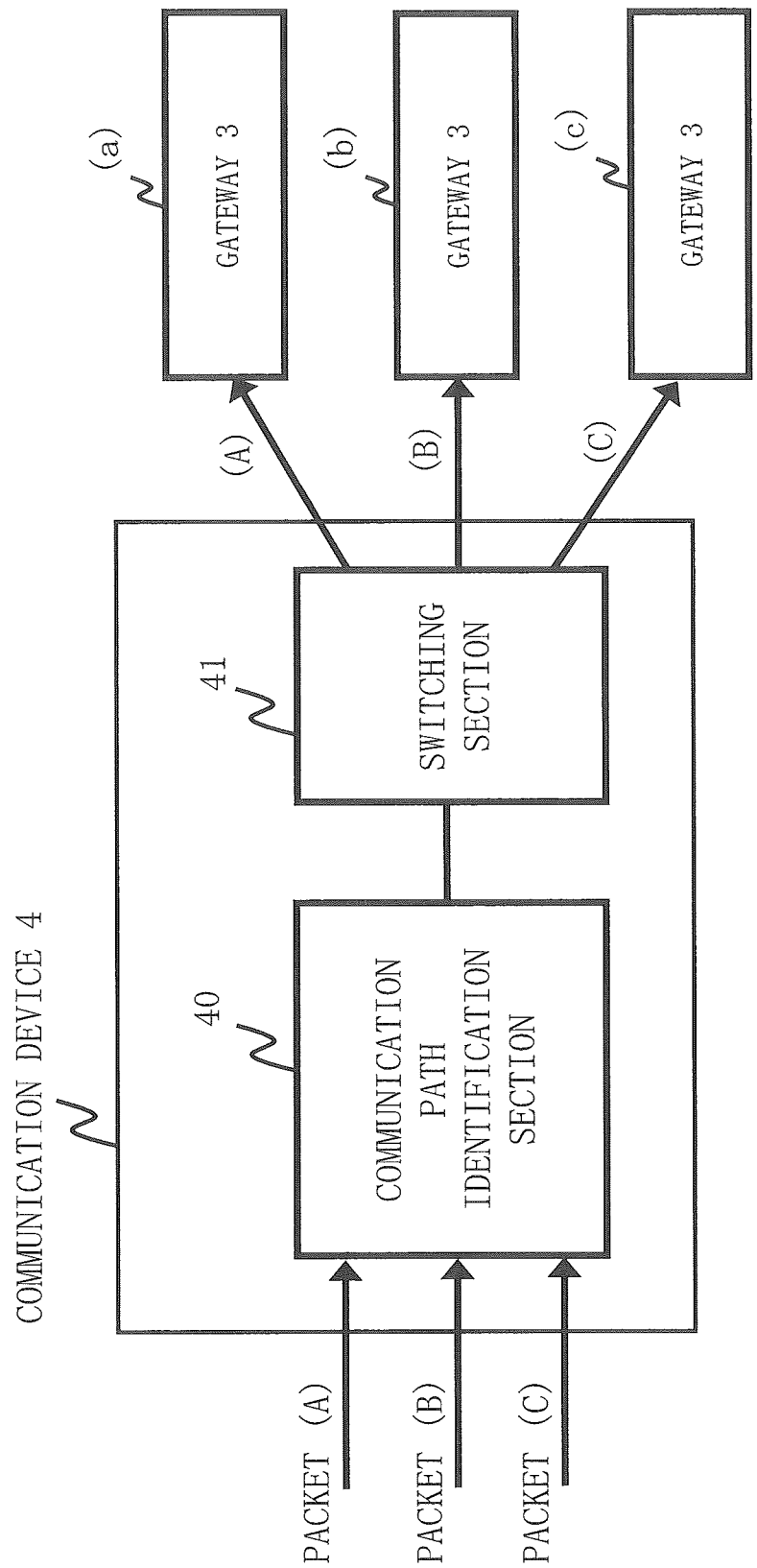
FIG. 3 is a block diagram showing a first example of the communication system according to the first exemplary embodiment of the present invention.

As illustrated in FIG. 3, the communication device 4 includes a communication path identification section 40 and a switching section 41, and is assumed to be able to switch among gateways 3(a), 3(b) and 3(c), depending on communication paths.

The communication path identification section 40 identifies a communication path to which a received packet belongs. For example, the communication path identification section 40 identifies a communication path to which a received packet belongs, based on a communication path identifier such as a TEID (Tunnel Endpoint Identifier) or GRE (Generic Routing Encapsulation) key.

The switching section 41 forwards a received packet to a gateway 3 associated with a communication path that has been identified based on a communication path identifier. For example, the switching section 41 has a function of managing associations between a communication path and gateways 3 and, based on these associations, forwards a received packet to an associated gateway 3. In the example of FIG. 3, the switching section 41 forwards received packets (A), (B) and (C) to the gateways 3(a), 3(b) and 3(c), respectively.

Figure 4:
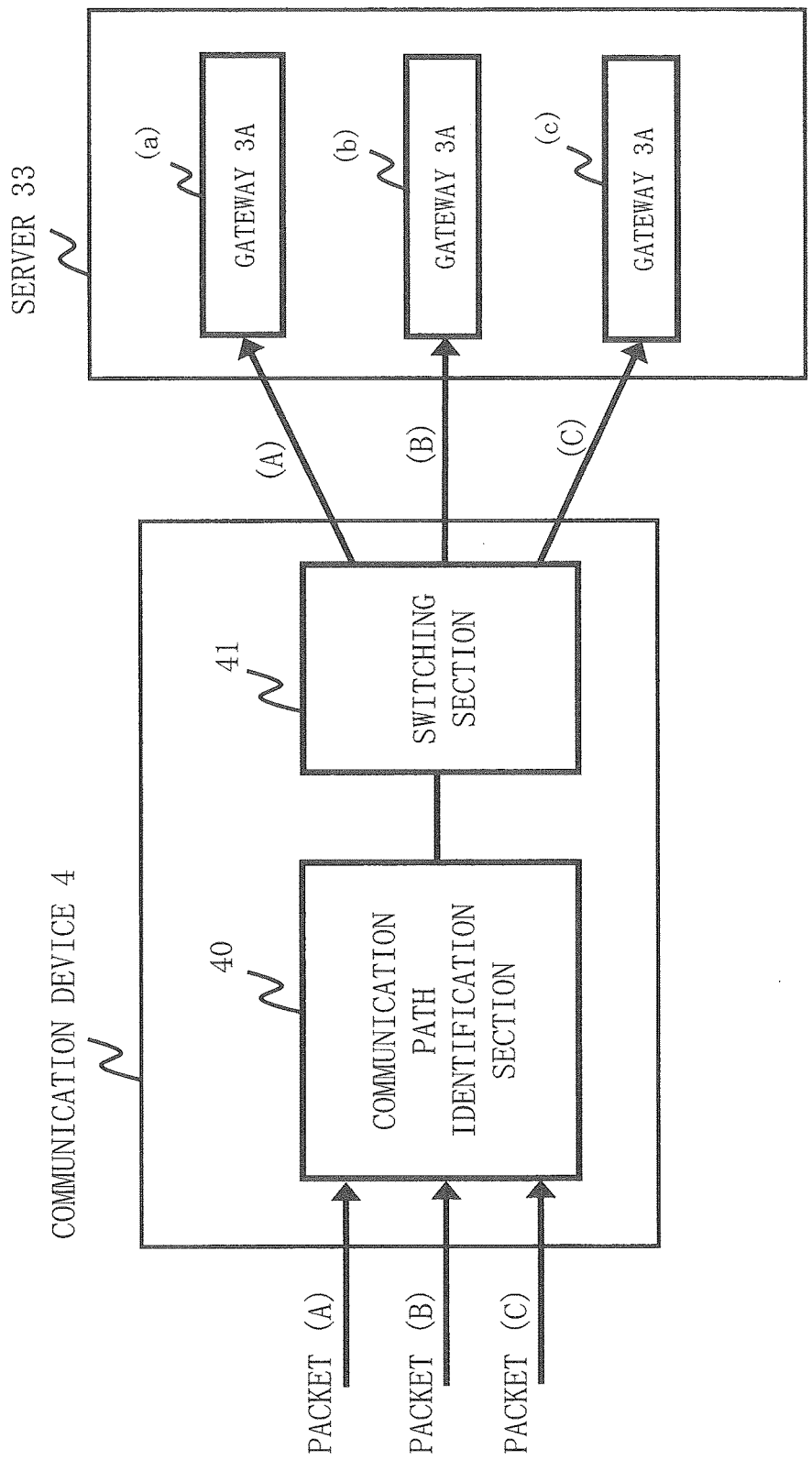
FIG. 4 is a block diagram showing a second example of the communication system according to the first exemplary embodiment of the present invention.

As illustrated in FIG. 4, it is also possible that gateways 3A (virtual gateways) are configured on a server 33 by using software such as virtual machines (VMs), and the communication device 4 forwards received packets to such gateways 3A. For example, the server 33 can construct multiple virtual gateways 3A, depending on the load or the like on the communication system. For example, the switching section 41, based on associations between communication paths and virtual gateways, forwards a received packet to an associated virtual gateway.

Figure 5:
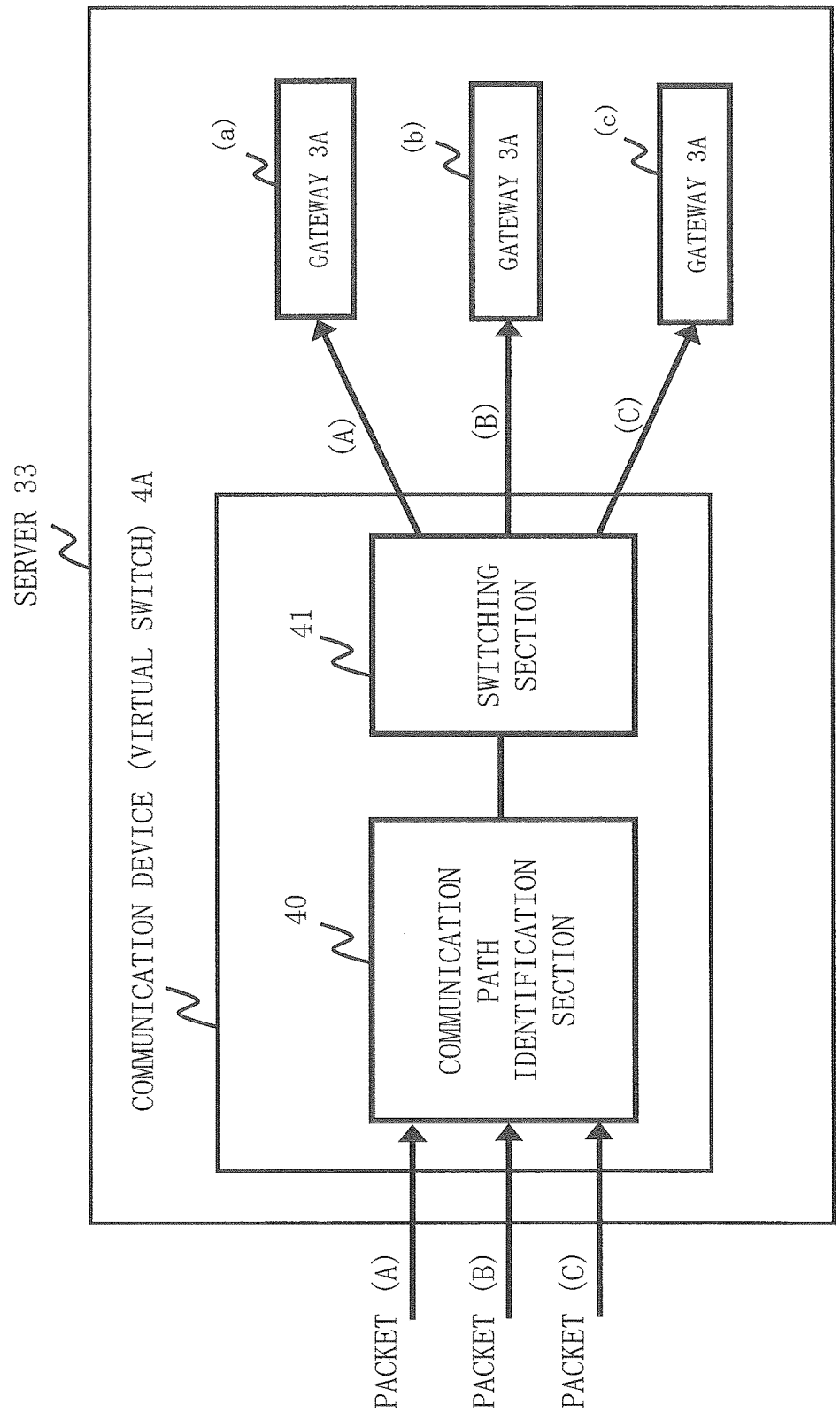
FIG. 5 is a block diagram showing a third example of the communication system according to the first exemplary embodiment of the present invention.

As illustrated in FIG. 5, it is also possible to implement the above-described functionality of the communication device 4 by a virtual switch 4A constructed on the server 33. That is, in the example of FIG. 5, the server 33 can operate as the communication device 4. In other words, it is also possible to construct the virtual switch 4A and the virtual gateways (gateways 3A) on a control section (not shown) of the server 33 by using software such as VMs. The communication path identification section 40 of the virtual switch 4A identifies a communication path to which a received packet belongs, and the switching section 41 of the virtual switch 4A forwards the received packet to a virtual gateway 3A associated with the identified communication path.

Although only one communication device 4 (or virtual switch 4A) is shown in FIGS. 3 to 5, a plurality of communication devices 4 may be used. Moreover, the communication device or devices 4 and the virtual switch or switches 4A may be used in combination.

1.3) Communication Path Control

Figure 6:
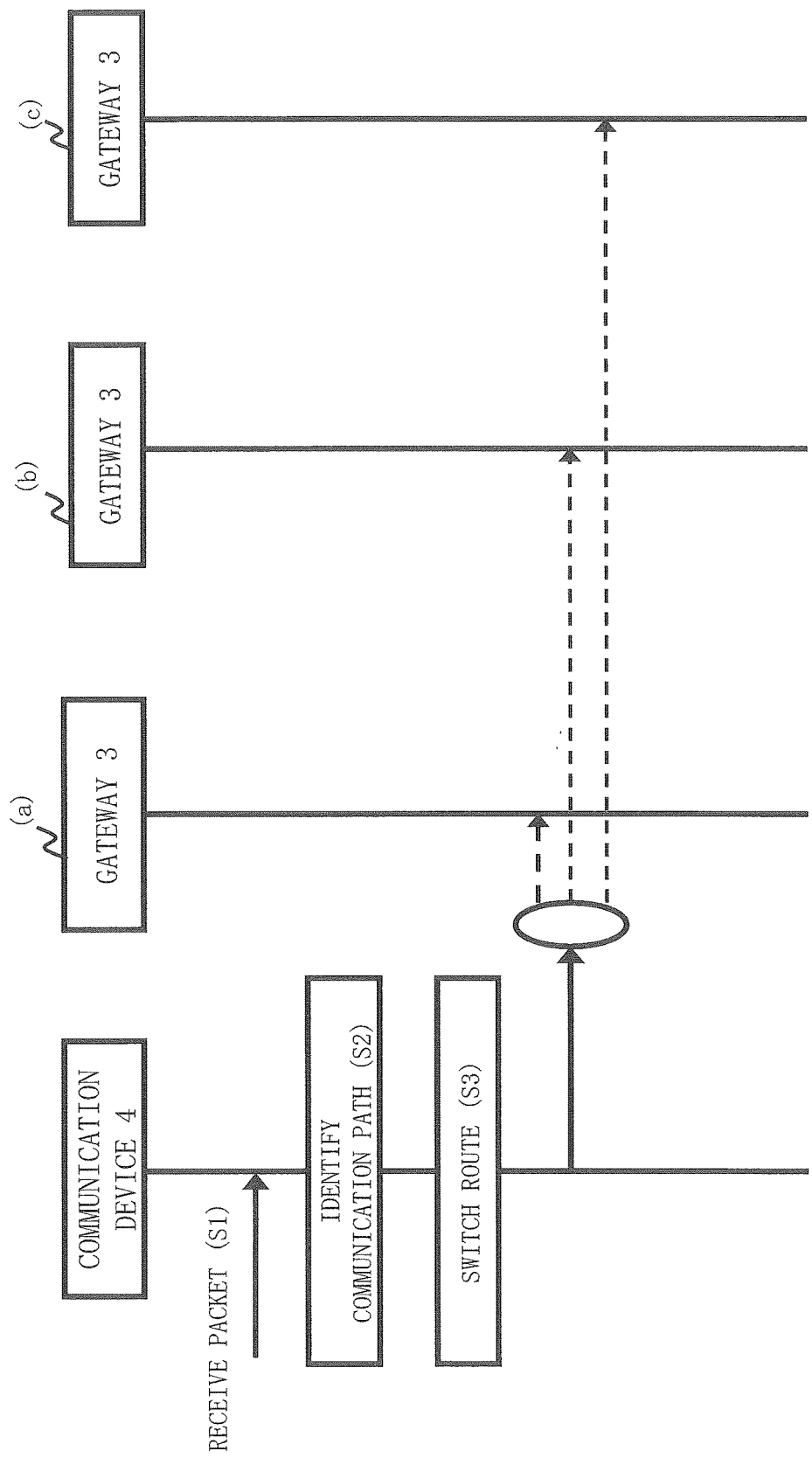
FIG. 6 is a sequence diagram showing an example of operation of a communication device according to the first exemplary embodiment of the present invention.

Referring to FIG. 6, at the communication device 4, when receiving a packet (Operation S1), the communication path identification section 40 identifies a communication path to which the received packet belongs (Operation S2). For example, the communication path identification section 40 identifies a communication path to which the received packet belongs, based on a communication path identifier such as a TEID or GRE key.

The switching section 41 of the communication device 40 forwards the received packet to a gateway 3 associated with the identified communication path (Operation S3).

1.4) Effects

Through the operations described above, the communication device 4 switches a packet forward route on the course of a communication path route, whereby the communication system can conceal switching between gateways 3 associated with communication paths from the mobile terminal 1. Accordingly, even if switching is made between gateways 3 associated with communication paths, the communication system can avoid performing a communication path reestablishment procedure.

2. Second Exemplary Embodiment

A second exemplary embodiment of the present invention is applicable to the communication system illustrated in FIG. 1.

A communication device 4 in a communication system according to the second exemplary embodiment can switch a communication path route, as in the above-described first exemplary embodiment, in accordance with an instruction notified from a controller 5. Since the controller 5 can perform centralized control of operation of the communication device 4, the efficiency in system operation is enhanced.

Figure 7:
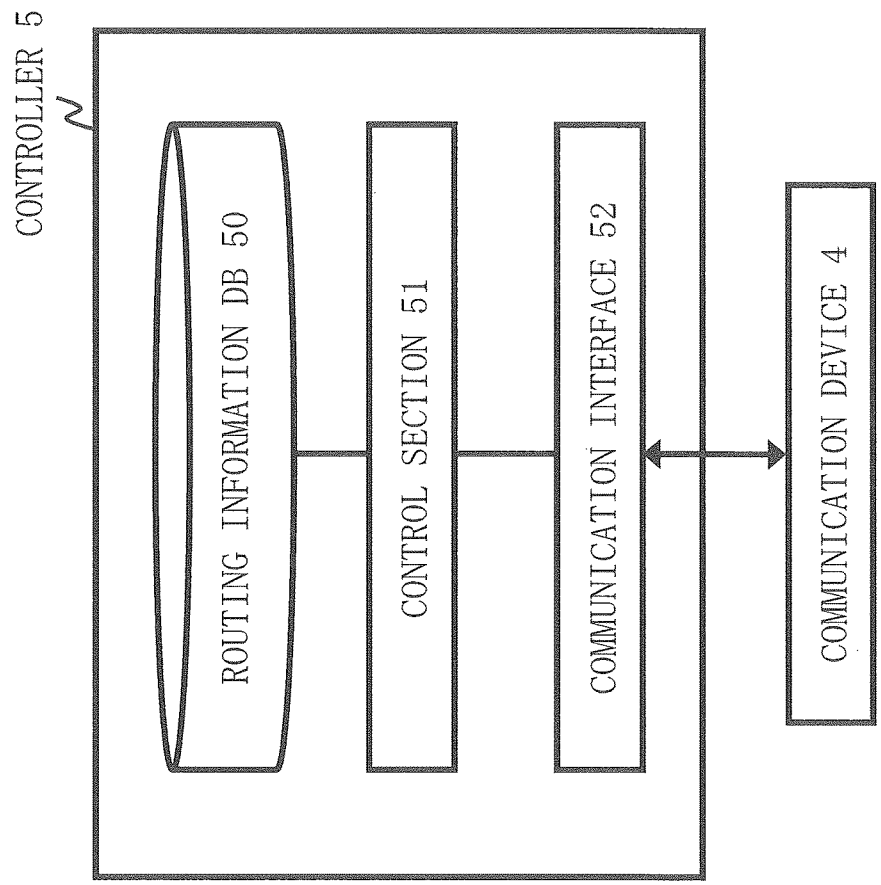
FIG. 7 is a block diagram showing a configuration of a controller according to a second exemplary embodiment of the present invention.

As shown in FIG. 7, the controller 5 includes a routing information DB (database) 50, a control section 51, and a communication interface 52.

The communication interface 52 has a function of communicating with the communication device 4. For example, the communication interface 52 can communicate with the communication device 4 by using a protocol such as Open-Flow, ForCES (Forwarding and Control Element Separation) or I2RS (Interface to Routing System).

The routing information DB 50 is a database for managing associations between communication paths and gateways 3. The control section 51 has a function of generating information to be stored in the routing information DB 50 and a function of controlling the communication device 4 through the communication interface 52 based on the information stored in the routing information DB 50.

As illustrated in FIG. 8, the routing information DB 50 stores association information about each communication path and its associated gateway. A communication path identifier such as a TEID or GRE key can be used for information to identify a communication path, and an associated gateway 3 can be managed based on each communication path identifier.

The control section 51 controls the communication device 4 based on the information managed in the routing information DB 50. For example, the control section 51 notifies an association between a communication path and a gateway 3 to the switching section 41 of the communication device 4.

Figure 9:
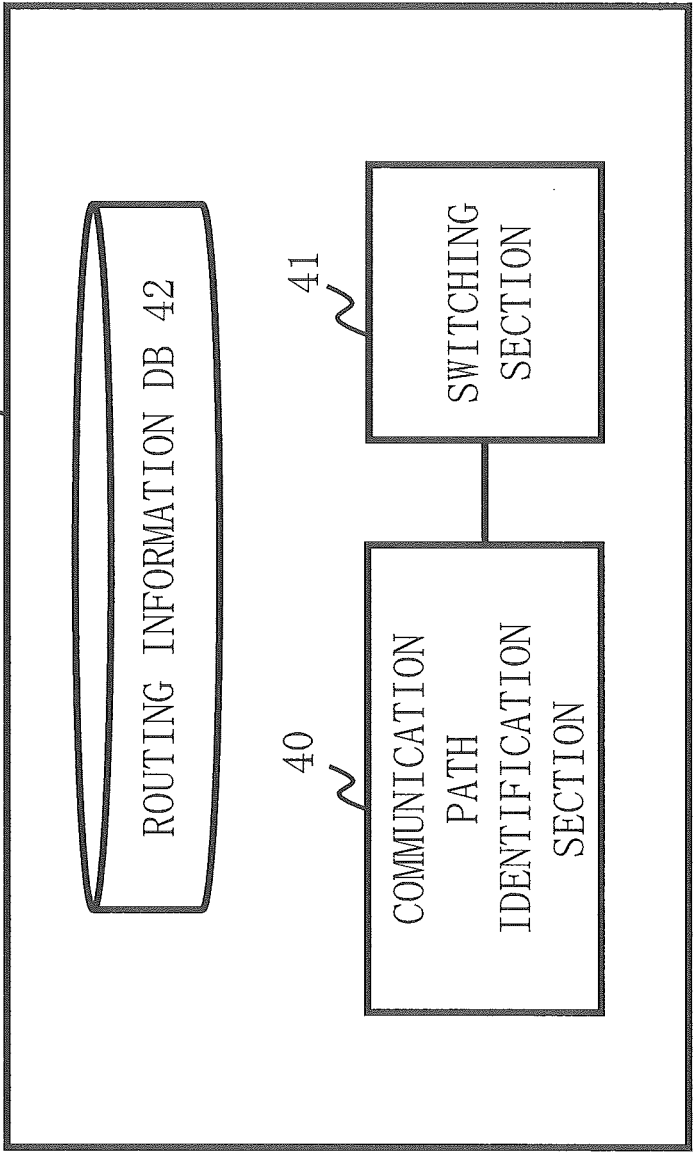
FIG. 9 is a block diagram showing an example of a communication device according to the second exemplary embodiment of the present invention.

As illustrated in FIG. 9, it is also possible to provide the communication device 4 with a routing information DB 42 to allow it to store routing information notified from the controller 5. In this case, the communication path identification section 40 and the switching section 41 of the communication device 4 refers to the routing information DB 42 and forwards a packet to a gateway 3 associated with a communication path to which this packet belongs.

For example, when a gateway 3 associated with a communication path changes, the control section 51 of the controller 5 notifies information about that changed association to the communication device 4. The communication device 4 stores the notified information in the routing information DB 42.

It is also possible that the control section 51 of the controller 5 causes gateways 3A (as illustrated in FIG. 5), which are virtual gateways, to operate on the server 33 illustrated in FIG. 5 by using, for example, an activation command. That is, in response to an activation command from the control section 51, the server 33 activates an application having functionality corresponding to a gateway 3, on a virtual machine.

For example, the controller 5 can be configured by using a PCRF (Policy and Charging Rule Function), an MME (Mobility Management Entity) and the like for LTE communication systems, as well as an NMS (Network Management System) and the like. The MME has a function of controlling the establishment/deletion of bearers, a function of controlling the mobility of mobile terminals 1 such as handover, a function of authenticating users of mobile terminals 1, and the like. The PCRF has a function of controlling QoS policies and the like, a function of controlling charging for data forwards, and the like. The gateways perform policy control, based on information notified from the PCRF. The NMS has a function of monitoring network traffic, a function of monitoring the aliveness of network equipment, and the like.

3. Third Exemplary Embodiment

A third exemplary embodiment of the present invention is also applicable to any technique disclosed in the above-described first or second exemplary embodiment. In the third exemplary embodiment, the functionality of a gateway 3 is virtually configured by using software such as a VM.

In current communication systems, dedicated appliances, which are hardware equipment, are used to perform various network functions. Since such dedicated appliances are necessary to construct a communication system, network operators are forced to install new dedicated appliances when they start new network services. That is, the installation of dedicated appliances costs network operators a lot, such as costs for the purchase of the dedicated appliances and their installation spaces.

Moreover, communication systems are, in general, designed to have tolerance for peak load. Accordingly, dedicated appliances (e.g., gateway devices and the like) included in a communication system are possibly redundant as compared to off-peak traffic volume. A solution to this problem is to implement the functions of dedicated appliances such as gateway devices by using software such as virtual machines. For example, a virtual machine with the functionality of a dedicated appliance is added depending on the traffic in a communication system, allowing system construction according to the state of the communication system.

In the third exemplary embodiment of the present invention, it is possible to switch between gateways 3 associated with communication paths when the functions of gateways 3 are dynamically scaled out. A communication device 4 switches a packet forward route on the course of a communication path route, whereby the communication device 4 can conceal switching between gateways 3 associated with communication paths from the mobile terminal 1. Accordingly, even if switching is made between gateways 3 associated with communication paths, the communication system can avoid performing a communication path reestablishment procedure. Hereinafter, the third exemplary embodiment of the present invention will be described with reference to examples shown in FIGS. 10 to 20.

3.1) Gateway Configuration

Figure 10:
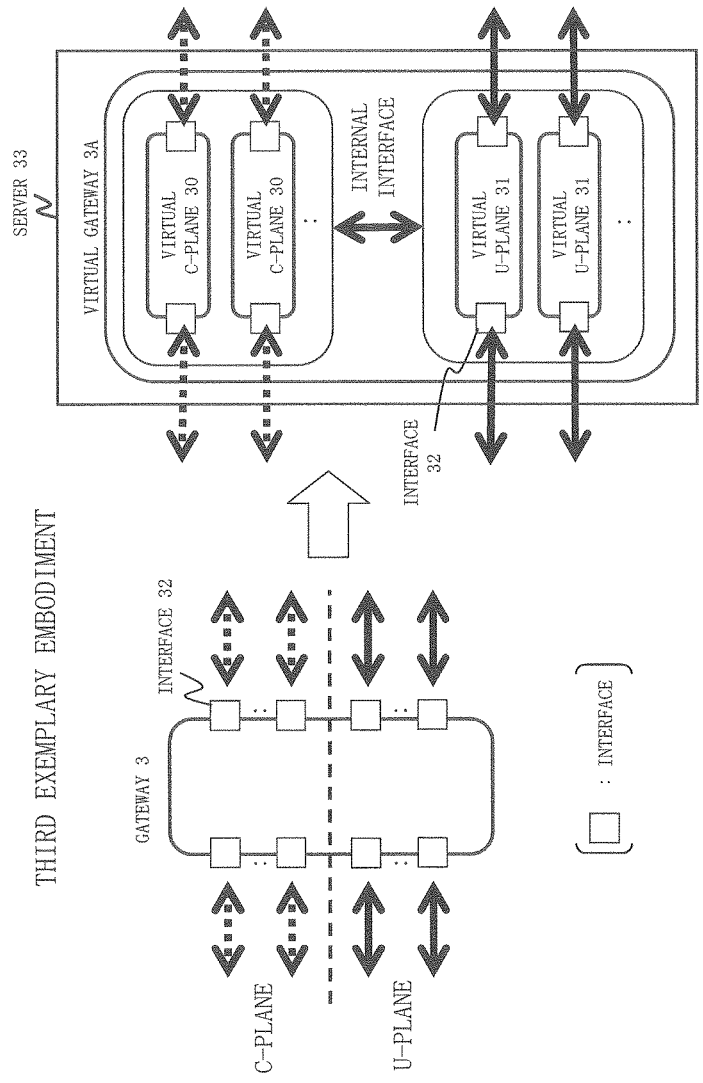
FIG. 10 is a schematic configuration diagram for describing a functional configuration of a communication device according to a third exemplary embodiment of the present invention.

As shown on the left of FIG. 10, a gateway 3 has a control plane (C-plane) and a user plane (U-plane). The C-plane has a function of processing control signals transmitted in the communication system. The U-plane has a function of processing data transmitted in the communication system. The C-plane and the U-plane can also make communications via different interfaces 32, respectively. In the gateway 3, for example, an IP address is assigned to each interface.

For a mobile terminal 1 to communicate with an external network such as the Internet, a communication path (i.e., a bearer) is established between the gateway 3 and the mobile terminal 1. For example, the gateway 3 uses an IP address assigned to an interface 32 to communicate over a communication path. The gateway 3 constructs a tunnel (e.g., GTP tunnel or GRE tunnel) to establish a communication path.

As shown on the right of FIG. 10, the above-described gateway 3 is configured as a virtual gateway 3A by using software such as a VM. For example, the virtual gateway 3A is constructed on a server 33. In the virtual gateway 3A, a C-plane and a U-plane are configured by using software such as VMs. In FIG. 10, functions corresponding to the C-plane and the U-plane are denoted as "virtual C-plane 30" and "virtual U-plane 31", respectively. The virtual C-plane 30 and the virtual U-plane 31 can communicate with each other via an internal interface. An operator of the communication system can add a virtual C-plane 30 and/or a virtual U-plane 31 depending on, for example, the load or the like on the communication system. Since virtual C-planes and virtual U-planes are constructed by using software, the operator can add such a gateway more easily at lower cost than it adds a gateway 3 composed of hardware equipment.

The virtual C-plane 30 and the virtual U-plane 31 each operate as a network node providing a function of terminating a communication path and a function of serving as a connection point to an external network.

As described earlier, if an TP address is assigned to each interface 32 in the virtual gateway 3A as in the gateway 3, communication path reconfiguration is expected to occur when a virtual C-plane or virtual U-plane is additionally installed. For example, when an additional virtual U-plane 31 is installed, a new IP address is assigned to the interface 32 of the additional virtual U-plane 31. When a communication path configured at an existing virtual U-plane 31 is switched to the additional virtual U-plane 31, the communication path reconfiguration occurs because an IP address corresponding to the communication path is changed to the IP address assigned to the additional virtual U-plane 31. To perform communication path reconfiguration, functions included in the communication system, such as eNB, SGW and PGW, each perform a communication path reconfiguration procedure. Accordingly, communication path reconfiguration occurs each time a virtual C-plane 30 or virtual U-plane 31 is additionally installed, which, expectedly, greatly affects the performance or the like of the communication system.

Hence, according to the third exemplary embodiment of the present invention, an IP address is not assigned to each of the interfaces 32 of virtual C-planes 30 and virtual U-planes 31, but a common IP address is assigned to, for example, the virtual U-planes or the virtual C-planes. That is, a common IP address is assigned to multiple virtual C-planes or multiple virtual U-planes. Consequently, for example, if an additional virtual U-plane 31 to be included in the U-plane is installed, the occurrence of communication path reconfiguration can be avoided even when a communication path is switched between virtual U-planes 31, because the common IP address is assigned to each virtual U-plane 31. Note that a common address assigned to multiple virtual C-planes or multiple virtual U-planes is not limited to an IP address but may be, for example, a MAC address.

3.2) System

Figure 11:
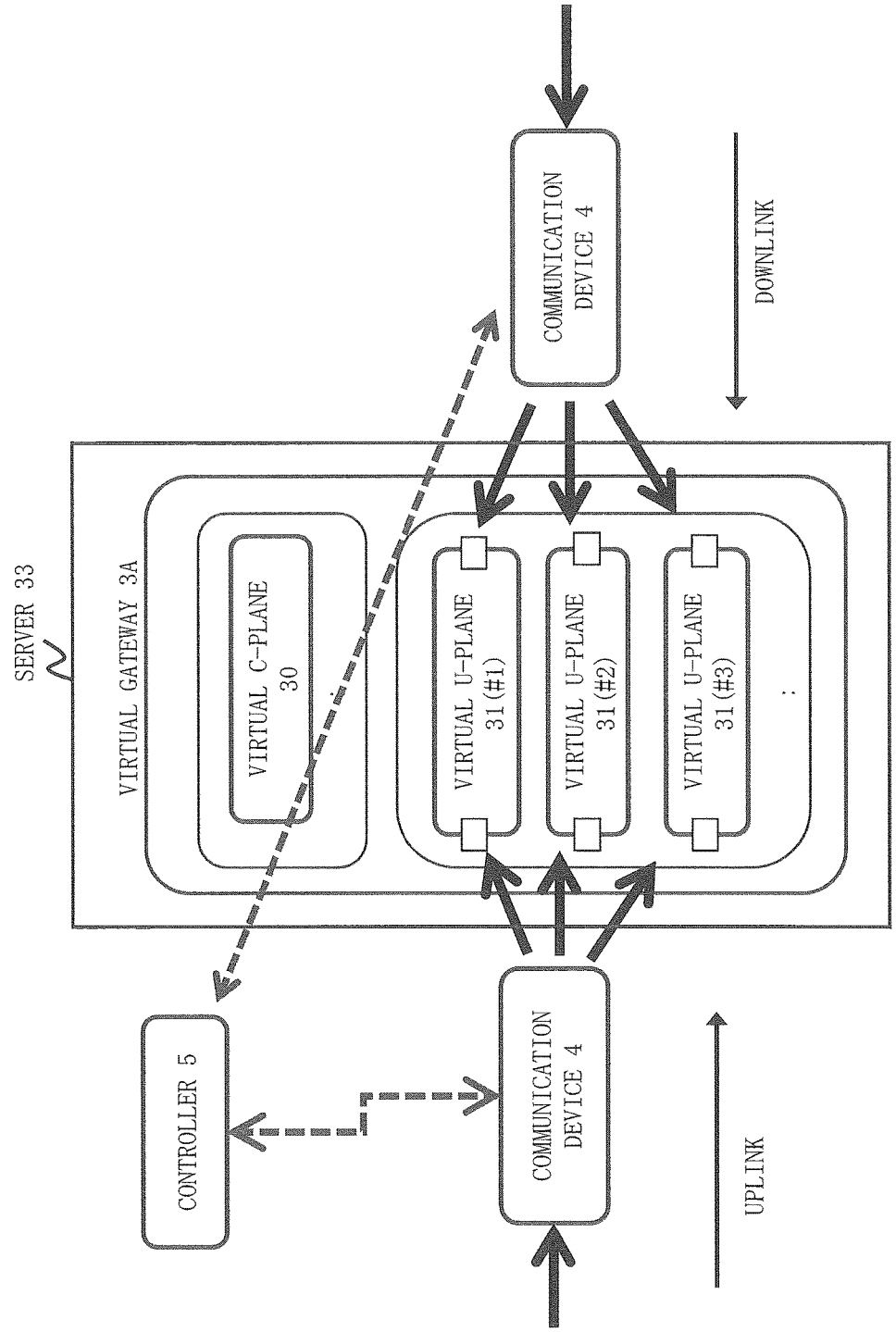
FIG. 11 is a system architecture diagram showing a first example of a communication system according to the third exemplary embodiment of the present invention.

Referring to FIG. 11, a first example of the communication system according to the third exemplary embodiment of the present invention includes a virtual gateway 3A, communication devices 4, and a controller 5.

In the virtual gateway 3A, virtual C-planes 30 and virtual U-planes can be configured by using software such as VMs. For example, virtual C-planes 30 and virtual U-planes 31 are configured on a server by using software such as VMs.

The controller 5 manages associations between communication paths and the virtual gateway 3A. For example, the controller 5 has a function of managing associations between communication paths and virtual U-planes 31. Moreover, for example, the controller 5 has a function of managing associations between communication paths and virtual C-planes 30.

The controller 5 has a function of controlling operation of the communication devices 4. As described already, the controller 5 identifies a communication path to which a received packet belongs and instructs the communication devices 4 to forward the received packet to a virtual U-plane 31 associated with the identified communication path.

It is also possible that the controller 5 causes the virtual gateway 3A (or virtual C-planes 30 or virtual U-planes 31) to operate on a server 33. For example, the controller 5 can instruct the server 33 to activate the virtual gateway 3A. The server 33, in response to an activation command from the controller 5, activates an application having functionality corresponding to the gateway 3 on a virtual machine.

It is also possible that the controller 5 controls virtual U-planes 31 in parallel with the communication device 4. For example, to make switching between virtual U-planes 31 associated with communication paths, the controller 5 controls the communication device 4 to switch a packet forward route on the course of a communication path route, and also controls terminating the relevant communication path at a virtual U-plane 31 after the switching. For example, the control section 51 of the controller 5 notifies the virtual U-plane 31 of information about the communication path (e.g., a communication path identifier) to be newly terminated by the virtual U-plane 31 due to route switching.

Figure 12:
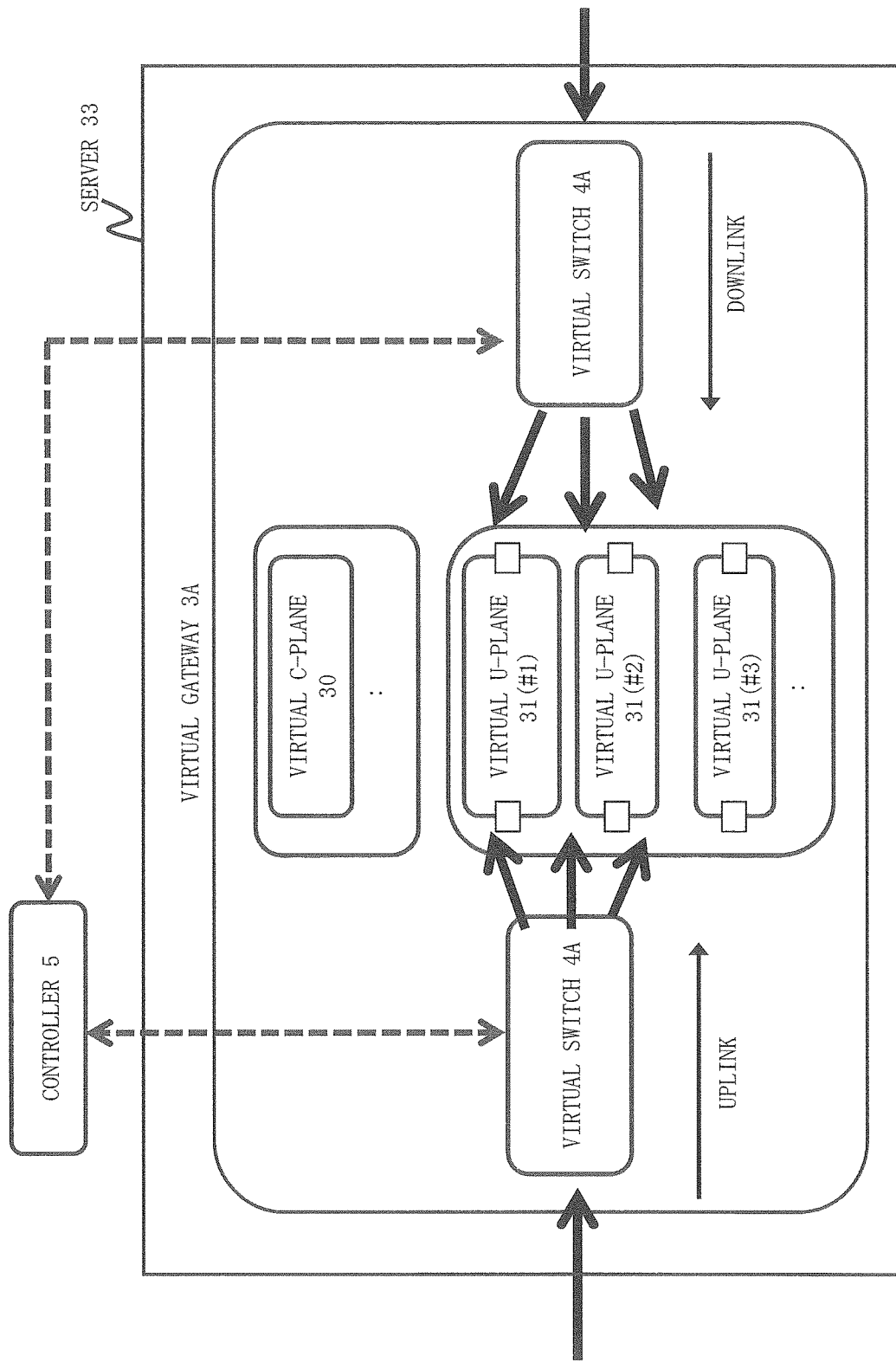
FIG. 12 is a system architecture diagram showing a second example of the communication system according to the third exemplary embodiment of the present invention.

As shown in FIG. 12, in a second example of the communication system according to the third exemplary embodiment, the functionality of the communication devices 4 is configured on the server 33 by using software such as VMs. That is, in the example of FIG. 12, the server 33 is capable of operating as communication devices 4. For example, the server 33 includes a control section (not shown in FIG. 12) that can activate the virtual gateway 3A on the server 33. In the virtual gateway 3A, virtual C-planes 30, virtual U-planes 31, and virtual switches 4A are configured on the server 33, and the functionality of the communication devices 4 is configured as the virtual switches 4A on the server 33.

Figure 13:
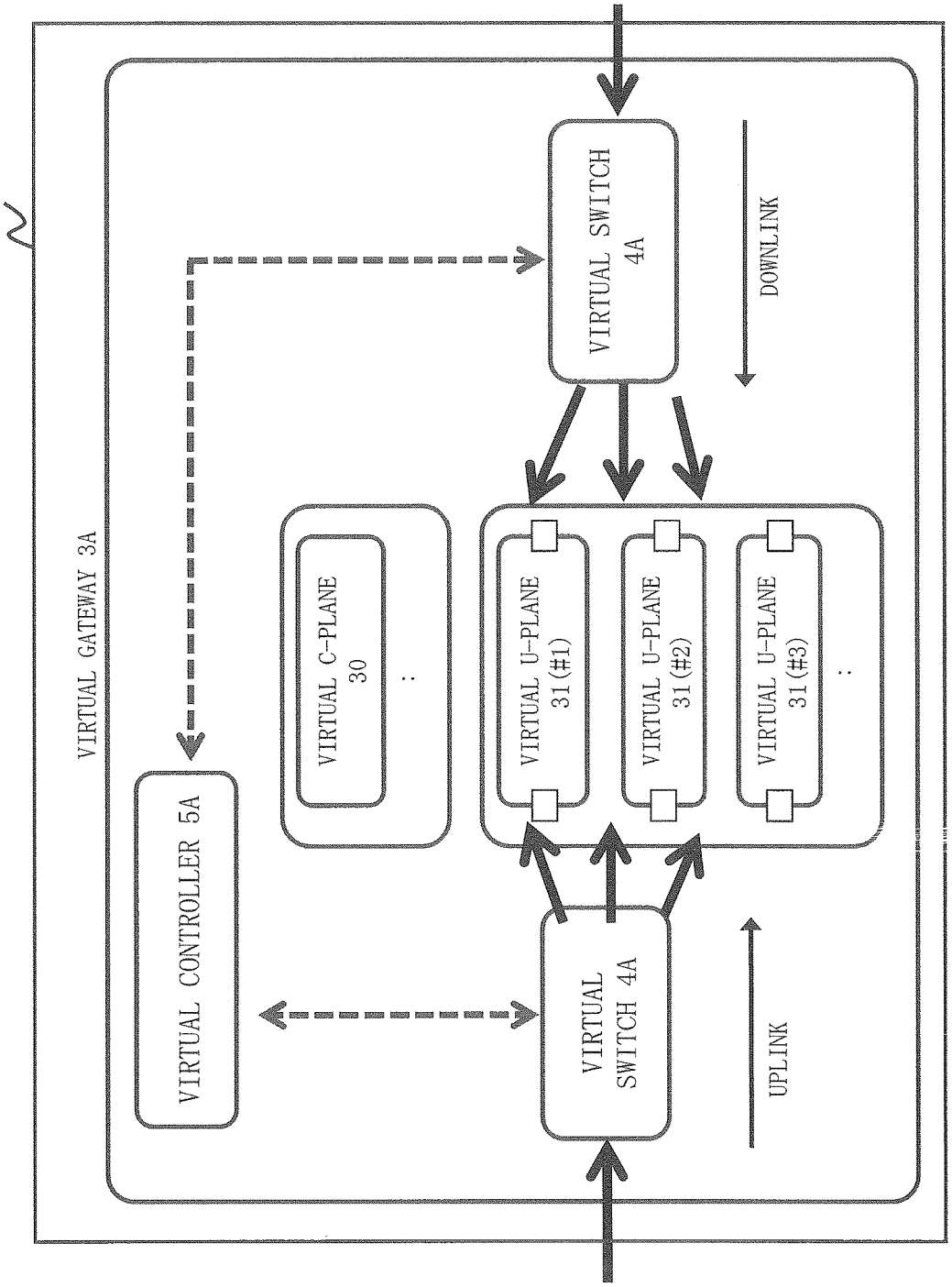
FIG. 13 is a system architecture diagram showing a third example of the communication system according to the third exemplary embodiment of the present invention.

As shown in FIG. 13, in a third example of the communication system according to the third exemplary embodiment, the server 33 includes the virtual switches 4A operable as the communication devices 4 as in the example of FIG. 12, and the functionality of the controller 5 is further configured on the server 33 by using software such as a VM. In the example of FIG. 13, the functionality of the controller 5 is configured as a virtual controller 5A on the server 33. For example, the server 33 includes a control section (not shown in FIG. 13) that can activate at least one of the virtual switches 4A, the virtual gateway 3A, and the virtual controller 5A on the server 33. In the example of FIG. 13, the virtual gateway IA is composed of virtual C-planes 30, virtual U-planes 31, the virtual switches 4A, and the virtual controller 5A. In the example of FIG. 13, the server 33 can operate as the controller 5 that has the functionality of at least one of the virtual switches 4A and the virtual gateway 3A.

A description below of the third exemplary embodiment will be made based on the system architecture illustrated in FIG. 11. However, the present exemplary embodiment is not limited to this system architecture shown in FIG. 11 but also includes those shown in FIGS. 12 and 13, as well as any examples made by modifying, substituting, or adjusting these system architectures.

3.3) Management Information at Controller (First Example)

Figure 14:
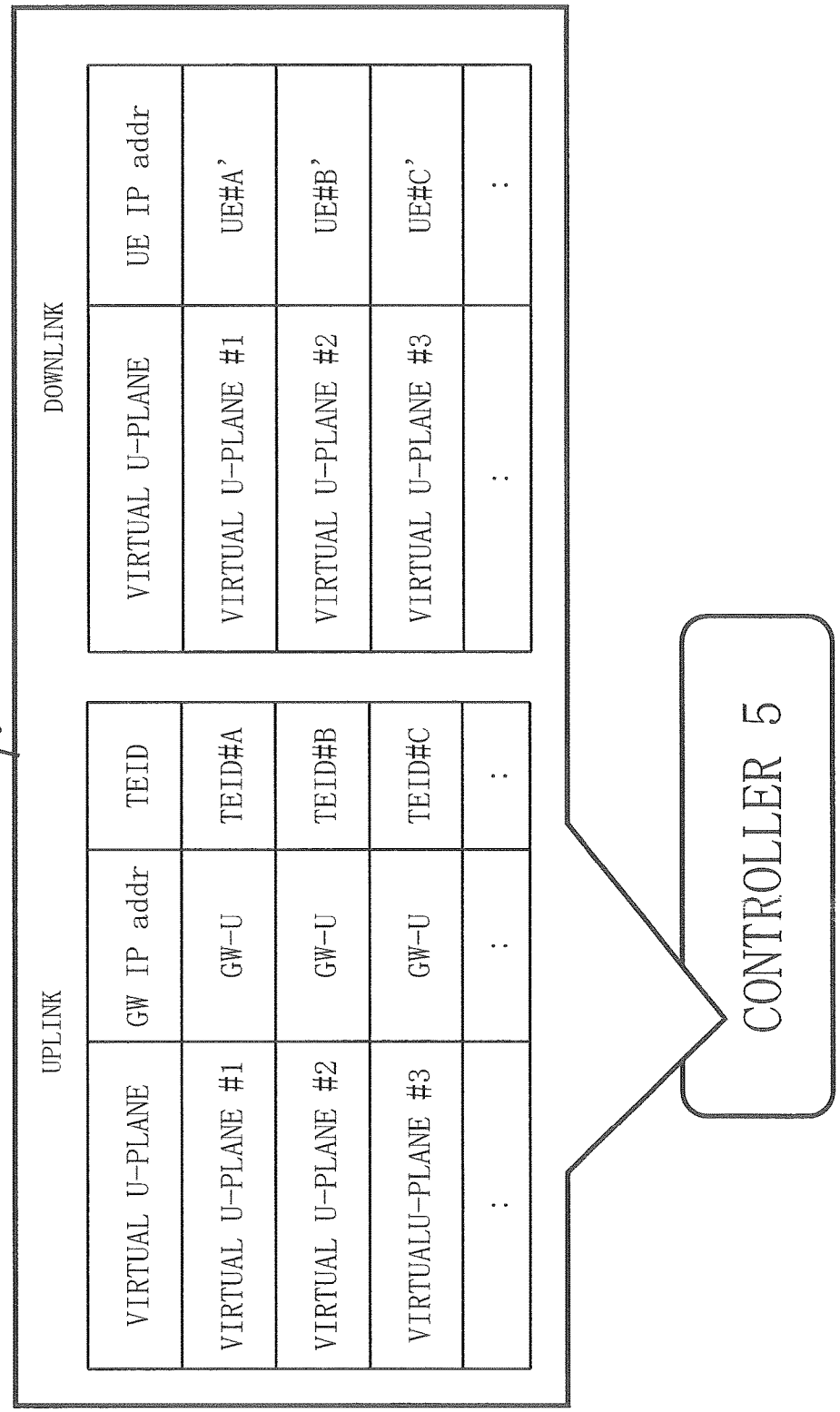
FIG. 14 is a structural diagram showing a first example of a routing information DB at a controller according to the third exemplary embodiment of the present invention.

Management information to be stored in the routing information DB 50 of the controller 5 is information that the controller 5 manages for the virtual gateway 3A functioning as a P-GW here, as illustrated in FIG. 14.

For instance, the controller 5 manages communication path information and information concerning virtual U-planes 31 ("VIRTUAL U-PLANE" in FIG. 14) each associated with communication paths identified by the communication path information. For example, the communication path information includes an IP address assigned to a virtual U-plane ("GW IP addr" in FIG. 14) and a communication path identifier ("TEID" in FIG. 14). Note that the "GW IP addr" in FIG. 14 is a common IP address assigned to the virtual U-planes 31.

The controller 5 manages the above-described GW IP addr and TEID as communication path information for uplink communication (communication from a mobile terminal 1 to an external network such as the Internet). The communication path information may also include information concerning a virtual U-plane 31 associated with a communication path (e.g., virtual U-plane identification information; information shown as "VIRTUAL U-PLANE" in FIG. 14). FIG. 14 shows that, for example, a communication path with GW IP addr "GW-U" and TEID "TEID#A" is associated with a virtual U-plane #1.

The controller 5 manages information including, for example, the IP address of a mobile terminal 1 ("UE IP addr" in FIG. 14) as communication path information for downlink communication (communication from an external network to a mobile terminal 1). For example, the controller 5 obtains the communication path information from a virtual C-plane 30.

As illustrated in FIG. 14, an IP address is not assigned to each virtual U-plane 31, but the common IP address ("GW IP addr") is assigned to the virtual U-planes 31. Not only in this assignment method, multiple IP addresses (e.g., "GW-U#1" and "GW-U#2") may be also assigned to the virtual U-planes. For example, it is also possible to employ an assignment method in which "GW-U#1" is assigned to virtual U-planes #1-#n and "GW-U#2" is assigned to virtual U-planes #m-#x.

3.4) Control Information at Communication Device (First Example)

Figure 15:
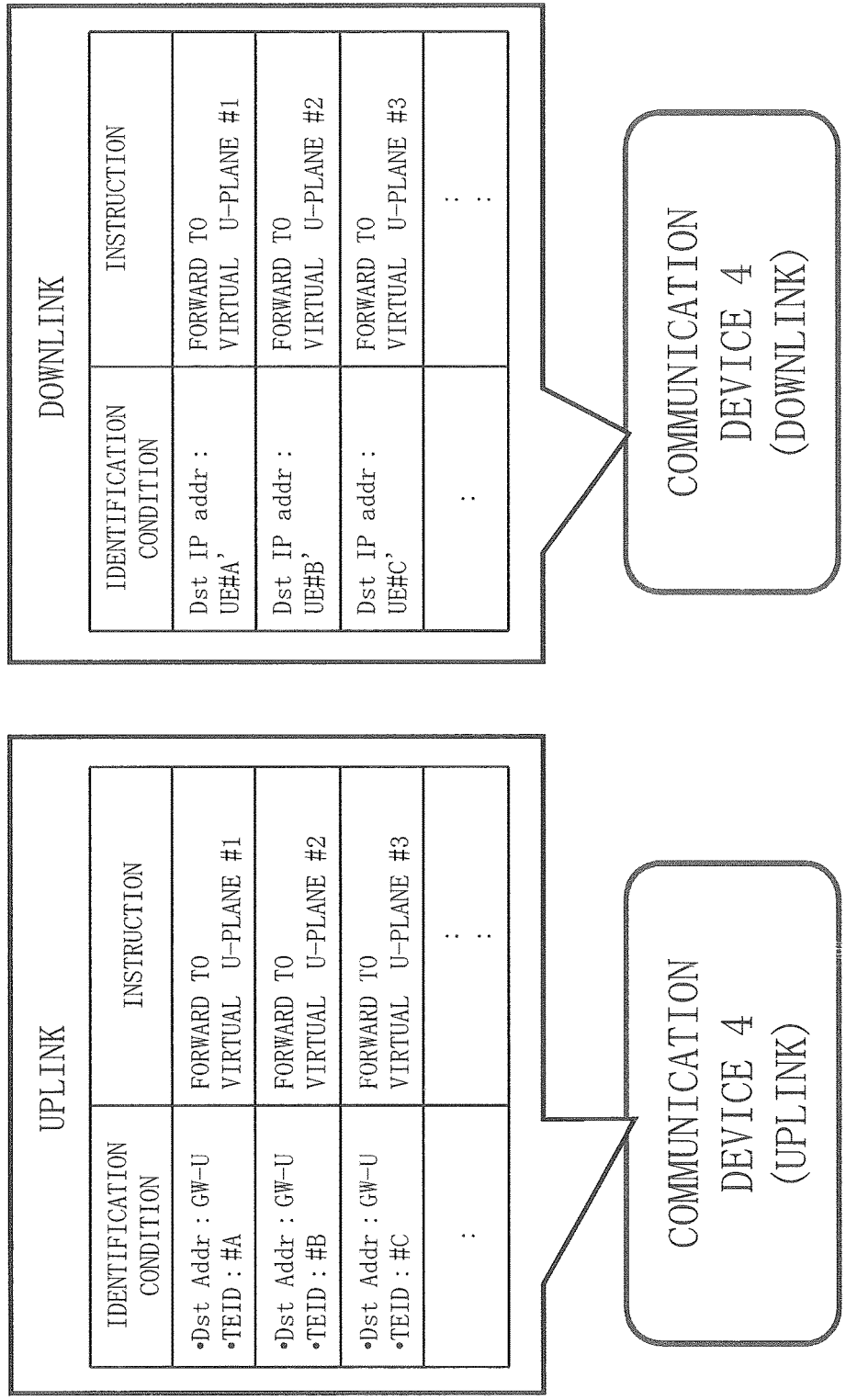
FIG. 15 is a structural diagram showing a first example of a routing information DB at the communication device according to the third exemplary embodiment of the present invention.

The controller 5 can set control information in the communication devices 4, as illustrated in FIG. 15.

For example, the controller 5 notifies, as control information, an instruction to process a received packet to the communication device 4 that processes uplink communication. The communication device 4 processes the received packet in accordance with the notified control information. For example, the control information notified by the controller 5 instructs the communication device 4 to identify a bearer to which the received packet belongs, based on the IP address assigned to the virtual U-planes ("GW IP addr") and a TEID, and to forward the received packet to a virtual U-plane 31 associated with the identified bearer.

Referring to FIG. 15, the control information to be notified to the communication device 4 for uplink communication includes, for example, a "matching key" (IDENTIFICATION CONDITION) and an "instruction" (INSTRUCTION). The "matching key" indicates a condition to identify a packet based on the IP address for the U-planes ("GW IP addr"), which is the destination address of the packet, and on a TEID. The "instruction" indicates a method for processing the packet that matches the condition indicated by the "matching key". For example, when a packet with destination address (Dst Addr) "GW-U" and TEID "#A" is identified, this packet is instructed to be forwarded to the "virtual U-plane #1".

For instance, the controller 5 notifies, as control information, an instruction to process a received packet to the communication device 4 that processes downlink communication. The communication device 4 processes the received packet in accordance with the notified control information. For example, the control information notified by the controller 5 instructs to identify a bearer to which the received packet belongs, based on the IP address of a mobile terminal 1 ("UE IP addr") that is the destination of the packet, and to forward the received packet to a virtual U-plane 31 associated with the identified bearer.

Referring to FIG. 15, the control information to be notified to the communication device 4 for downlink communication includes, for example, a "matching key" and an "instruction". The "matching key" indicates a condition to identify a packet based on the IP address of a mobile terminal 1 ("UE IP addr") that is the destination address of the packet. The "instruction" indicates a method for processing the packet that matches the condition indicated by the "matching key". For example, when a packet with destination address (Dst Addr) "UE#A'" is identified, this packet is instructed to be forwarded to the "virtual U-plane #1."

3.5) Communication Path Control Operation (First Example)

Figure 16:
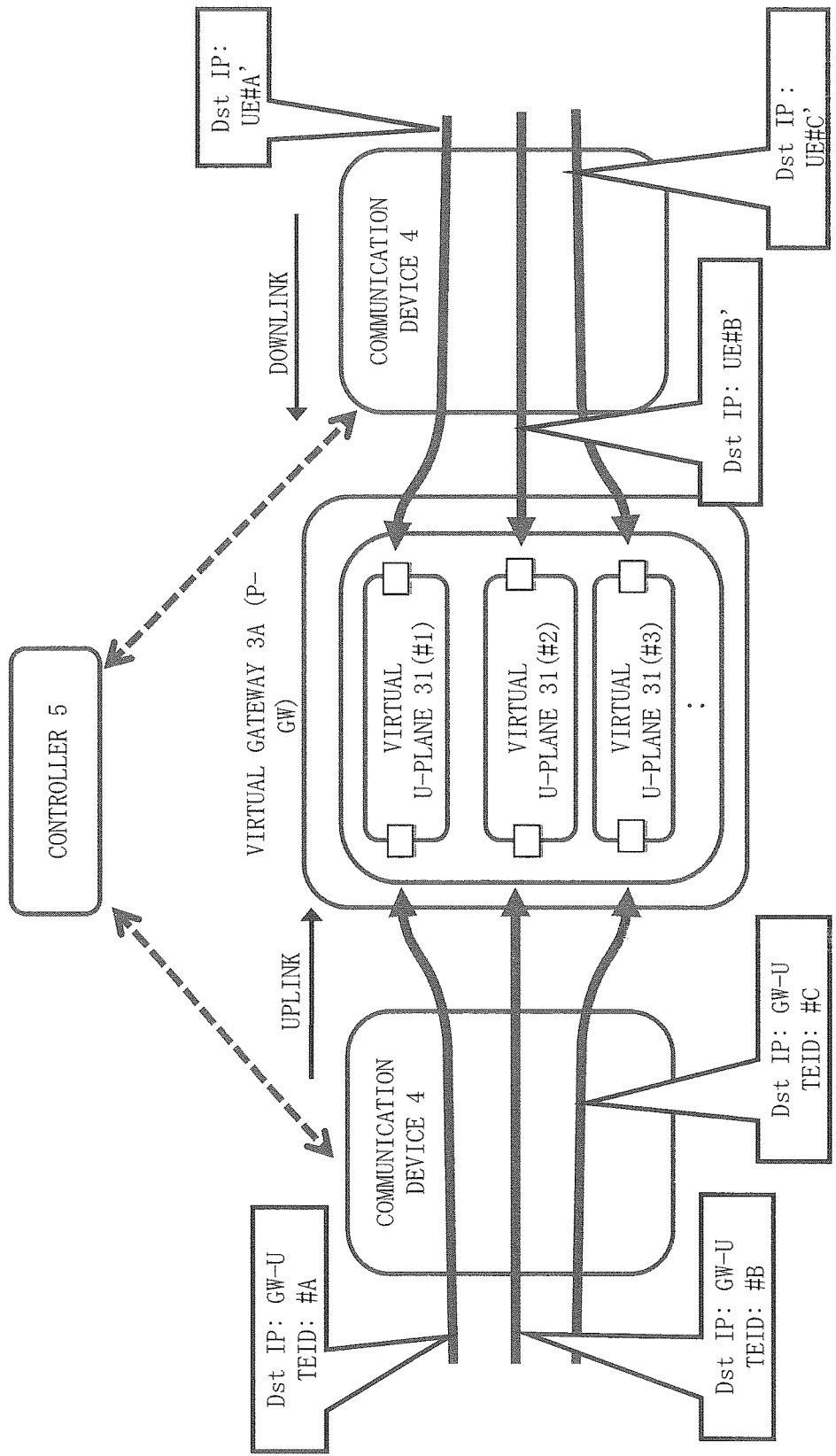
FIG. 16 is a schematic system architecture diagram for describing a first example of operation of the communication system according to the third exemplary embodiment of the present invention.

Referring to FIG. 16, the communication devices 4 forward a received packet to a virtual U-plane 31 in accordance with the control information illustrated in FIG. 15. More specifically, the communication devices 4 search for a "matching key" corresponding to a received packet and, when a matching "matching key" is retrieved, forward the received packet to a virtual U-plane 31 in accordance with an "instruction" corresponding to that "matching key".

For example, at the uplink-side communication device 4, a packet addressed to the virtual gateway 3 (a packet with Dst Addr "GW-U") is forwarded to a virtual U-plane 31 according to a TEID. In the example of FIG. 16, a packet with TEID "#A" is forwarded to the virtual U-plane #1, a packet with TEID "#B", to the virtual U-plane #2, and a packet with TEID "#C", to the virtual U-plane #3.

Moreover, at the downlink-side communication device 4, a received packet is forwarded to a virtual U-plane 31 according to a destination IP address. In the example of FIG. 16, a packet with destination IP address "UE#A'" is forwarded to the virtual U-plane #1, a packet with destination IP address "UE#B'", to the virtual U-plane #2, and a packet with destination IP address "UE#C'", to the virtual U-plane #3.

3.6) Management Information at Controller (Second Example)

Figure 17:
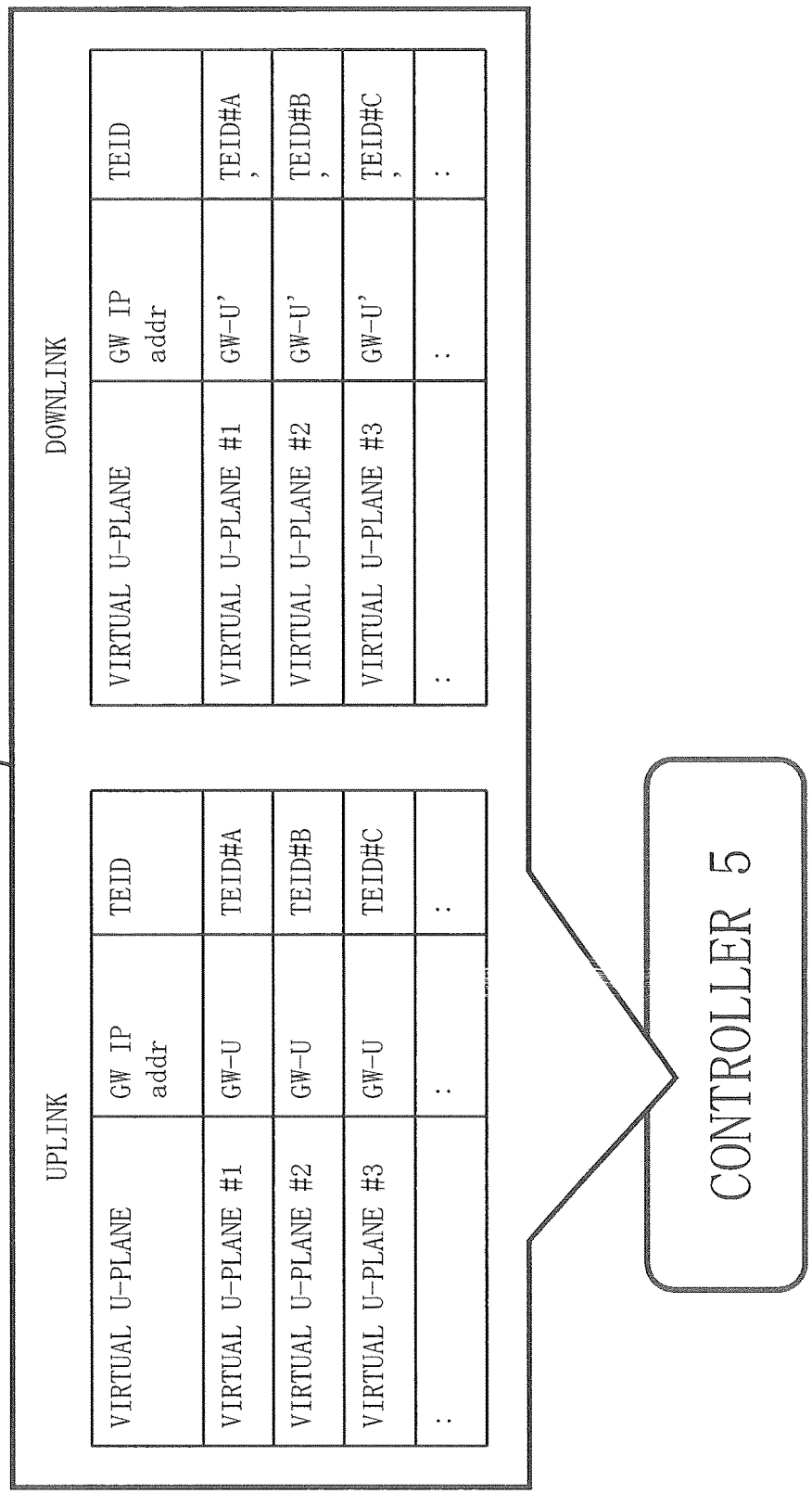
FIG. 17 is a structural diagram showing a second example of the routing information DB at the controller according to the third exemplary embodiment of the present invention.

As illustrated in FIG. 17, management information to be stored in the routing information DB 50 of the controller 5 is information that the controller 5 manages for the virtual gateway 3A functioning as an S-GW.

For instance, the controller 5 manages communication path information and information concerning a virtual U-plane 31 associated with a communication path that is identified by the communication path information. For example, the communication path information includes an IP address assigned to a virtual U-plane ("GW IP addr" in FIG. 17) and a communication path identifier ("TEID" in FIG. 17). The controller 5 manages, for example, the above-mentioned GW IP addr and TEID as communication path information for uplink communication. The communication path information may also include information concerning a virtual U-plane 31 associated with a communication path (e.g., identification information of a virtual U-plane; information shown as "VIRTUAL U-PLANE" in FIG. 17).

The controller 5 manages, for example, the above-mentioned GW IP addr and TEID as communication path information for downlink communication. The communication path information may also include information concerning a virtual U-plane 31 associated with a communication path (e.g., identification information of a virtual U-plane; information shown as "VIRTUAL U-PLANE" in FIG. 17). For example, the controller 5 obtains the communication path information from a virtual C-plane 30.

As illustrated in FIG. 17, an IP address is not assigned to each virtual U-plane 31, but a common IP address ("GW IP addr") is assigned to the virtual U-planes. In the example of FIG. 17, IP address "GW-U" for uplink and IP address "GW-U'" for downlink are assigned to the virtual U-planes. Note that multiple IP addresses (e.g., "GW-U#1" and "GW-U#2", and "GW-U'#1" and "GW-U'#2") may be assigned to the virtual U-planes. For example, "GW-U#1" and "GW-U#1" are assigned to virtual U-planes #1-#n, and "GW-U#2" and "GW-U'#2" are assigned to virtual U-planes #m-#x.

3.7) Control Information at Communication Device (Second Example)

Figure 18:
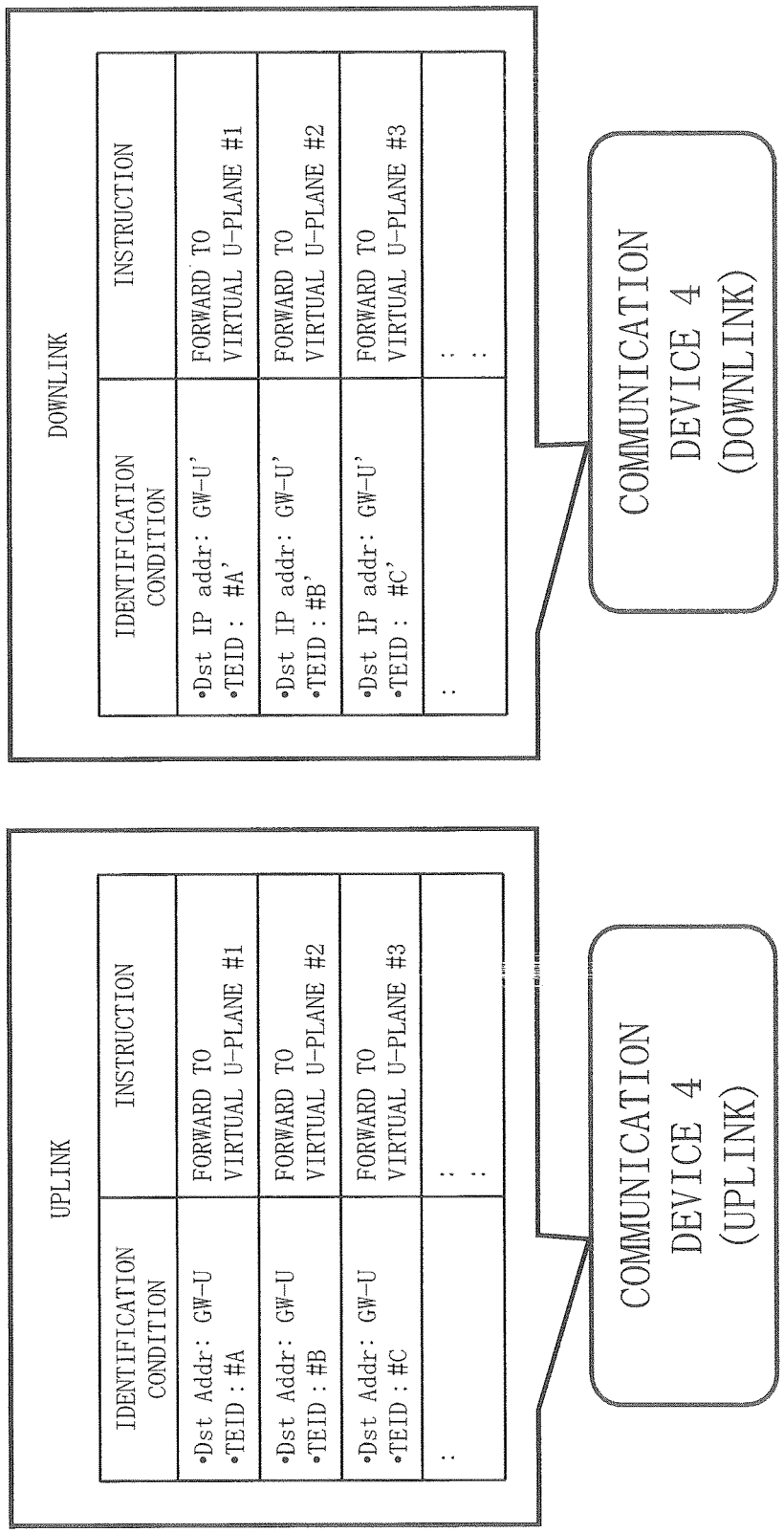
FIG. 18 is a structural diagram showing a second example of the routing information DB at the communication device according to the third exemplary embodiment of the present invention.

As illustrated in FIG. 18, the controller 5 can set control information in the communication devices 4.

For example, the controller 5 notifies, as control information, an instruction to process a received packet to the communication device 4 that processes uplink communication. The communication device 4 processes the received packet in accordance with the notified control information. For example, the control information notified by the controller 5 instructs the communication device 4 to identify a communication path to which the received packet belongs, based on the IP address assigned to the virtual U-planes ("GW IP addr") and a TEID, and to forward the received packet to a virtual U-plane 31 associated with the identified communication path.

Referring to FIG. 18, the control information to be notified to the communication device 4 for uplink communication includes, for example, a "matching key" and an "instruction". The "matching key" indicates a condition to identify a packet based on the IP address for the U-planes ("GW IP addr"), which is the destination address of the packet, and on a TEID. The "instruction" indicates a method for processing the packet that matches the condition indicated by the "matching key". For example, when a packet with destination address "GW-U" and TEID "#A" is identified, this packet is instructed to be forwarded to the "virtual U-plane #1".

For example, the controller 5 notifies, as control information, an instruction to process a received packet to the communication device 4 that processes downlink communication. The communication device 4 processes the received packet in accordance with the notified control information. For example, the control information notified by the controller 5 instructs the communication device 4 to identify a communication path to which the received packet belongs, based on the IP address assigned to the U-planes ("GW IP addr") and on a TEID, and to forward the received packet to a virtual U-plane 31 associated with the identified communication path.

Referring to FIG. 18, the control information to be notified to the communication device 4 for downlink communication includes, for example, a "matching key" and an "instruction". The "matching key" indicates a condition to identify a packet based on the IP address for the U-planes ("GW IP addr"), which is the destination address of the packet, and on a TEID. The "instruction" indicates a method for processing the packet that matches the condition indicated by the "matching key". For example, when a packet with destination address "GW-U'" and TEID "#A'" is identified, this packet is instructed to be forwarded to the "virtual U-plane #1".

3.8) Communication Path Control Operation (Second Example)

Figure 19:
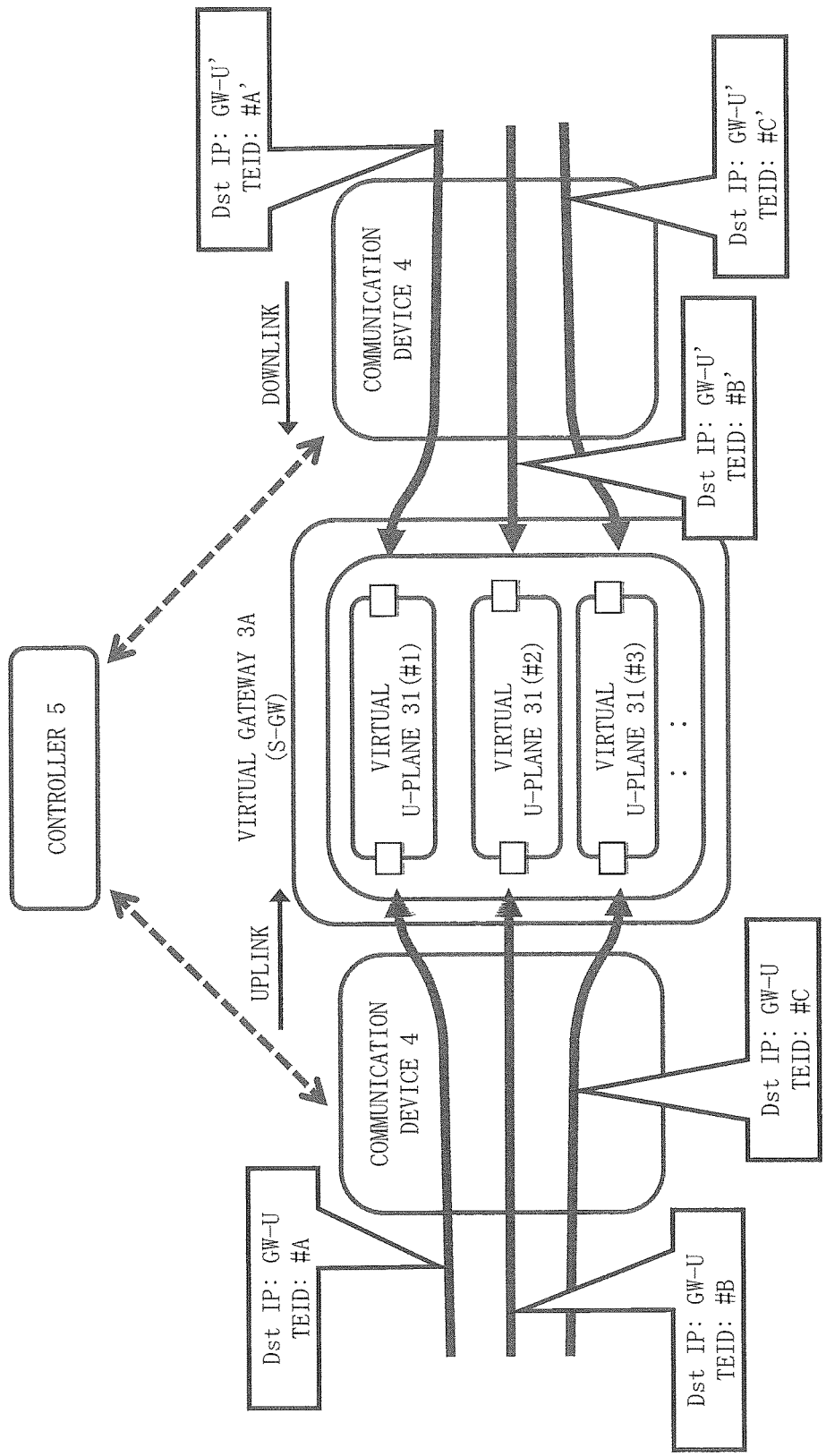
FIG. 19 is a schematic system architecture diagram for describing a second example of operation of the communication system according to the third exemplary embodiment of the present invention.

Referring to FIG. 19, the communication devices 4 forward a received packet to a virtual U-plane 31 in accordance with the control information illustrated in FIG. 18. More specifically, the communication devices 4 search for a "matching key" corresponding to a received packet and, when a matched "matching key" is retrieved, forward the received packet to a virtual U-plane 31 in accordance with an "instruction" corresponding to that "matching key".

At the uplink-side communication device 4, a packet addressed to the gateway 3 (a packet with Dst Addr "GW-U") is forwarded to a virtual U-plane 31 according to a TEID. In the example of FIG. 19, a packet with TEID "#A" is forwarded to the virtual U-plane #1, a packet with TEID "#B", to the virtual U-plane #2, and a packet with TEID "#C", to the virtual U-plane #3.

At the downlink-side communication device 4, a packet addressed to the gateway 3 (a packet with Dst Addr "GW-U'") is forwarded to a virtual U-plane 31 according to a TEID. In the example of FIG. 19, a packet with TEID "#A'" is forwarded to the virtual U-plane #1, a packet with TEID "#B'", to the virtual U-plane #2, and a packet with TEID "#C'", to the virtual U-plane #3.

Note that although the above-described examples shown in FIGS. 14 to 19 illustrate examples for virtual U-planes, the present invention is also applicable to virtual C-planes.

Moreover, in the third exemplary embodiment, control of a packet directed to a virtual U-plane is described. However, the controller 5 may also perform control of a packet that has passed through a virtual U-plane. It is conceivable that control of a packet that has passed through a virtual U-plane is performed, for example, based on a destination IP address.

Further, in the third exemplary embodiment, examples are illustrated in which a communication path is assigned to a virtual C-plane and virtual U-plane. However, a communication path may be assigned to a virtual gateway 3A.

Furthermore, in the third exemplary embodiment, examples are illustrated in which a P-GW and an S-GW operate individually. However, the functions of both a P-GW and an S-GW may coexist on a single virtual U-plane.

3.9) Communication Path Control Operation (Third Example)

In the above-described examples, it is illustrated that a common IP address is assigned to the virtual U-planes included in the virtual gateway 3A. However, the present invention is not limited to these examples. For example, the present invention can be also implemented in an example where NAT (Network Address Translation) is used, as illustrated in FIG. 20.

Figure 20:
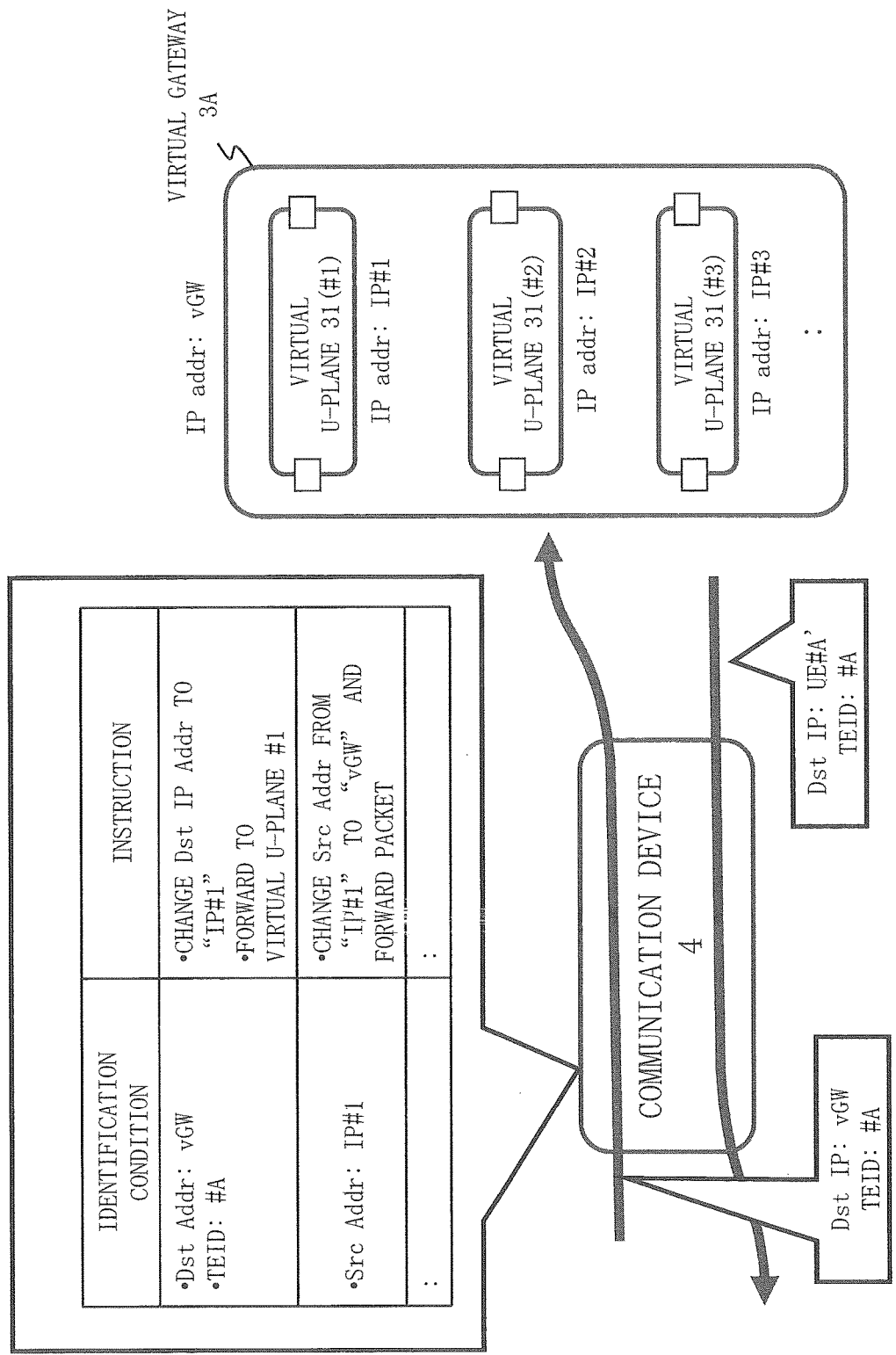
FIG. 20 is a schematic system architecture diagram for describing a third example of operation of the communication system according to the third exemplary embodiment of the present invention.

Referring to FIG. 20, it is assumed that IP address "vGW" is assigned to the virtual gateway 3A and different IP addresses (e.g., "IP#1") are assigned to the virtual U-planes, respectively.

A communication device 4, when receiving a packet with destination address "vGW", translates the destination address, based on a TEID in the packet. For example, when the TEID is "#A", the communication device 4 translates the destination address "vGW" into the IP address of a virtual U-plane #1, "IP#1", which is associated with TEID "#A".

The communication device 4, when receiving a packet whose source address is the IP address of a virtual U-plane, translates the source address into the IP address of the virtual gateway 3A, "vGW".

Note that when NAT is performed, a MAC address may be also translated together with the IP address. In this case, MAC address "vGW_MAC" is assigned to the virtual gateway 3A, and different MAC addresses (e.g., "MAC#1") are assigned to the virtual U-planes, respectively.

The communication device 4 conceals the IP address of a virtual U-plane through NAT as in the example of FIG. 20, whereby it is possible to avoid a communication path reconfiguration procedure even when a virtual U-plane associated with a communication path is changed.

3.10) Advantageous Effects

According to the third exemplary embodiment of the present invention, a common IP address is assigned to the virtual U-planes or virtual C-planes as in the first exemplary embodiment. Accordingly, for example, even if an additional virtual U-plane 31 to be included in the U-plane is installed, it is possible to conceal switching between gateways 3 associated with communication paths from the mobile terminal 1, and to avoid a communication path reconfiguration procedure.

4. Fourth Exemplary Embodiment

According to a fourth exemplary embodiment of the present invention, packet routing policies at communication devices 4 or virtual switches 4A are updated. The present exemplary embodiment is also applicable to any technique disclosed in the first, second or third exemplary embodiment. Hereinafter, various examples are illustrated in which packet routing policies at the communication devices 4 or virtual switches 4A are updated.

4.1) Routing Policy Update (First Example)

Figure 21:
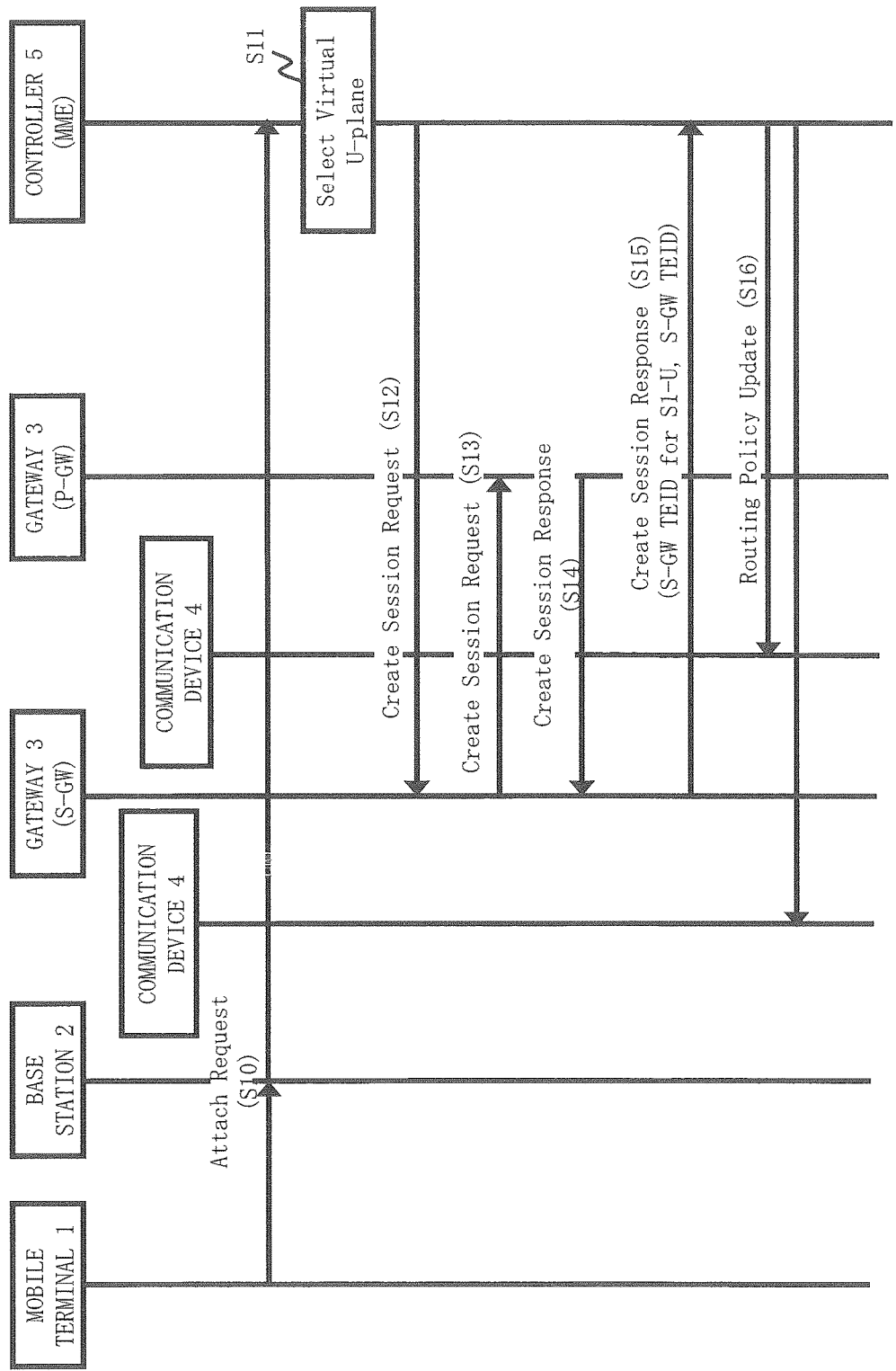
FIG. 21 is a sequence diagram showing a first example of operation of a communication system according to a fourth exemplary embodiment of the present invention.

A routing policy update sequence illustrated in FIG. 21 is a procedure for updating a packet routing policy, in a sequence ("Attach Procedure") disclosed in an LTE-related standardization specification (3GPP TS 23.401 V12.1.0).

The "Attach Procedure" is disclosed in sub-chapter 5.3.2 of the above standardization specification. The attach procedure shown in FIG. 21 illustrates parts relevant to the present exemplary embodiment, of the sequence described in the above standardization specification, omitting the details of the other parts of the sequence. Note that upon completion of the attach procedure, a communication path for a mobile terminal 1 to perform communication is configured.

Referring to FIG. 21, a controller 5 operates as a MME in an LTE system. Alternatively, the functionality of the controller 5 illustrated in the above-described exemplary embodiments is added to a MME in an LTE system. Hereinafter, such a MME to which the functionality of the controller 5 is added will be represented as "MME 5".

When the MME 5 receives an attach request from a mobile terminal 1 via an eNB (base station 2) (Operation S10), the attach procedure is executed in the system. For example, in response to the start of the attach procedure, the MME 5 selects a virtual U-plane to assign to a communication path that will be configured through the attach procedure (Operation S11).

The MME 5 sends a "Create Session Request" message to a gateway 3 (S-GW) (Operation S12). The "Create Session Request" is a message for the MME 5 to request the S-GW to configure a communication path. In this example, the MME 5 selects an S-GW and a P-GW, assigns an ID (e.g., an EPS bearer ID) corresponding to the communication path of the mobile terminal 1, and notifies the S-GW, by the "Create Session Request" message, of information about the gateways, the ID assigned to the communication path, and QoS-related information corresponding to the communication path (a QCI or the like).

The S-GW notifies the other gateway 3 (P-GW), by a "Create Session Request" message, of the communication path ID, the QoS-related information corresponding to the communication path (a QCI or the like) and the like (Operation S13). The P-GW, when receiving the "Create Session Request" message, returns a "Create Session Response" message to the S-GW (Operation S14).

In response to the "Create Session Response" message received from the P-GW, the S-GW sends a "Create Session Response" message to the MME 5 (Operation S15). Through this "Create Session Response" message, for example, an S-GW TEID for S1-U interface and an S-GW TEID for S5/S8 interface are notified to the MME 5, and an S-GW address to be used for the communication path is also notified to the MME 5. The S-GW address to be used for the communication path is, for example, a common IP address for the virtual U-planes included in the S-GW.

The MME 5 sets packet routing policies ("Routing Policy" in FIG. 21) for the communication devices 4, based on the S-GW TEIDs and the S-GW address notified from the S-GW and sends them to the communication devices 4 (Operation S16). Note that the packet routing policies are, for example, the control information illustrated in the above-described third exemplary embodiment (i.e., the control information that is set in the communication devices 4 by the controller 5). For example, the MME 5 sets the packet routing policies illustrated in FIG. 18 in the communication devices 4, based on the information notified from the S-GW. For example, a packet routing policy based on the TEID for S1-U interface is set in the uplink-side communication device 4, while a packet routing policy based on the TEID for S5/S8 interface is set in the downlink-side communication device 4.

Although the gateways 3 and the communication devices 4 are illustrated as discrete devices in the example of FIG.

21, they are not limited to this configuration. For example, it is also possible that a communication device 4 including a virtual switch 4A and virtual gateways 3A as in the example of FIG. 5 operates in accordance with a packet routing policy notified from the controller 5.

4.2) Routing Policy Update (Second Example)

Figure 22:
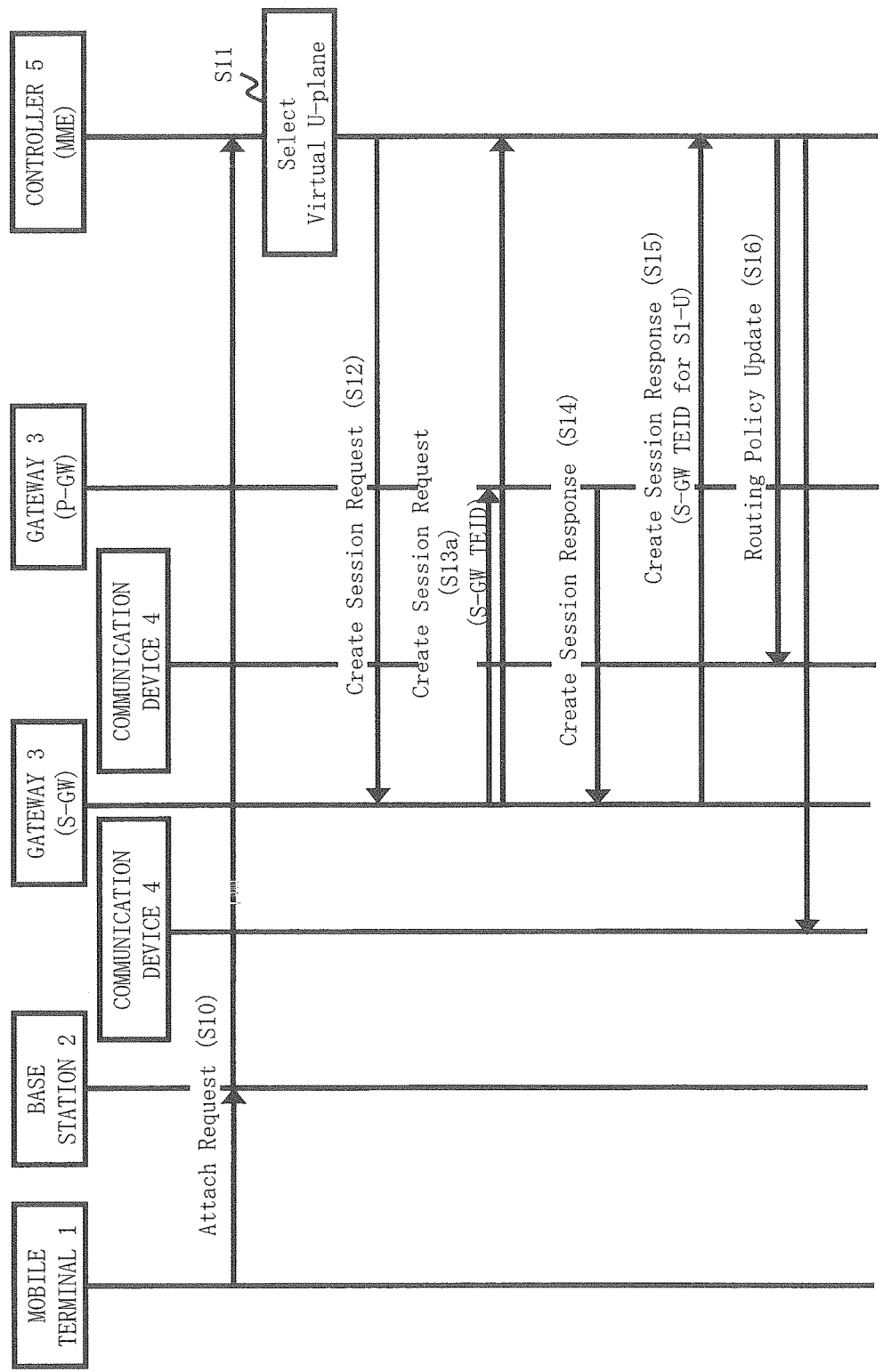
FIG. 22 is a sequence diagram showing a second example of operation of the communication system according to the fourth exemplary embodiment of the present invention.

In a routing policy update sequence illustrated in FIG. 22, an operation (S13a) in which the S-GW notifies the MME 5 of a S-GW TEID for S5/S8 interface is different from the operation (S13) in the sequence illustrated in FIG. 21.

Referring to FIG. 22, the S-GW notifies the P-GW of a "Create Session Request" message and also notifies the MME 5 of an S-GW TEID for S5/S8 interface (Operation S13a). For another method, it is also possible that the P-GW, in response to the "Create Session Request" message received from the S-GW, notifies the MME 5 of an S-GW TEID for S5/S8 interface.

Although the gateways 3 and the communication devices 4 are illustrated as discrete devices in the example of FIG. 22, they are not limited to this configuration. For example, it is also possible that a communication device 4 including a virtual switch 4A and virtual gateways 3A as in the example of FIG. 5 operates in accordance with a packet routing policy notified from the controller 5.

4.3) Routing Policy Update (Third Example)

Figure 23:
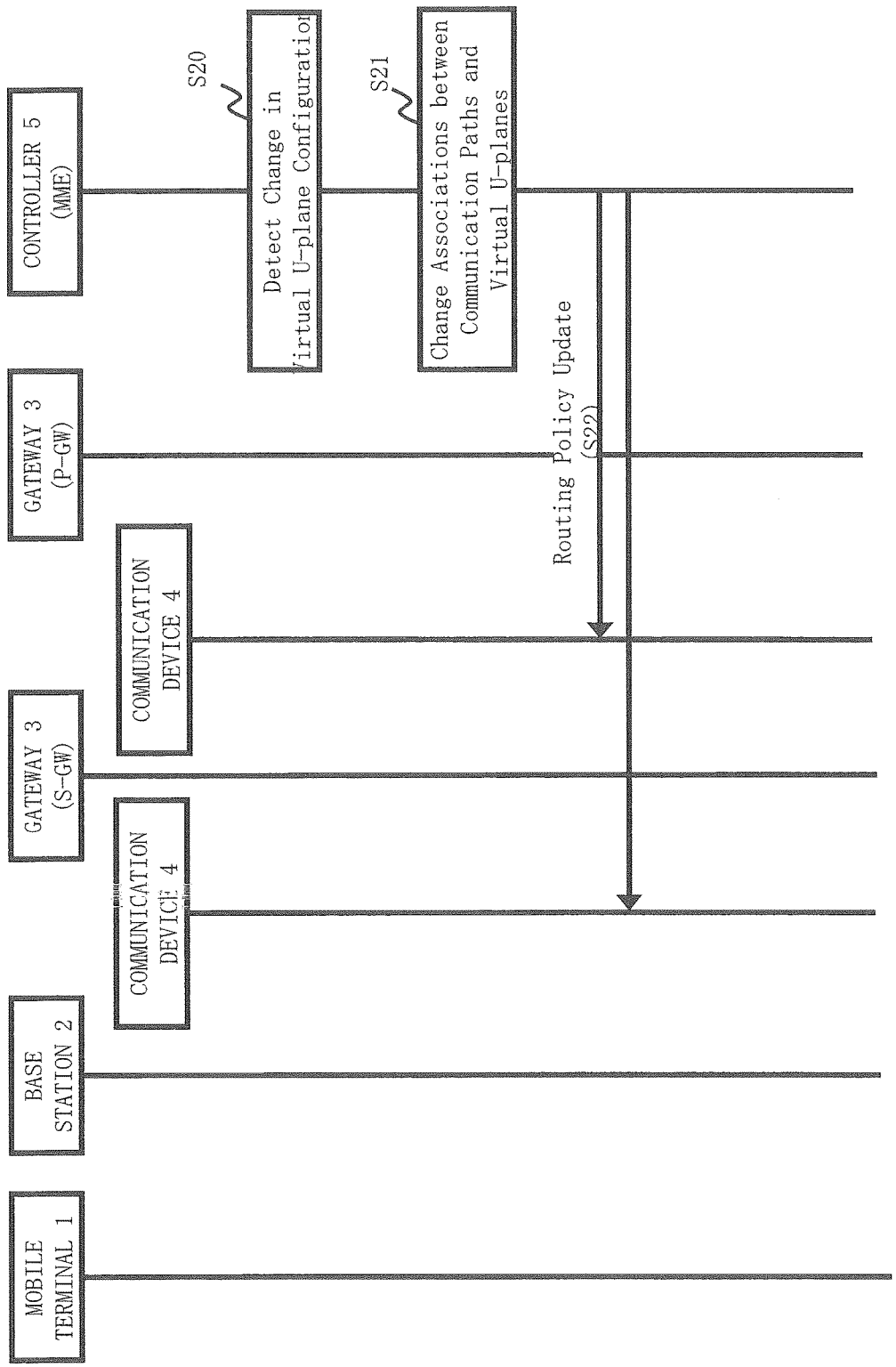
FIG. 23 is a sequence diagram showing a third example of operation of the communication system according to the fourth exemplary embodiment of the present invention.

In a routing policy update sequence illustrated in FIG. 23, packet routing policies at the communication devices 4 are updated, according to a change in the configurations of the virtual U-planes 31 in the virtual gateways 3A. A change in the configurations of the virtual U-planes 31 means the installation of a virtual U-plane 31 caused by activating a new VM, or the uninstallation of a virtual U-plane 31 caused by stopping a VM.

The MME 5, when detecting a change in the configurations of the virtual U-planes 31 (Operation S20), changes associations between communication paths and virtual U-planes 31 (Operation S21). For example, the MME 5 chooses a communication path to assign to a virtual U-plane 31 newly installed in a virtual gateway 3A. Moreover, for example, the MME 5 assigns a communication path that has been assigned to a virtual U-plane 31 uninstalled from a virtual gateway 3A, to another virtual U-plane 31.

For a factor causing an update of the packet routing policies at the communication devices 4 or virtual switches 4A, it is also possible to use, for example, the load statuses of the virtual U-planes 31 included in the virtual gateways 3A, not a change in the configurations of the virtual U-planes 31 in the virtual gateways 3A. There may be cited, as an example, control for switching a communication path from a virtual U-plane 31 with heavy load to a virtual U-plane 31 with light load. The MME 5 updates the packet routing policies at the communication devices 4, based on a change in associations between communication paths and virtual U-planes 31 (Operation S22).

4.4) Routing Policy Update (Fourth Example)

Figure 24:
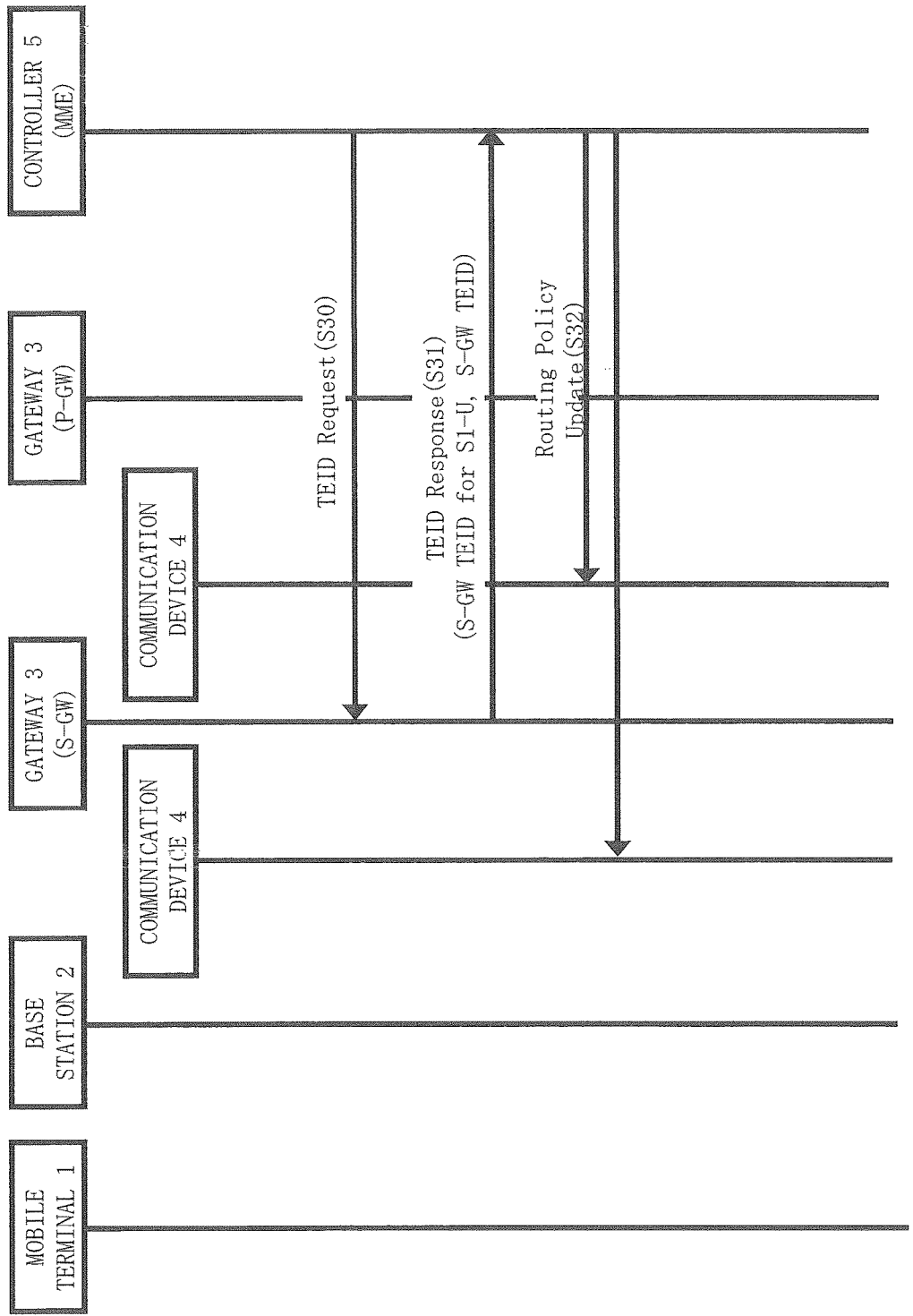
FIG. 24 is a sequence diagram showing a fourth example of operation of the communication system according to the fourth exemplary embodiment of the present invention.

In a packet routing policy update sequence illustrated in FIG. 24, the MME 5 obtains information from a gateway 3 (S-GW) to update packet routing policies.

Referring to FIG. 24, the MME 5 requests from the S-GW the TEID(s) of a communication path established through, for example, the attach procedure according to the above-mentioned standardization specification (TS 23.401) (Operation S30).

In response to the TEID request, the S-GW notifies the TEID(s) to the MME 5 by using a TEID response (Operation S31). For example, an S-GW TEID for S1-U interface and an S-GW TEID for S5/S8 interface are notified to the MME 5. At this time, the S-GW notifies the TEIDs of the communication path established through the attach procedure according to the above-mentioned standardization specification (TS 23. 401).

The MME 5 chooses a virtual U-plane 31 to assign to the TEIDs notified from the S-GW and notifies this to the communication devices 4, thereby updating the packet routing policies at the communication devices 4 (Operation S32). That is, the MME 5 updates the packet routing policies at the communication devices 4 so that packets corresponding to the TEIDs notified from the S-GW will be forwarded to the virtual U-plane 31 assigned to these TEIDs.

Although the gateways 3 and the communication devices 4 are illustrated as discrete devices in the example of FIG. 24, they are not limited to this configuration. For example, it is also possible that a communication device 4 including a virtual switch 4A and virtual gateways 3A as in the example of FIG. 5 operates in accordance with a packet routing policy notified from the controller 5.

4.5) Routing Policy Update (Fifth Example)

Figure 25:
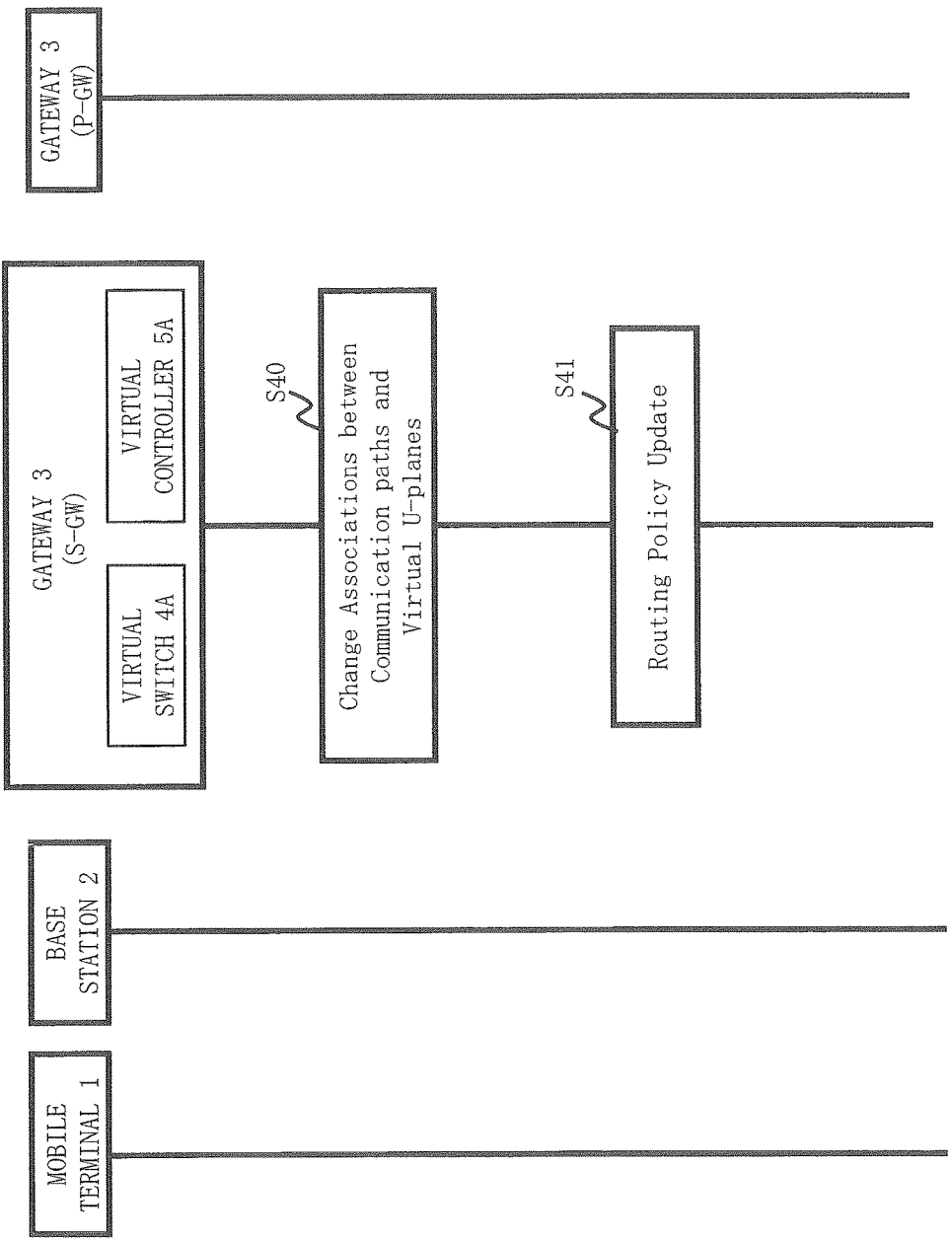
FIG. 25 is a sequence diagram showing a fifth example of operation of the communication system according to the fourth exemplary embodiment of the present invention.

A routing policy update sequence illustrated in FIG. 25 is a procedure for updating a packet routing policy in a case where a virtual gateway 3A has the functions of a communication device 4 and a controller 5 (e.g., the configuration illustrated in FIG. 13). That is, a gateway 3 (S-GW) shown in FIG. 25 includes a virtual switch 4A and a virtual controller 5A.

Referring to FIG. 25, the virtual controller 5A of the S-GW changes associations between communication paths and virtual U-planes 31 (Operation S40). For example, the route of a communication path #A is switched from a virtual U-plane 31 (#1) to a virtual U-plane 31 (#2).

The virtual controller 5A updates the packet routing policy at the virtual switch 4A, according to a change in associations between communication paths and virtual U-planes 31 (operation S41). For example, the virtual controller 5A instructs the virtual switch 4A to switch the route of the communication path #A associated with the virtual U-plane 31 (#1) to a route via the virtual U-plane 31 (#2).

4.6) Routing Policy Update (Sixth Example)

Figure 26:
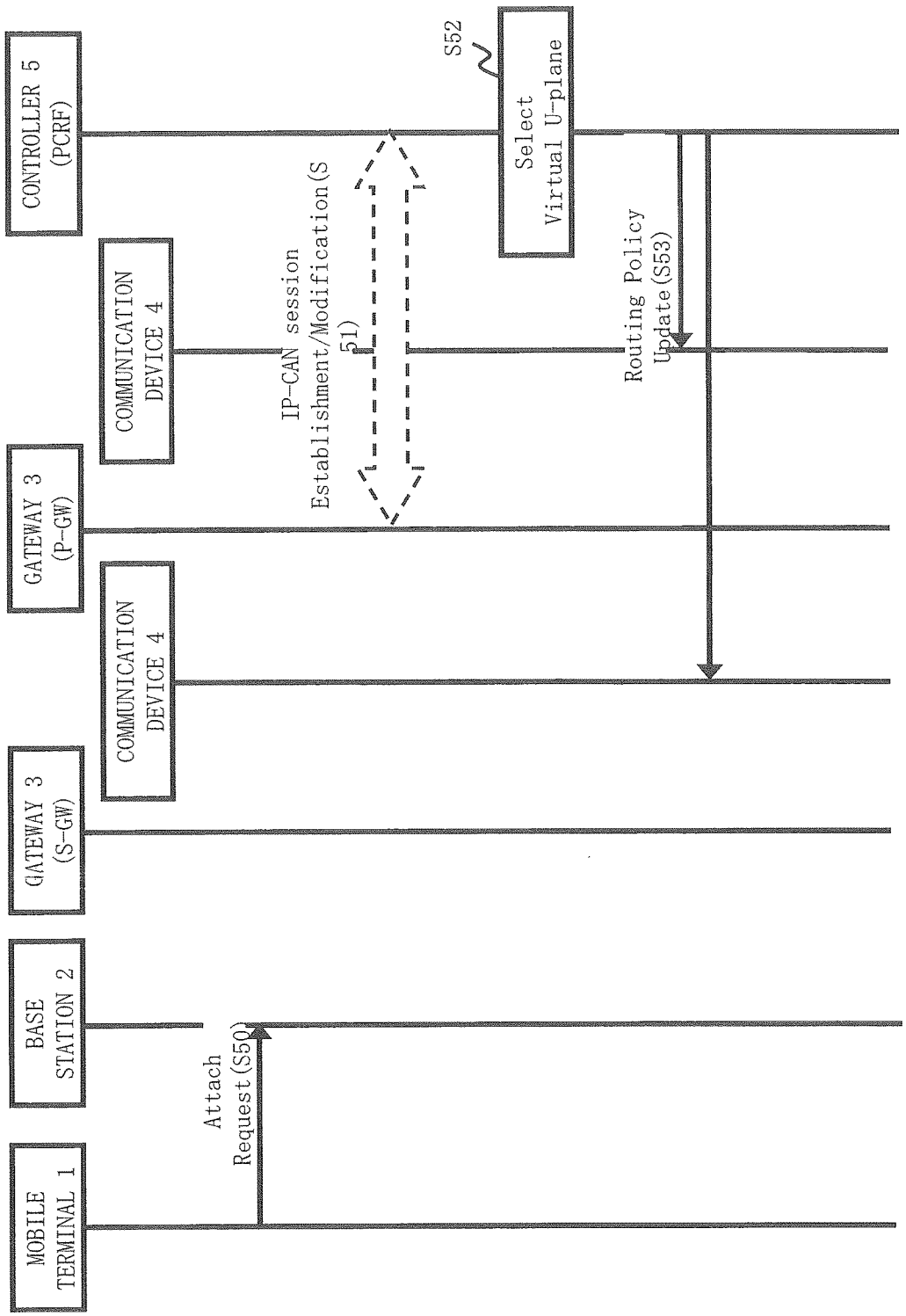
FIG. 26 is a sequence diagram showing a seventh example of operation of the communication system according to the fourth exemplary embodiment of the present invention.

FIG. 26 shows a procedure for updating packet routing policies in the sequence ("Attach Procedure") disclosed in the LTE-related standardization specification (3GPP TS 23.401 V12.1.0). The "Attach Procedure" is disclosed in sub-chapter 5.3.2 of the above standardization specification.

A controller 5 illustrated in FIG. 26 operates as a PCRF in an LTE system. That is, the functionality of the controller 5 illustrated in the above-described exemplary embodiments is added to a PCRF in an LTE system. In other words, in the attach procedure (the procedure described in TS 23.401) for a mobile terminal 1, the controller 5 (PCRF) sets packet routing policies in communication devices 4. Hereinafter a PCRF to which the functionality of the controller 5 is added will be represented as "PCRF 5".

The PCRF 5 and a gateway 3 (P-GW) execute "IP-CAN (IP Connectivity) Session Establishment/Modification", if necessary, in the attach procedure (Operation S51). The "IP-CAN (IP Connectivity) Session Establishment/Modification" is a procedure for establishing an IP connection to an external network (e.g., IMS (IP Multimedia Subsystem)) and the like.

For example, in the "IP-CAN (IP Connectivity) Session Establishment/Modification" procedure, the PCRF 5 selects a virtual U-plane 31 to assign to a communication path that will be established through the attach procedure (Operation S52).

The PCRF 5 sets packet routing policies in the communication devices 4 so that a packet belonging to the communication path to be established through the attach procedure will be forwarded to the virtual U-plane 31 assigned to this communication path (Operation S53). Note that the PCRF 5 is assumed to have obtained P-GW-related TEIDs.

Although the gateways 3 and the communication devices 4 are illustrated as discrete devices in the example of FIG. 26, they are not limited to this configuration. For example, it is also possible that a communication device 4 including a virtual switch 4A and virtual gateways 3A as in the example of FIG. 5 operates in accordance with a packet routing policy notified from the controller 5.

4.7) Routing Policy Update (Seventh Example)

Figure 27:
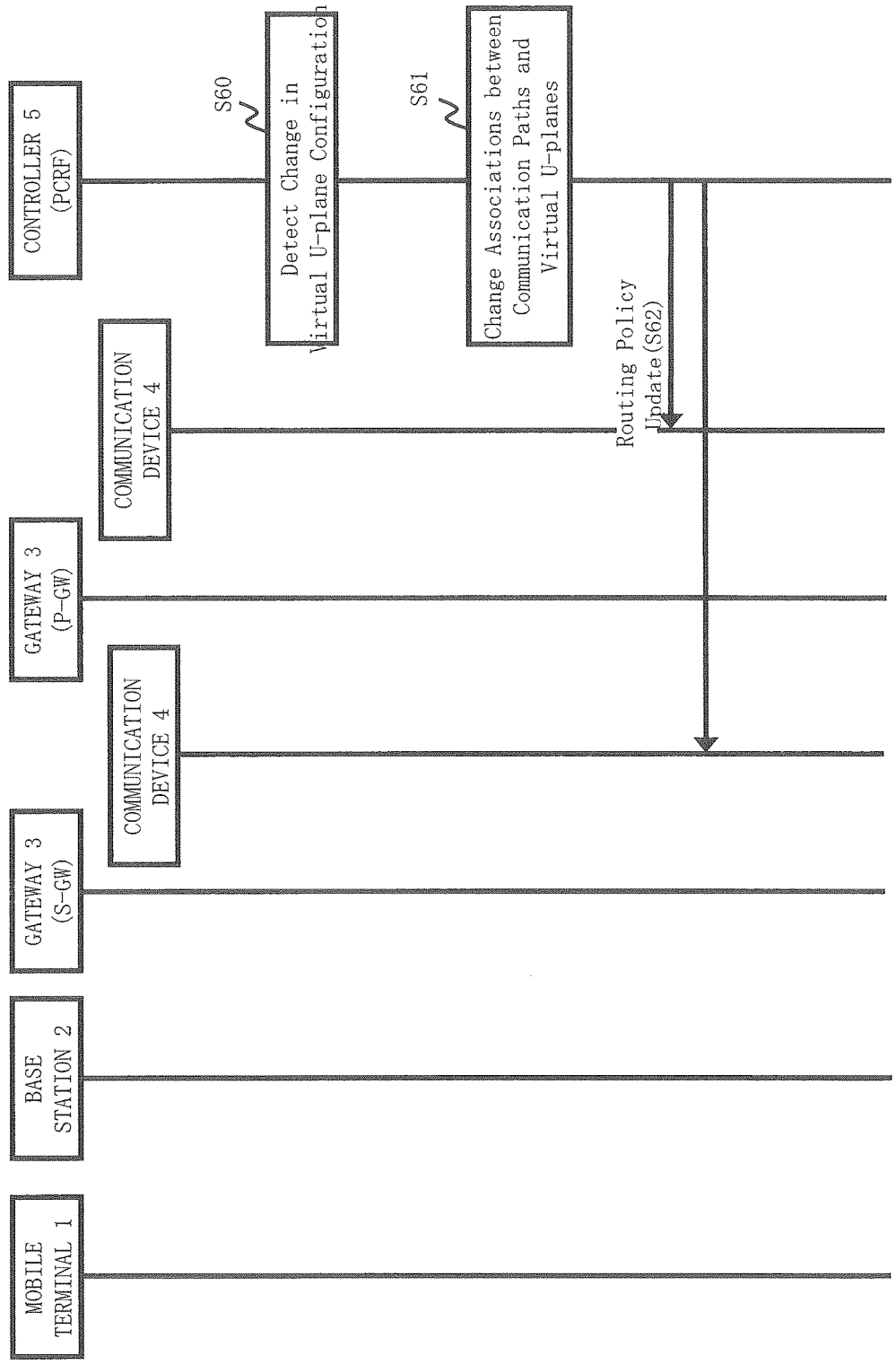
FIG. 27 is a sequence diagram showing an eighth example of operation of the communication system according to the fourth exemplary embodiment of the present invention.

It is assumed that gateways 3 in FIG. 27 are configured as virtual gateways 3A on a server. Moreover, in FIG. 27, the functionality of the controller 5 illustrated in the above-described exemplary embodiments is added to a PCRF in an LTE system as in the example of FIG. 26, and such a PCRF will therefore be represented as "PCRF 5" below.

Referring to FIG. 27, packet routing policies at the communication devices 4 or virtual switches 4A are updated, according to a change in the configurations of the virtual U-planes 31 in the virtual gateways 3A. A change in the configurations of the virtual C-planes 31 means, for example, the installation of a virtual U-plane 31 caused by activating a new VM, or the uninstallation of a virtual U-plane 31 caused by stopping a VM.

For a factor causing an update of the packet routing policies at the communication devices 4 or virtual switches 4A, it is also possible to use, for example, the load statuses of the virtual U-planes 31 included in the virtual gateways 3A, not only a change in the configurations of the virtual U-planes 31 in the virtual gateways 3A. In this case, a communication path is switched from a virtual U-plane 31 with heavy load to a virtual U-plane 31 with light load.

The PCRF 5, when detecting a change in the configurations of the virtual U-planes 31 (Operation S60), changes associations between communication paths and virtual U-planes 31 (Operation S61). For example, when a virtual U-plane 31 is newly installed in a virtual gateway 3A, the PCRF 5 chooses a communication path to assign to this virtual U-plane 31. Moreover, for example, when a virtual U-plane 31 is uninstalled from a virtual gateway 3A, the PCRF 5 assigns a communication path that has been assigned to this virtual U-plane 31 to another virtual U-plane 31. The PCRF 5 updates the packet routing policies at the communication devices 4 or virtual switches 4A, based on the change in associations between communication paths and virtual U-planes 31 (Operation S62).

4.8) Routing Policy Update (Eighth Example)

Figure 28:
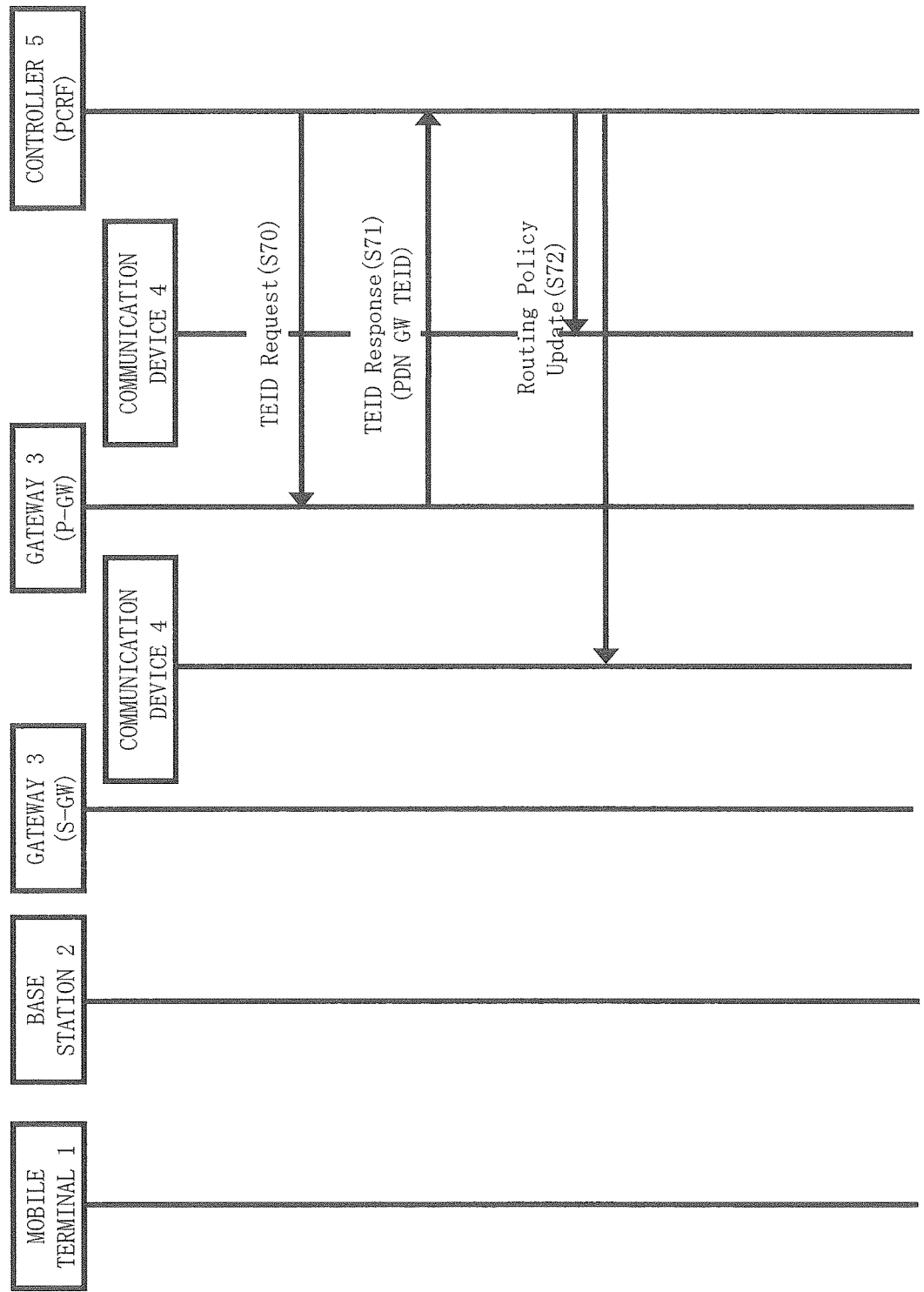
FIG. 28 is a sequence diagram showing a ninth example of operation of the communication system according to the fourth exemplary embodiment of the present invention.

In an example shown in FIG. 28, the PCRF 5 obtains information from a gateway 3 (P-GW) to update packet routing policies.

First, the PCRF 5 requests the TEID of a communication path from the P-GW (Operation S70). For example, the TEID of a communication path established through the attach procedure according to the above-mentioned standardization specification (TS 23.401) is requested.

The P-GW, when receiving the request for the TEID of a communication path, notifies the PCRF 5 of the TEID of the communication path by using a TEID response (Operation S71). For example, the P-GW notifies the PCRF 5 of the P-GW TEID of the communication path established through the attach procedure according to the above-mentioned standardization specification (TS 23.401).

The PCRF 5 chooses a virtual U-plane 31 to assign to the TEID notified from the P-GW and updates the packet routing policies at the communication devices 4 or virtual switches 4A (Operation S72). For example, these packet routing policies are updated so that a packet corresponding to the TEID notified from the P-GW will be forwarded to the virtual U-plane 31 assigned to this TEID.

Although the gateways 3 and the communication devices 4 are illustrated as discrete devices in the example of FIG. 28, they are not limited to this configuration. For example, it is also possible that a communication device 4 including a virtual switch 4A and virtual gateways 3A as in the example of FIG. 5 operates in accordance with a packet routing policy notified from the controller 5.

4.9) Routing Policy Update (Ninth Example)

Figure 29:
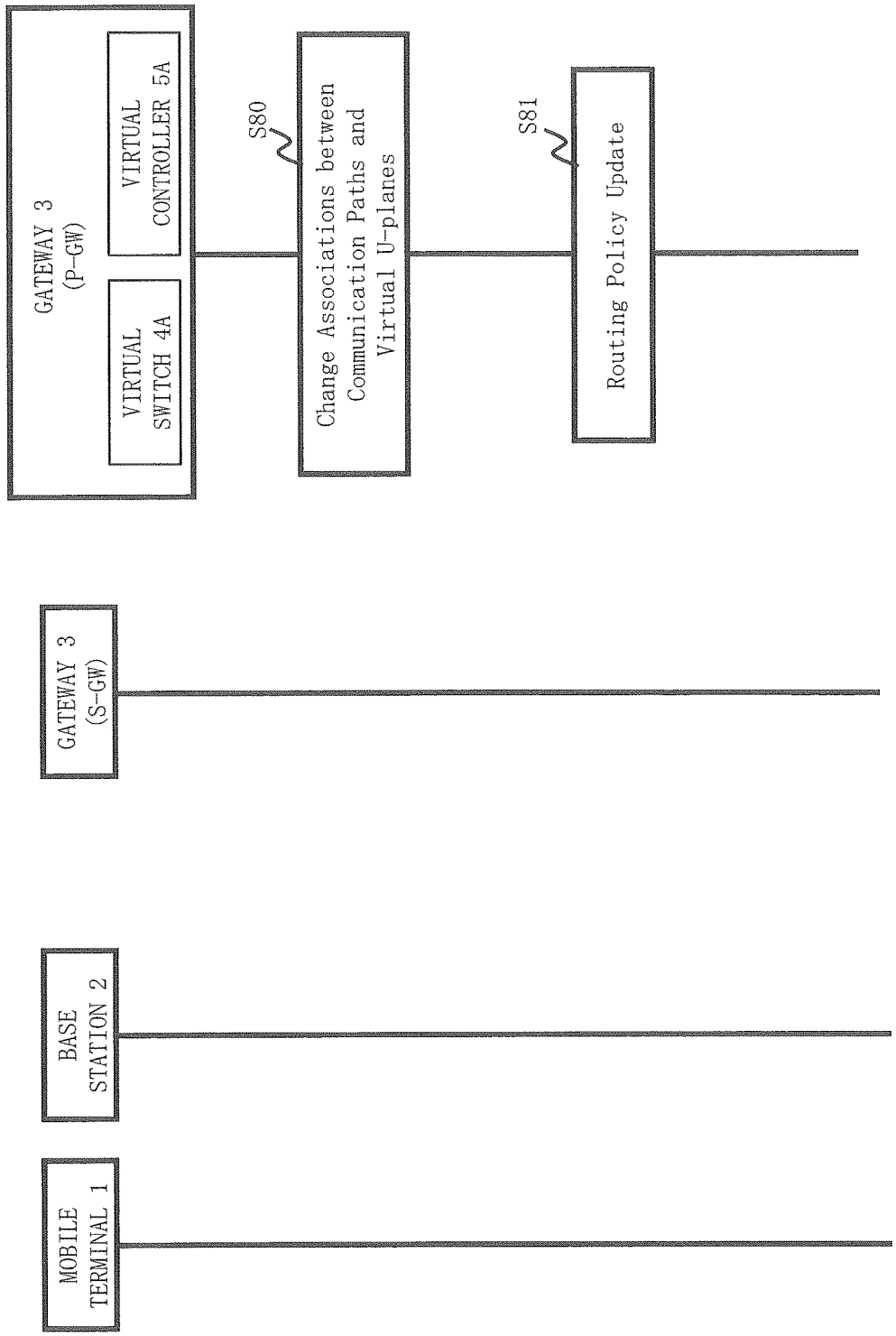
FIG. 29 is a sequence diagram showing a tenth example of operation of the communication system according to the fourth exemplary embodiment of the present invention.

FIG. 29 shows an example of a procedure for updating a packet routing policy in a case where a gateway 3 has the functions of a communication device 4 or virtual switch 4A and a controller 5 (e.g., the configuration of the virtual gateway 3A illustrated in FIG. 13). In the example of FIG. 29, the gateway 3 (P-GW) includes a virtual switch 4A and a virtual controller 5A.

For example, the virtual controller 5A of the P-GW changes associations between communication paths and virtual U-planes 31 (Operation S80). For example, the virtual controller 5A switches the route of a communication path #A from a virtual U-plane 31 (#1) to a virtual U-plane 31 (#2).

The virtual controller 5A updates the packet routing policy at the virtual switch 4A, according to the change in associations between communication paths and virtual U-planes 31 (Operation S81). For example, the virtual controller 5A instructs the virtual switch 4A to switch the route of the communication path #A associated with the virtual U-plane 31 (#1) to a route via the virtual U-plane 31 (#2).

4.10) Advantageous Effects

According to the fourth exemplary embodiment of the present invention, even if a change occurs in the configurations of virtual U-planes, an adaptation can be made by updating a routing policy at a communication device or virtual switch. In that event, since a common IP address is assigned to the virtual U-planes or virtual C-planes as in the first exemplary embodiment, it is possible to conceal changing of a gateway 3 associated with a communication path from a mobile terminal 1, and to avoid communication path reconfiguration.

Moreover, although the fourth exemplary embodiment shows examples of a procedure for updating a packet routing policy with respect to virtual U-planes, the present invention is also applicable to a procedure for updating a packet routing policy with respect to virtual C-planes.

Further, although the fourth exemplary embodiment shows examples in which a communication path is assigned to a virtual C-plane or virtual U-plane, a communication path may be assigned to a virtual gateway 3A.

5. Fifth Exemplary Embodiment

According to a fifth exemplary embodiment of the present invention, a controller controls a communication device in accordance with a control protocol known as OpenFlow. The fifth exemplary embodiment is applicable to any of the technologies disclosed in the above-described first to fourth exemplary embodiments.

In OpenFlow, a communication is recognized as an end-to-end flow, and routing control and the like can be performed in units of flows. Accordingly, communication path control can be performed more flexibly by using OpenFlow in the present invention. Here, a flow is a packet group composed of a series of communication packets having a predetermined property that is identified based on information included in each packet (information on the destination address, source address and the like of a packet).

5.1) System

Figure 30:
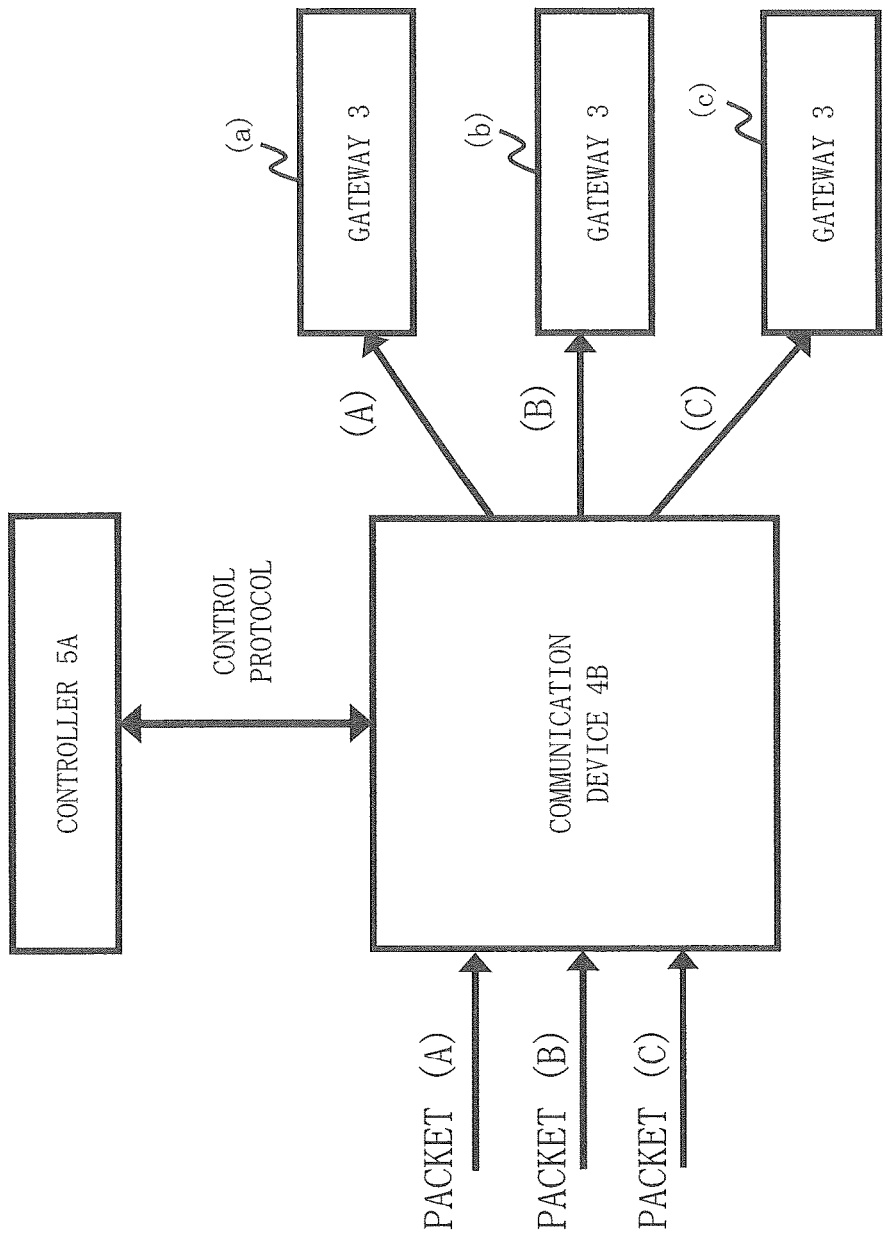
FIG. 30 is a system architecture diagram showing a first example of a communication system according to a fifth exemplary embodiment of the present invention.

FIG. 30 illustrates a system according to the fifth exemplary embodiment of the present invention, which uses the OpenFlow technology. A communication device 4B is a network switch employing the OpenFlow technology and is controlled by a controller 5A in a centralized manner.

A control channel is set up between the communication device 4B and the controller 5A, and the controller 5A controls operation of the communication device 4B through the control channel. This control channel is a communication path to which measures are applied to prevent the interception, falsification and the like of communication.

The controller 5A controls operation of the communication device 4B by setting a processing rule (flow entry) in a flow table of the communication device 4B. A flow entry includes a matching rule to be checked with information included in the header of a packet received by the communication device 4B (e.g., a destination IP address, a VLAN ID and the like), and an instruction, which provides a rule for processing a packet that matches the matching rule.

<Controller>

Figure 31:
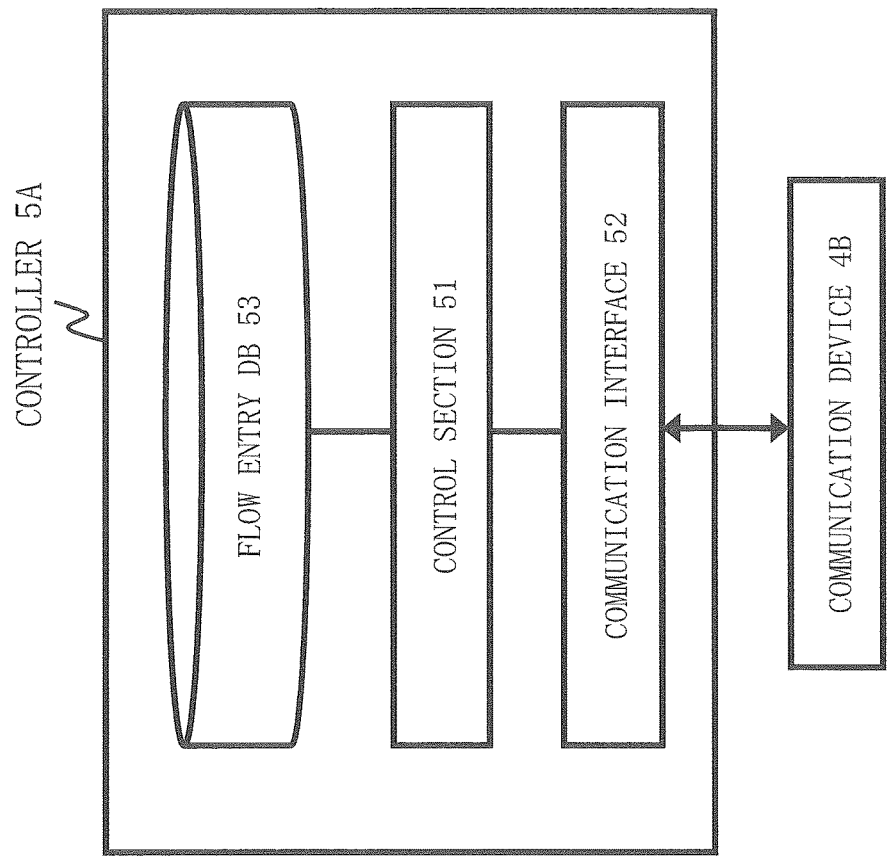
FIG. 31 is a block diagram showing a configuration of a controller according to the fifth exemplary embodiment of the present invention.

Referring to FIG. 31, the controller 5A includes a communication interface 52, a control section 51, and a flow entry DB 53. The communication interface 52 is an interface for communication with the communication device 4B based on the OpenFlow protocol. The control section 51 has a function of generating information to be stored in the flow entry DB 53 and a function of controlling the communication device 4B based on the information stored in the flow entry DB 53. The controller 5A can set a communication path identifier (e.g., a TEID or GRE key) as a matching rule in the device 4B. Although the OpenFlow protocol does not define a communication path identifier as information identifiable as a matching rule, it is possible in the fifth exemplary embodiment of the present invention that the controller 5A sets a communication path identifier as a matching rule.

It is assumed that the flow entry DB 53 illustrated in FIG. 32 includes a matching rule, which is based on a common IP address assigned to multiple virtual U-planes 31 and on a communication path identifier, and an instruction, as illustrated in the third exemplary embodiment.

<Communication Device>

Figure 33:
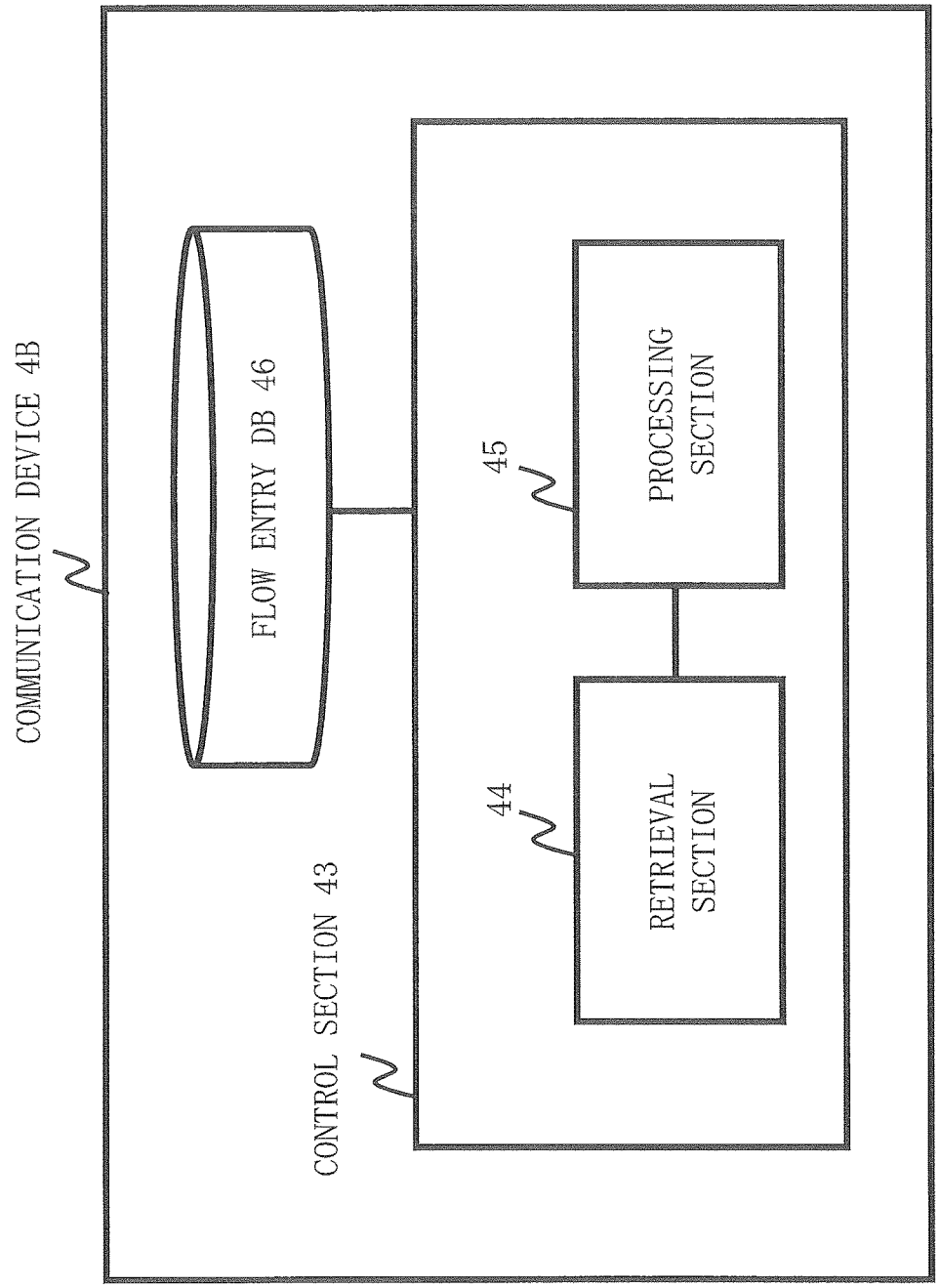
FIG. 33 is a block diagram showing a configuration of a communication device according to the fifth exemplary embodiment of the present invention.

As illustrated in FIG. 33, The communication device 4B includes a control section 43 and a flow entry DB 46 (i.e., a flow table). The control section 43 includes a retrieval section 44 and a processing section 45. The flow entry DB 46 stores a flow entry notified from the controller 5A.

The retrieval section 44, when receiving a packet, retrieves a flow entry corresponding to the received packet from the flow entry DB 46. Extending the OpenFlow protocol, the retrieval section 44 of the communication device 4B is able to search the flow table by using a communication path identifier included in a received packet as a key. Accordingly, the retrieval section 44 retrieves a flow entry corresponding to a communication path identifier in the received packet. That is, an entry is retrieved in which an identifier corresponding to a communication path identifier in the received packet is provided as a matching rule.

In a communication system of LTE or the like, a packet is capsulated to add information such as a communication path identifier to the packet, and so an outer header is added. Accordingly, the retrieval section 44 can retrieve a flow entry corresponding to the received packet from the flow entry DB 46, based on information included in the outer header of the received packet. If a flow entry corresponding to the received packet has not yet been set in the entry DB 46, the retrieval section 44 can inquire of the controller 5A about a flow entry corresponding to the received packet.

The processing section 45 processes the received packet in accordance with an instruction of the flow entry retrieved by the retrieval section 44. Here, the packet is forwarded to a virtual U-plane associated with the communication path identifier in accordance with the instruction as shown in FIG. 32. Note that the processing section 45 can also perform NAT on a destination address in accordance with a processing rule, for example, as in the example of FIG. 20.

6. Sixth Exemplary Embodiment

According to a sixth exemplary embodiment of the present invention, a controller 5 groups communication paths and assigns a group including multiple communication paths to a virtual U-plane 31. The sixth exemplary embodiment is also applicable to any of the technologies disclosed in the above-described first to fifth exemplary embodiments.

6.1) System Outline

Figure 34:
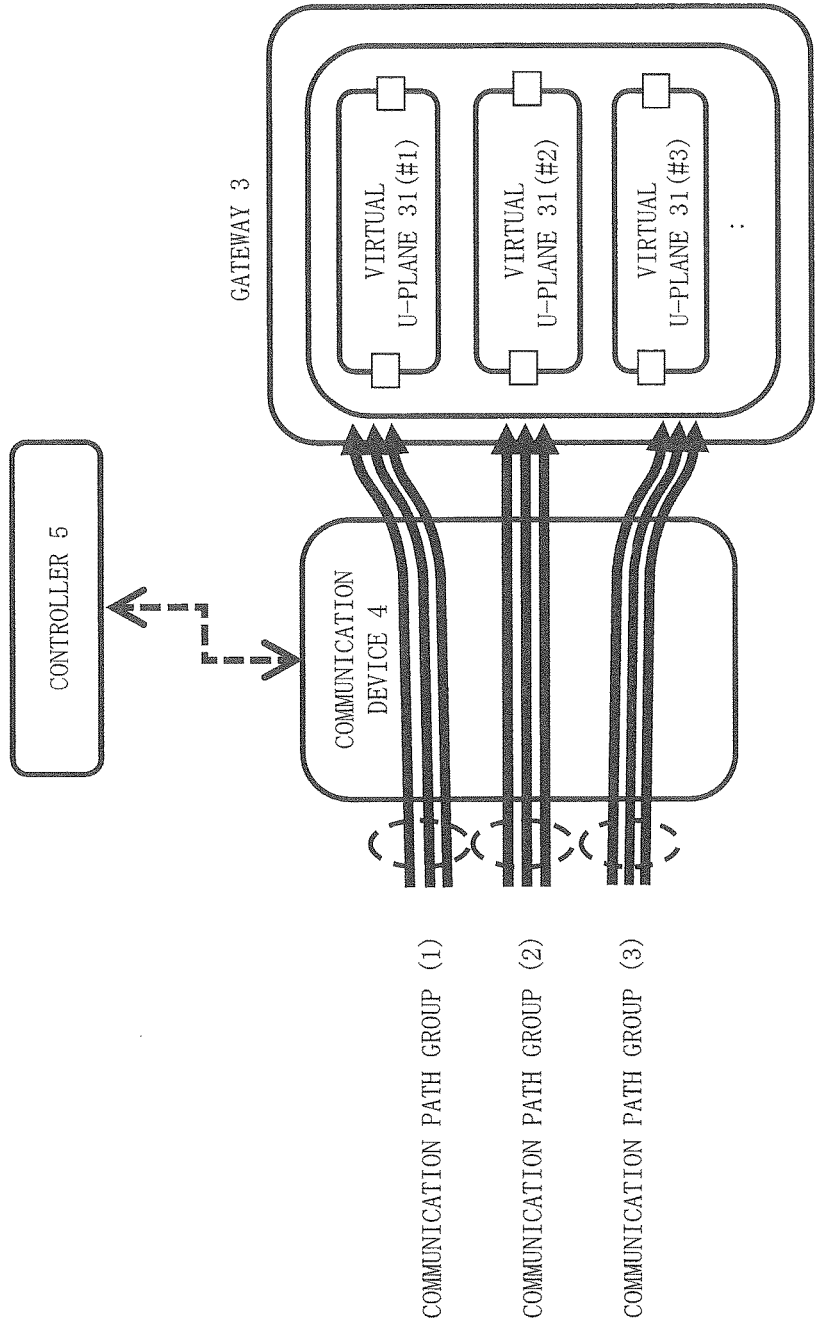
FIG. 34 is a schematic system architecture diagram for describing operation of a communication system according to a sixth exemplary embodiment of the present invention.

Hereinafter, an outline of the sixth exemplary embodiment will be described with reference to FIG. 34. In a system illustrated in FIG. 34, it is assumed that the controller 5 assigns communication paths in units of groups to different virtual U-planes. For example, a communication path group (1) is assigned to a virtual U-plane (#1).

At the controller 5, since communication paths are managed in units of groups, it is easier to manage associations between virtual U-planes 31 and communication paths. For example, the controller 5 can manage virtual U-planes 31 associated with communication paths in units of communication path groups in the routing information DB 50. Note that it is also possible that the controller 5 manages the virtual U-planes 31 illustrated in the first and second exemplary embodiments in units of groups.

6.2) Grouping of Communication Paths

For example, the controller 5 groups communication paths, based on properties of mobile terminals 1 corresponding to each communication path. The following are examples of the property of a mobile terminal 1.

Area where a mobile terminal 1 is residing (E-UTRAN Cell ID or the like)

Characteristic of charging on a mobile terminal 1 (normal charging, prepaid charging, flat rate, or the like)

Communication state of a mobile terminal 1 (whether or not a certain volume of communication is made during a certain period of time)

Operator ID (the ID of an operator of a core network to which a mobile terminal 1 is connecting)

Packet Data Network (PDN) to which a mobile terminal 1 is connecting

Service type that requires chaining after leaving a communication path

QoS characteristic

State of a mobile terminal 1 (IDLE state or CONNECTED state): the IDLE state means, for example, a state where a mobile terminal 1 is not consecutively exchanging control signals for session management and mobility management with a core network, or a state where a radio connection with a base station is released, while the CONNECTED state means, for example, a state where a mobile terminal 1 is consecutively exchanging control signals for session management and mobility management with a core network, or a state where a mobile terminal 1 is wirelessly connecting to a base station.

Note that the above-mentioned properties of a mobile terminal 1 are for illustration. It is also possible that the controller 5 groups communication paths, based on any other property. For example, the controller 5 can group communication paths, based on the UE (User Equipment)-related information among the "EPS Bearer Contexts" disclosed in sub-chapter 5.7 of the standardization specification (3GPP TS 23.401).

The controller 5 can also group communication paths, based on the terms of a contract between a user of a mobile terminal 1 and a carrier. For example, it is possible that the controller 5 groups those communication paths relevant to users who make a contract with a carrier to pay higher fees than other users (e.g., "premium subscribers"), and/or groups those communication paths relevant to users under normal contract.

The controller 5 can also group communication paths, based on location-related information of a mobile terminal 1 (e.g., GPS information or information on a base station to which the mobile terminal 1 is attaching). For example, it is possible to group communication paths corresponding to those mobile terminals that are in proximity to each other, based on their location-related information.

Further, the controller 5 can also group communication paths, based on QoS (Quality of service) information of each communication path. For example, the controller 5 can group communication paths, based on a QCI (Quality Class Indicator) corresponding to each communication path. For example, communication paths corresponding to QCIs whose priorities are lower than a predetermined value are grouped together, and when a new virtual U-plane 31 is installed, the communication paths belonging to this group are assigned to this new virtual U-plane 31. In this case, it is expected that delay or the like occurs in communication involved in these communication paths due to route switching, resulting in lowered users' QoE (Quality of Experience). However, lower-priority communication paths are grouped and assigned to a new virtual U-plane, whereby communication paths with which QoE would lower can be confined to such lower-priority communication paths.

The TEID of each communication path may be assigned in such a manner that the respective TEIDs of multiple communication paths belonging to a group can be collectively identified. For example, a TEID is assigned to each of multiple communication paths belonging to a group such that the TEIDs, each including 32-bit information, have the same higher 24 bits. By assigning TEIDs in this manner, the controller 5 can collectively identify multiple communication paths belonging to a group, based on the higher 24-bit information of TEIDs.

Moreover, when virtual U-planes 31 are of a P-GW, the IP address of each of multiple mobile terminals 1 belonging to a group may be assigned in such a manner that the IP addresses of the mobile terminals 1 can be collectively identified. For example, an IP address is assigned to each of multiple mobile terminals 1 belonging to a group such that the IP addresses, each including 32-bit information, have the same higher 24 bits. By assigning the IP addresses of mobile terminals 1 in this manner, the controller 5 can collectively identify traffics involved in multiple communication paths belonging to a group, based on the higher 24-bit information of the IP addresses of mobile terminals 1.

6.3) Grouped Routing Information

As illustrated in FIG. 35, a communication path group is identified by a group ID, and an associated virtual U-plane 31 is assigned to each ID in the routing information DB 42 of a communication device 4. Note that the routing information DB 50 of the controller 5 also has a similar structure to the example shown in FIG. 35.

The communication device 4 searches the routing information DB 42 by using a communication path identifier in a received packet as a key, and forwards the received packet to a virtual U-plane 31 associated with the communication path identifier in the received packet.

Figure 36:
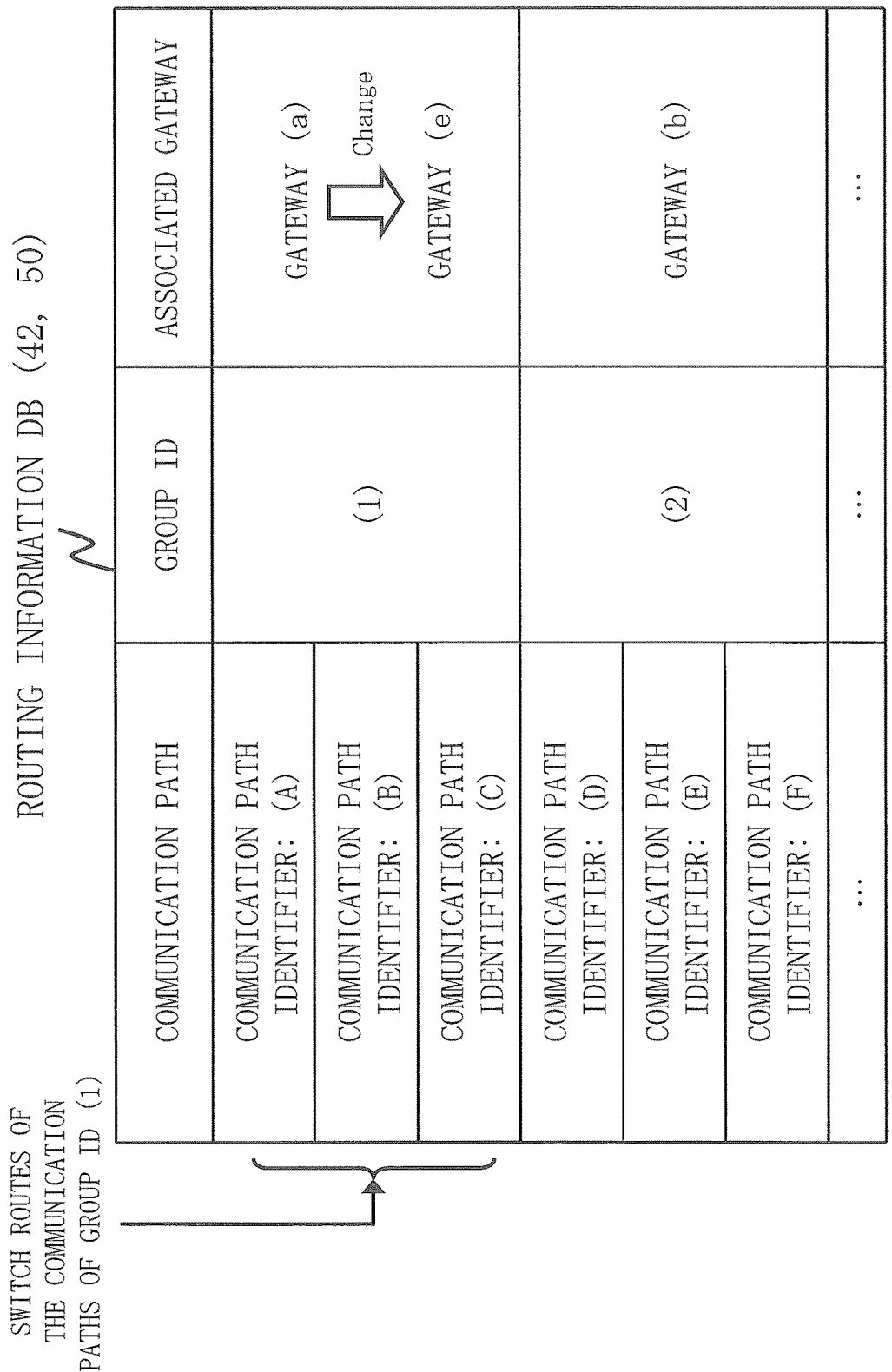
FIG. 36 is a structural diagram showing a second example of the routing information DB at the controller according to the sixth exemplary embodiment of the present invention.

As illustrated in FIG. 36, the controller 5 can change an associated gateway in units of communication path groups. For example, the controller 5 can change a gateway associated with a group to which the communication paths of communication path identifiers (A) to (C) belong, from a gateway (a) to a gateway (e).

The controller 5 can greatly reduce the amount of information in a control signal for the communication device 4 by changing an associated gateway in units of communication path groups. It is possible that the controller 5 sends to the communication device 4 an instruction to change an associated gateway by using a group ID as a key, as shown in FIG. 36.

Suppose that the routing information DB 42 of the communication device 4 has a structure as shown in FIG. 8. In this case, when the controller 5 changes a gateway associated with the group (1) from the gateway (a) to the gateway (e) as shown in FIG. 36, the controller 5 needs to send a control signal to change an associated gateway, with respect to each of the communication path identifiers (A) to (C). However, the control signals are reduced to one thirds in the example of FIG. 36 if the controller 5 sends a control signal by using a group ID as a key as in the sixth exemplary embodiment. That is, according to the sixth exemplary embodiment, the controller 5 has the advantage that the larger number of communication paths are grouped together, the more control signals can be reduced, enabling quicker gateway switching for a communication path.

FIG. 37 shows another example of the structure of the routing information DB 42. Note that the routing information DB 50 of the controller 5 has a similar structure to the example shown in FIG. 37.

In the example of FIG. 37, communication path identifiers are set in such a manner that the identifiers of communication paths belonging to a group can be collectively identified. For example, communication path identifies are set in such a manner that the identifiers of communication paths belonging to the same group have a common fraction. In the example of FIG. 37, the identifiers of communication paths belonging to the same group are set so that their higher 24 bits have a common value. A common value ("X" in the example of FIG. 37) is set on the higher 24 bits of the communication path identifiers (A) to (B).

The number of entries in the routing information DB 42 can be reduced by thus setting the predetermined higher order bits of the identifiers of communication paths belonging to the same group to have a common value. Referring to FIG. 8 as a comparative example, an entry is made for each communication path identifier in the routing information DB 42. Comparing to this, in the example of FIG. 37, entries for communication paths belonging to the same group can be integrated into a single entry, and consequently the number of entries in the routing information DB 42 is reduced.

Moreover, in the example of FIG. 37, control signals to be sent from the controller 5 to the communication device 4 can be also reduced when changing a virtual U-plane 31 associated with a communication path. That is, the controller 5 can instruct to change an associated gateway by using the higher 24 bits of communication path identifiers as a key. For example, in the example of FIG. 37, when changing a gateway associated with the communication path identifiers (A) to (C), the controller 5 instructs to change a gateway associated with the value "X" of the higher 24 bits of the communication path identifiers. In other words, the controller 5 need not make an instruction to change a gateway, with respect to each of the communication path identifiers (A) to (C). Accordingly, when changing a gateway, control signals to be sent from the controller 5 to the communication device 4 are reduced. The reduction in control signals enables quicker gateway switching.

FIG. 38 shows an example of the flow entry DB 46 of the communication device 4 when a flow table of OpenFlow is used in the sixth exemplary embodiment. Note that the routing information DB 50 of the controller 5 has a similar structure to the example shown in FIG. 38.

In OpenFlow, a function of regarding multiple packet processings as a single group is provided. Grouped packet processings are handled in a group table. In the example of FIG. 38, the communication device 4 has the flow entry DB 46 functioning as a normal flow table and a group table 46a for the flow entry DB 46.

In the example of FIG. 38, communication path identifiers (A) to (C) belong to the same communication path group. The same processing group ID is set as "instructions" for the respective flow entries in which matching rules are the communication path identifiers (A) to (C). In the group table 46a, an "instruction" that defines grouped packet processings is set for each processing group ID. The controller 5 sets the flow entry DB 46 and the group table 46a as in the example of FIG. 38 on the communication device 4.

The communication device 4 searches the flow entry DB 46 by using a communication path identifier in a received packet as a key. In the example of FIG. 38, the communication device 4, in the case of receiving a packet with the communication path identifier (A), retrieves an entry in which "processing group ID (1)" is set as an "instruction". Subsequently, the communication device 4 searches the group table 46a by using the processing group ID as a key. In the example of FIG. 38, the communication device 4, in the case of receiving a packet with the communication path identifier (A), searches the group table 46a by using "processing group ID (1)" as a key and then forwards the received packet to a gateway (a) in accordance with an "instruction" corresponding to "processing group ID (1)".

When changing a virtual U-plane 31 associated with a communication path group, the controller 5 sends a control signal to change an entry in the group table based on a processing group ID to the communication device 4. For example, in the example of FIG. 38, when changing a gateway associated with the communication path identifiers (A) to (C) from a gateway (a) to a gateway (e), the controller 5 changes an "instruction" for the entry of "processing group ID (1)", which corresponds to the identifiers (A) to (C), in the group table 46a. That is, it is sufficient for the controller 5 to change an entry in the group table, and the controller 5 need not change an entry in the normal flow table. In the example of FIG. 38, the controller 5 need not change each of the entries corresponding to the identifiers (A) to (C), but it is sufficient to change the entry corresponding to "processing group ID (1)" in the group table 46a. Accordingly, when changing a gateway, control signals to be sent from the controller 5 to the communication device 4 are reduced. The reduction in control signals enables quicker gateway switching.

FIG. 39 shows another example of the flow entry DB 46 when a flow table of OpenFlow is used in the sixth exemplary embodiment. The routing information DB 50 of the controller 5 has a similar structure to the example shown in FIG. 39.

An OpenFlow switch is able to have multiple flow tables. In the example of FIG. 39, the communication device 4 has multiple flow entry DBs 46 (a flow table 46-1 and a flow table 46-2). For example, the communication device 4, when receiving a packet, searches the multiple flow tables in a predetermined order. For example, in the example of FIG. 39, the communication device 4 searches the flow table 46-1 and then searches the flow table 46-2.

In the example of FIG. 39, communication path identifiers (A) to (C) belong to the same communication path group. In the flow table 46-1, packet processing for adding "ID (1)" to the header of a packet is set as "instructions" for the respective flow entries in which matching rules are the communication path identifiers (A) to (C). Such an ID to be added to a packet is set for each communication path group.

In the flow table 46-2, an "instruction" that defines packet processing corresponding to grouped communication paths is set for each ID added to a packet. In the example of FIG. 39, for an "instruction" corresponding to "ID (1)", packet processing for deleting "ID (1)" from the header of the packet and forwarding the packet to a gateway (a) is set.

It is assumed that the controller 5 has set the flow entry DBs 46 as in the example of FIG. 39 on the communication device 4. In this case, the communication device 4 searches a flow entry DB 46 (the flow table 46-1) by using a communication path identifier in a received packet as a key. Specifically, the communication device 4, in the case of receiving a packet with the communication path identifier (A), retrieves an entry in which an "instruction" indicating to add "ID (1)" to the header of a packet is set. Next, the communication device 4 searches the other flow entry DB 46 (the flow table 46-2) by using "ID (1)" added to the packet as a key, and then in accordance with an instruction corresponding to "ID (1)", deletes the ID from the header and forwards the received packet to the gateway (a).

When changing a virtual U-plane 31 associated with a communication path group, the controller 5 sends a control signal for changing an entry based on an ID corresponding to the communication path group to the communication device 4. For example, when changing a gateway associated with the communication path identifiers (A) to (C) from the gateway (a) to a gateway (e), the controller 5 changes an "instruction" for the entry of "ID (1)", which corresponds to the identifiers (A) to (C), in the flow entry DB 46 (flow table 46-2). That is, it is sufficient for the controller 5 to change an entry corresponding to the ID of a communication path group, and the controller 5 need not change respective entries corresponding to communication path identifiers. In the example of FIG. 39, the controller 5 need not change each of the entries corresponding to the identifiers (A) to (C), but it is sufficient to change the entry corresponding to "ID (1)" in the flow entry DB 46 (flow table 46-2). Accordingly, when changing a gateway, control signals to be sent from the controller 5 to the communication device 4 are reduced. The reduction in control signals enables quicker gateway switching.

Although the above-described examples of FIGS. 35 to 39 illustrate that the communication device 4 identifies a communication path group based on communication path identifiers, the present example is not limited to such examples. For example, it is also possible that the controller 5 groups communication paths based on other information (e.g., IP addresses or PDNs), and that the communication device 4 identifies a communication path group based on other information (e.g., IP addresses or PDNs).

7. Seventh Exemplary Embodiment

Next, a seventh exemplary embodiment of the present invention will be described with reference to examples shown in FIGS. 40 to 46. The seventh exemplary embodiment is also applicable to any of the technologies disclosed in the above-described first to sixth exemplary embodiments.

7.1) System (First Example)

As illustrated in FIG. 40, a controller 5 selects a virtual U-plane 31 to assign to a communication path in accordance with a policy for selecting a virtual U-plane 31 to be associated with a communication path. For example, it is possible to dynamically select a virtual U-plane 31 to be associated with a communication path in accordance with the policy, depending on the installation/uninstallation of a virtual U-plane 31. Moreover, the controller 5 can dynamically change a virtual U-plane 31 to assign to a communication path, depending on a change in conditions relating to the policy. Note that although examples of the policy for selecting a virtual U-plane 31 will be shown in the seventh exemplary embodiment, it is also possible to use such policies for selecting a gateway 3 as illustrated in the first and second exemplary embodiments.

Figure 41:
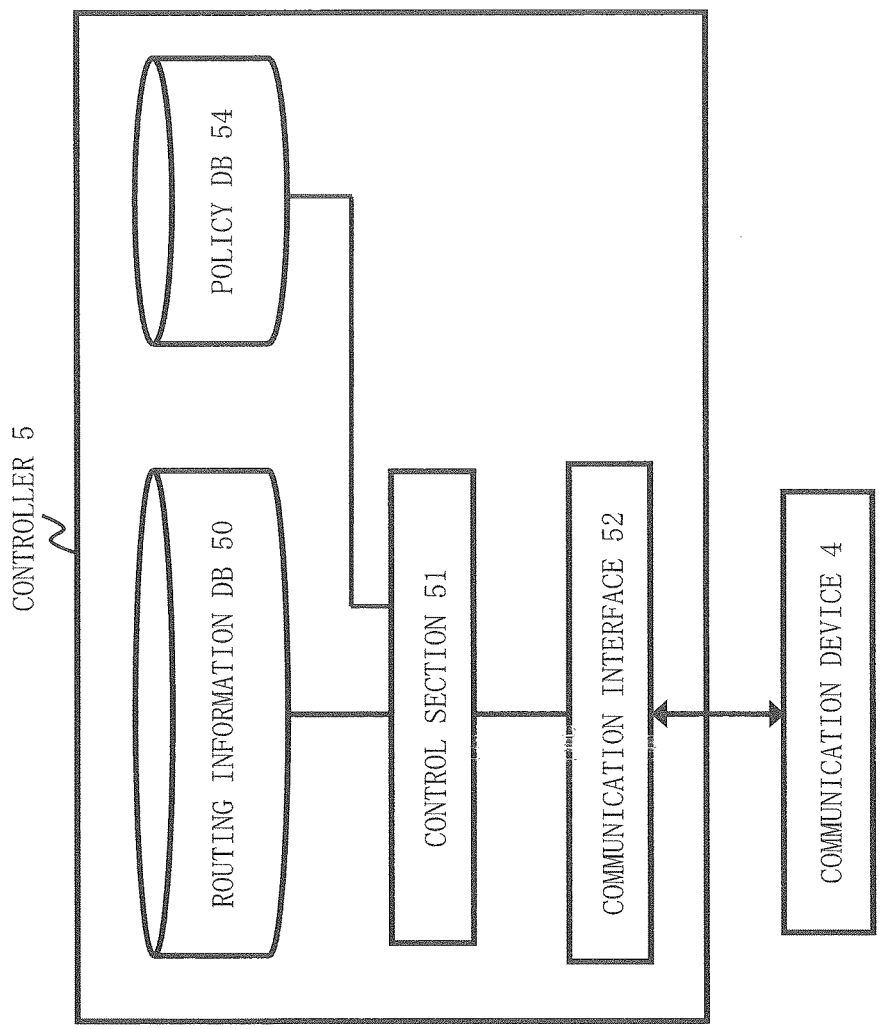
FIG. 41 is a block diagram showing a configuration of a controller according to the seventh exemplary embodiment of the present invention.

Referring to FIG. 41, the controller 5 has a policy DB 54, in addition to the example of the configuration of the controller 5 illustrated in FIG. 7. The control section 51 can refer to the policy DB 54 and select a virtual U-plane 31 to be associated with a communication path. For example, a policy stored in the policy DB 54 is configured such that a virtual U-plane 31 responding to a request for communication path-related communication quality will be selected. For example, a policy stored in the policy DB 54 may be configured such that a virtual U-plane 31 will be selected for each communication path group, in response to a request for communication path-related communication quality. For example, the control section 51 refers to the policy DB 54 in response to the installation of a virtual U-plane 31 and selects a virtual U-plane 31 to be associated with a communication path. The control section 51 selects a virtual U-plane 31 to be associated with a communication path and adds an entry to the routing information DB 50. The control section 51, based on the routing information DB 50, notifies a communication device 4 of associations between communication paths and virtual U-planes 31.

According to the policy DB 54 illustrated in FIG. 42, a virtual U-plane 31 to be associated with a communication path is chosen based on a policy concerning QCIs corresponding to communication paths. For example, the controller 5 can obtain the QCI of a communication path from a MME.

In the example of FIG. 42, priorities are set on communication paths corresponding to the individual QCIs, based on the values of QCIs. The controller 5 selects a virtual U-plane 31 to be associated with a communication path, based on the priority, which is a condition to select a virtual U-plane 31. For example, when a new virtual U-plane 31 is installed in the communication system, the controller 5 associates a communication path with the newly installed virtual U-plane 31, in ascending order of priority, starting from a communication path corresponding to a QCI that is set for a "LOW" priority. That is, the controller 5 determines an association between the newly installed virtual plane 31 and a communication path, based on the order of QCI priority. Changing of a virtual U-plane 31 associated with a communication path may possibly cause communication delay or the like. However, changing of a virtual U-plane 31 associated with a communication path is performed starting from a communication path of a lower-priority QCI in order, whereby the lowering of the communication quality of a communication path of a higher-priority QCI is suppressed. Thus, the controller 5 can select a virtual U-plane 31 responding to a request for quality corresponding to a QCI.

In the example of FIG. 42, priorities for the QCIs include "HIGH", "MID" and "LOW". However, a method for giving priorities is not limited to the example of FIG. 42. For example, a value indicating a priority may be given to each QCI. The controller 5 can choose a gateway to be associated with a communication path, based on the priority of each QCI. For example, it is possible that the controller 5 associates a communication path corresponding to a QCI given a priority of a predetermined value or higher, with a virtual U-plane 31 that can secure a communication bandwidth. Moreover, for example, it is possible that the controller 5 associates a communication path corresponding to a QCI given a priority of a predetermined value or higher, with a virtual U-plane 31 on which operation load is a predetermined value or lower.

The controller 5 can choose a gateway to be associated with a communication path, for each QCI. For example, the controller 5 chooses a communication path to be associated with a certain gateway, based on the QCI. In this case, the QCIs of multiple communication paths assigned to the certain gateway are identical.

7.2) System (Second Example)

Figure 43:
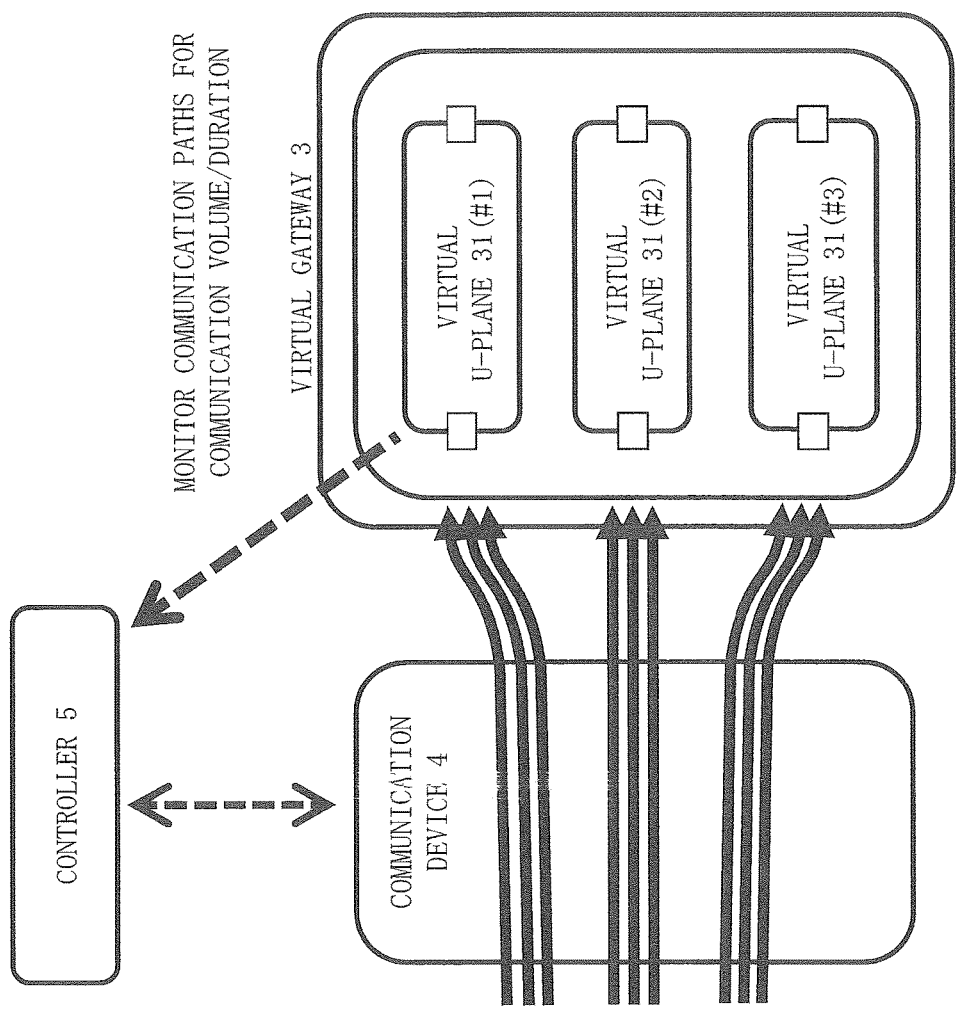
FIG. 43 is a schematic system architecture diagram for describing a second example of operation of the communication system according to the seventh exemplary embodiment of the present invention.

As illustrated in FIG. 43, the controller 5 can also choose a virtual U-plane 31 to be associated with a communication path, based on the communication volume or communication duration of a communication path. The controller 5 can obtain the communication volumes or communication durations of communication paths by monitoring virtual U-planes 31.

In the policy DB 54 illustrated in FIG. 44, a threshold of communication volume or communication duration is set to correspond to a communication path identifier. Note that in the policy DB 54 shown in FIG. 44, a threshold may be set for each communication path group, as in the sixth exemplary embodiment. The controller 5 selects a virtual U-plane 31 to be associated with a communication path, based on the threshold of communication volume or communication duration, which is a condition to select a virtual U-plane 31. Here, a virtual U-plane 31 to be associated with a communication path is chosen based on a policy concerning the communication volume or communication duration of a communication path.

For example, when a user of a mobile terminal 1 makes a prepaid charging contract with a carrier, the user can make communication up to a communication volume corresponding to a prepaid fee (i.e., a threshold of communication volume). Information about the contract between the user of the mobile terminal 1 and the carrier is set in the controller 5. When switching a communication path depending on the installation/uninstallation of a virtual U-plane 31, the controller 5 preferentially switches a communication path that still has a margin in communication volume to reach the threshold set in the policy DB 54. In the example of FIG. 44, a communication volume ("X" bytes) is set as a threshold for a communication path of communication path identifier "A" in the policy DB 54. For example, the controller 5 monitors the communication volume of the communication path of identifier "A" at a virtual U-plane 31 functioning as a P-GW and, if the difference between that communication volume and the threshold ("X" bytes) is not greater than a predetermined value, excludes this communication path from switching targets.

By switching a communication path as described above, it is possible to suppress the possibility that the communication volume of a communication path exceeds the threshold during communication path switching which results in an error in billing management. The controller 5 can select a virtual U-plane 31 responding to a request for quality of communication service.

For example, when a user of a mobile terminal 1 makes a 2-step charging contract with a carrier, the user pays a communication fee according to the communication volume before the communication volume exceeds a specified threshold, and after the communication volume exceeds the threshold, the communication fee becomes flat, regardless of the communication volume. Once the threshold is exceeded, it is not necessary to accurately monitor the communication volume. Accordingly, when switching a communication path depending on the installation/uninstallation of a virtual U-plane 31, the controller 5 preferentially switches a communication path whose communication volume exceeds the threshold.

In the example of FIG. 44, it is assumed that a mobile terminal 1 corresponding to a communication path of communication path identifier "D" has made a 2-step charging contract with a carrier. Information about the contract between a user of this mobile terminal 1 and the carrier is set in the controller 5. When switching a communication path depending on the installation/uninstallation of a virtual U-plane 31, the controller 5 preferentially switches a communication path whose communication volume exceeds a threshold set in the policy DB 54. For example, in the example of FIG. 44, a communication volume ("Y" bytes) is set as a threshold for the communication path of communication path identifier "D" in the policy DB 54. For example, the controller 5 monitors the communication volume of the communication path of identifier "D" at a virtual U-plane 31 functioning as a P-GW and, if the communication volume exceeds the threshold ("Y" bytes), switches this communication path.

As described above, by switching a communication path whose communication volume need no longer be managed for charging, it is possible to suppress the possibility that an error occurs in billing management during communication path switching, allowing the controller 5 to select a virtual U-plane 31 in response to a request for quality of communication service.

For example, when a user of a mobile terminal 1 makes a contract for communication having a time limit with a carrier, the user can make communication within the limit specified in the contract (e.g., within 24 hours). When switching a communication path depending on the installation/uninstallation of a virtual U-plane 31, the controller 5 preferentially switches a bearer that still has leeway to reach the limit specified in the contract (e.g., a bearer that has an hour or more leeway to reach the limit). By switching a bearer in this manner, it is possible to suppress the possibility that the limit is exceeded while bearer switching is performed which results in an occurrence of communication that exceeds the contracted limit.

In the example of FIG. 44, it is assumed that a mobile terminal 1 corresponding to a communication path of communication path identifier "B" has made a 24-hour limit contract (communication is disabled after a lapse of 24 hours) with a carrier. Information about the contract between a user of this mobile terminal 1 and the carrier is set in the controller 5. When switching a communication path depending on the installation/uninstallation of a virtual U-plane 31, the controller 5 excludes from switching targets a communication path whose communication duration exceeds a threshold set in the policy DB 54. In the example of FIG. 44, a communication duration ("23H") is set as a threshold for the communication path of communication path identifier "B" in the policy DB 54.

For example, the controller 5 monitors the communication duration of the communication path of identifier "B" at a virtual U-plane 31 functioning as a P-GW and, if the communication duration exceeds the threshold ("23H"), excludes this communication path from switching targets.

By switching a communication path as described above, it is possible to suppress the possibility that the communication duration of a communication path exceeds a contracted time limit during communication path switching which results in an error in billing management.

7.3) System (Third Example)

The controller 5 can select a virtual U-plane 31 to be associated with a communication path, based on the frequency of activating a virtual U-plane 31.

Figure 45:
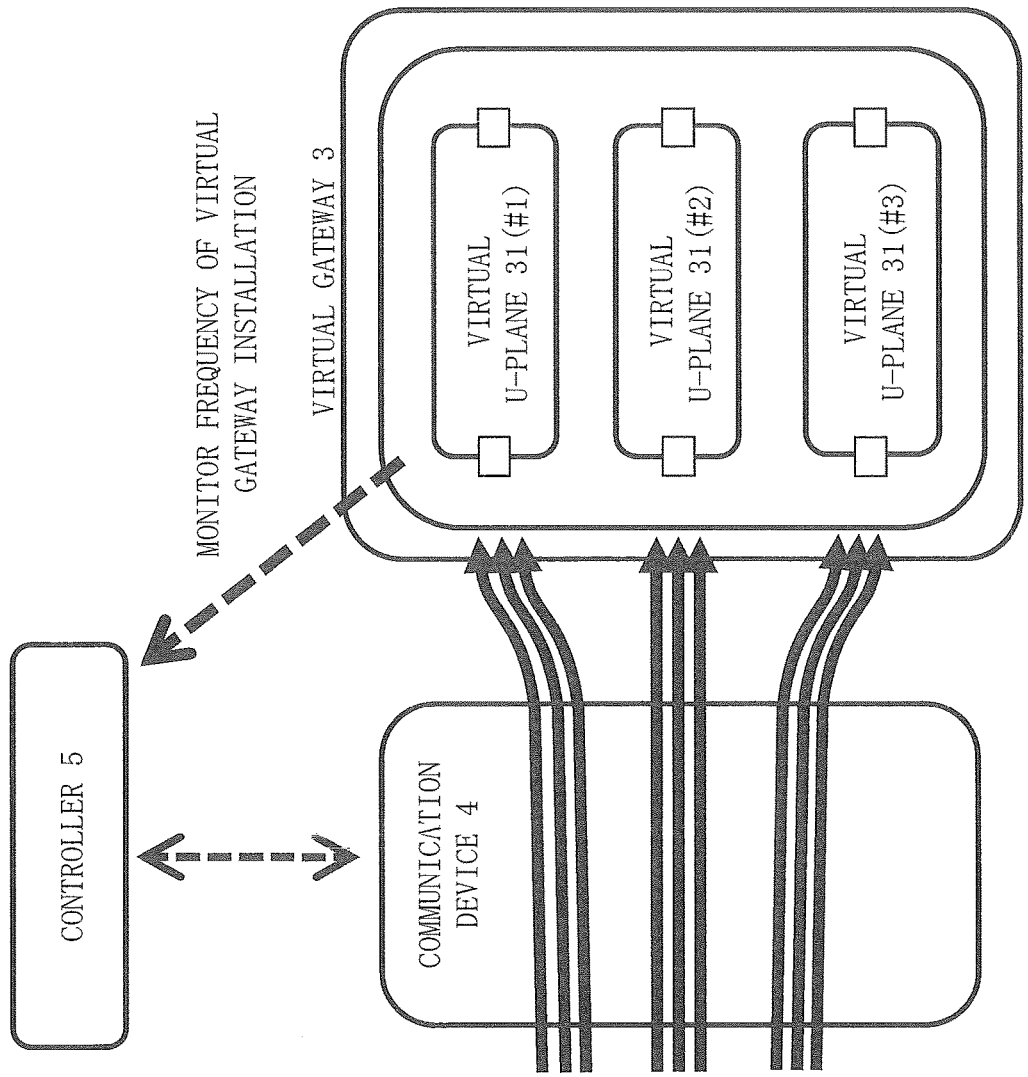
FIG. 45 is a schematic system architecture diagram for describing a third example of operation of the communication system according to the seventh exemplary embodiment of the present invention.

As illustrated in FIG. 45, the controller 5 can select a virtual U-plane 31 to be associated with a communication path, based on the frequency of installing/uninstalling (or the frequency of activating/deactivating) a virtual U-plane 31. The controller 5 selects a virtual U-plane 31 to be associated with a communication path, based on the frequency of installation/uninstallation, which is a condition to select a virtual U-plane 31. The controller 5 can obtain the frequency of installation/uninstallation by monitoring virtual U-planes 31.

In the policy DB 54 illustrated in FIG. 46, a priority is set for each communication path identifier. Note that in the policy DB 54 shown in FIG. 46, a priority may be set for each communication path group as in the sixth exemplary embodiment. The controller 5 selects a virtual U-plane 31 to be associated with a communication path, based on a threshold of priority, which is a condition to select a virtual P-plane 31. In the example of FIG. 46, the controller 5 selects a virtual U-plane 31 to be associated with a communication path, based on a policy concerning the priorities of communication path identifiers.

For example, the controller 5 monitors the frequencies of installing/uninstalling virtual U-planes 31. For example, the controller 5 associates a lower-priority communication path (e.g., a communication path given a "LOW" priority in the policy DB 54), with a virtual U-plane 31 that is installed/uninstalled at higher frequency. A communication path assigned to a virtual U-plane 31 that is installed/uninstalled at higher frequency could highly frequently change a virtual U-plane 31 it connects to, and its communication quality could be highly possibly degraded. Accordingly, a lower-priority communication path is associated with a virtual U-plane that is installed/uninstalled at higher frequency, whereby the controller 5 can suppress degradation in the communication quality of a higher-priority communication path.

It is also possible that the controller 5 chooses a virtual U-plane 31 to be associated with a communication path by using a policy based on an SLA (Service Level Agreement)

that is required of communication path-related services. For example, the controller 5, based on the policy, checks a communication bandwidth required by an SLA and selects a virtual U-plane 31 that can secure the communication bandwidth responsive to the SLA. For example, the controller 5 can manage communication bandwidths used by the individual virtual U-planes 31 and maximum communication bandwidths that can be secured by the individual virtual U-planes 31. The controller 5 can select a gateway in which an available bandwidth of each virtual U-plane 31 meets an SLA's requirement. The controller 5 can associate a communication path of which an SLA requires a predetermined value or higher, with a virtual U-plane 31 the operation load on which is a predetermined value or lower.

In the seventh exemplary embodiment, the policy DB 54 can store multiple types of policies. For example, the policy DB 54 can store the policy illustrated in FIG. 42 and the policy illustrated in FIG. 44. The controller 5 can select a virtual U-plane 31, based on the multiple types of policies stored in the policy DB 54.

8. Eighth Exemplary Embodiment

Next, an eighth exemplary embodiment of the present invention will be described with reference to examples shown in FIGS. 47 to 50. The eighth exemplary embodiment is also applicable to any of the technologies disclosed in the above-described first to seventh exemplary embodiments.

A communication system according to the eighth exemplary embodiment is provided with a management device 6 which generates control information used for a controller to select a virtual U-plane 31 to be associated with a communication path. An operator of the communication system manages the controller via the management device 6. It is expected that multiple controllers are distributed in a communication system, depending on the scale of a communication system. In such a case, an operator of the communication system can efficiently manage the communication system by managing the controllers via the management device 6. In addition, the management device 6 notifies control information to the controller 5, whereby the controller 5, in response to the dynamical installation of a virtual U-plane 31, can choose a communication path to be associated with the installed virtual U-plane 31 by referring to the control information.

Note that although an example of the management device 6 for controlling associations between communication paths and virtual U-planes 31 is shown in the eighth exemplary embodiment, it is also possible to use the management device 6 to control associations between gateways 3 and communication paths as illustrated in the first and second exemplary embodiments.

8.1) Management Device (First Example)

Figure 47:
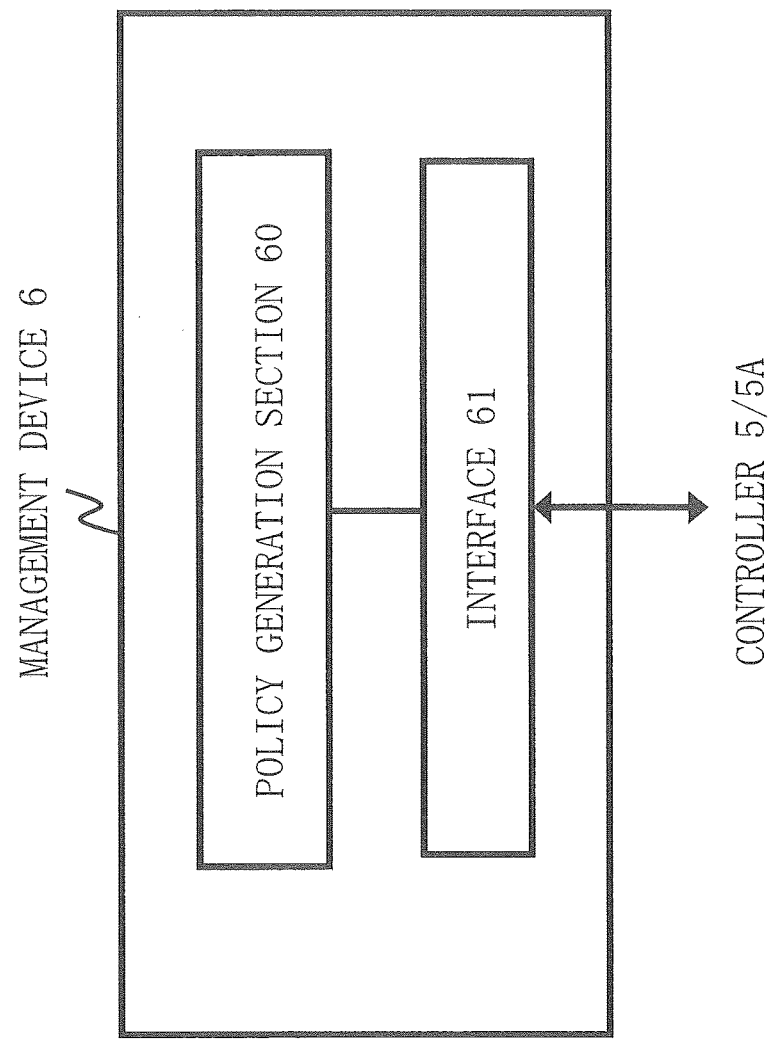
FIG. 47 is a block diagram showing a first example of a management device according to an eighth exemplary embodiment of the present invention.

Referring to FIG. 47, the management device 6 includes a policy generation section 60 and an interface 61, and communicates with the controller 5 (or the controller 5A) via the interface 61.

The policy generation section 60 can generate control information for the controller 5 to select a virtual U-plane to be associated with a communication path. For example, the policy generation section 60 generates control information such that a virtual U-plane 31 responding to a request for communication path-related communication quality will be selected. For example, a policy to be stored in the policy DB 54 illustrated in the seventh exemplary embodiment is generated as control information. Moreover, the policy generation section 60 can generate information to be stored in the policy DB 54 (e.g., the information illustrated in FIG. 42, 44 or 46), in response to an operation of an operator of the communication system. Moreover, the policy generation section 60 can generate multiple types of policies. The policy generation section 60 notifies the generated information to the controller 5 via the interface 61. The controller 5 stores a policy notified from the management device 6 in the policy DB 54 and controls a communication device 4 based on this policy DB 54.

It is also possible that the policy generation section 60 generates control information for the controller 5 to select a virtual U-plane 31 to be associated with communication paths, for each communication path group. For example, the policy generation section 60 can generate information as illustrated in FIG. 42, 44 or 46 for each communication path group. For example, the policy generation section 60 can generate a policy including priorities according to QCIs (the policy illustrated in FIG. 42), for each communication path group. For example, the policy generation section 60 can generate a threshold as illustrated in FIG. 44, for each communication path group. For example, the policy generation section 60 can generate a priority as illustrated in FIG. 46, for each communication path group.

The policy generation section 60 may also generate a policy for associating a communication path to be newly configured through the attach procedure disclosed in the fourth exemplary embodiment, with a virtual U-plane 31. The following are examples of the policy for associating a communication path to be newly configured through the attach procedure with a virtual U-plane 31.

(1) Round robin: The policy generation section 60 generates a policy for choosing, in a round robin manner, a virtual U-plane 31 to be associated with a communication path from among virtual U-planes 31 running in the communication system. For example, the policy generation section 60 generates a policy for choosing, in a round robin manner, a virtual U-plane 31 to be associated with a communication path, based on the load on each virtual U-plane 31.

(2) Location of mobile terminal 1: The policy generation section 60 generates a policy, based on location-related information of a mobile terminal 1 such as E-UTRAN cell ID. For example, the policy generation section 60 generates a policy for choosing a virtual U-plane 31 to be associated with a communication path, based on at least one of the conditions illustrated below.

Communication path corresponding to a predetermined cell ID

Communication path corresponding to any one of multiple cell IDs (e.g., a communication path corresponding to any one of multiple neighboring cells)

Communication path corresponding to a predetermined base station

Communication path corresponding to any one of multiple base stations (e.g., a communication path corresponding to any one of multiple neighboring base stations)

For example, the policy generation section 60 generates a policy indicating that a communication path corresponding to cell ID "a" is associated with a virtual gateway "A". For example, the policy generation section 60 generates a policy indicating that a communication path corresponding to cell ID "b" or "c" is associated with a virtual gateway "B". For example, the policy generation section 60 generates a policy indicating that a communication path corresponding to cell, ID "d" is associated with a virtual gateway selected from among virtual gateways "C", "D" and "E" in a round robin manner.

(3) QoS characteristic of communication path: The policy generation section 60 generates a policy, based on QoS characteristic-related information of a communication path. For example, the policy generation section 60 generates a policy for choosing a virtual U-plane 31 to be associated with a communication path, based on at least one of the conditions illustrated below.

Communication path corresponding to a predetermined QCI value

Communication path corresponding to any one of multiple QCI values

For example, the policy generation section 60 generates a policy indicating that a communication path of a QCI value of "5" is associated with a virtual gateway "A". For example, the policy generation section 60 generates a policy indicating that a communication path of a QCI value of "1" or "3" is associated with a virtual gateway "B". For example, the policy generation section 60 generates a policy indicating that a communication path of a QCI value of "4" is associated with a virtual gateway selected from among virtual gateways "C", "D" and "E" in a round robin manner.

(4) Combination of location of mobile terminal 1 and QoS characteristic of communication path: The policy generation section 60 may generate a policy for choosing a virtual U-plane 31 to be associated with a communication path, based on combinations of the above-described conditions (2) and (3) (e.g., any of the conditions illustrated below).

Communication path corresponding to a predetermined QCI value and to a predetermined cell ID (or predetermined base station)

Communication path corresponding to a predetermined QCI value and to any one of multiple cell IDs (or any one of multiple base stations)

Communication path corresponding to any one of multiple QCI values and to a predetermined cell ID (or predetermined base station)

Communication path corresponding to any one of multiple QCI values and to any one of multiple cell IDs (or any one of multiple base stations)

(5) Communication path group: The policy generation section 60 may generate a policy for choosing a virtual plane 31 to be associated with a communication path group, based on a property of a communication path group as illustrated in the sixth exemplary embodiment. The following are examples of a property of a communication path group.

Group based on the area where mobile terminals 1 are residing (E-UTRAN cell ID or the like)

Group based on the characteristic of charging on mobile terminals 1 (normal charging, prepaid charging, flat rate or the like)

Communication states of mobile terminals 1 (whether or not a predefined volume or more of communication is made during a predefined period of time)

Group based on the operator ID (the ID of an operator of a core network to which mobile terminals 1 are connecting)

Packet Data Network (PDN) to which mobile terminals 1 are connecting

Service type that requires chaining after leaving communication paths

QoS characteristic

States of mobile terminals 1 (IDLE state or CONNECTED state)

For example, when a communication path belongs to a group whose charging characteristic is prepaid charging, the policy generation section 60 generates a policy indicating that the communication path is associated with a virtual gateway "A".

As described above, the management device 6 generates and notifies a policy to the controller 5, and thereby can cause the controller 5 to operate in accordance with the policy. Moreover, the management device 6 can also manipulate the routing information DB 50 of the controller 5, which will be described below.

8.2) Management Device (Second Example)

Figure 48:
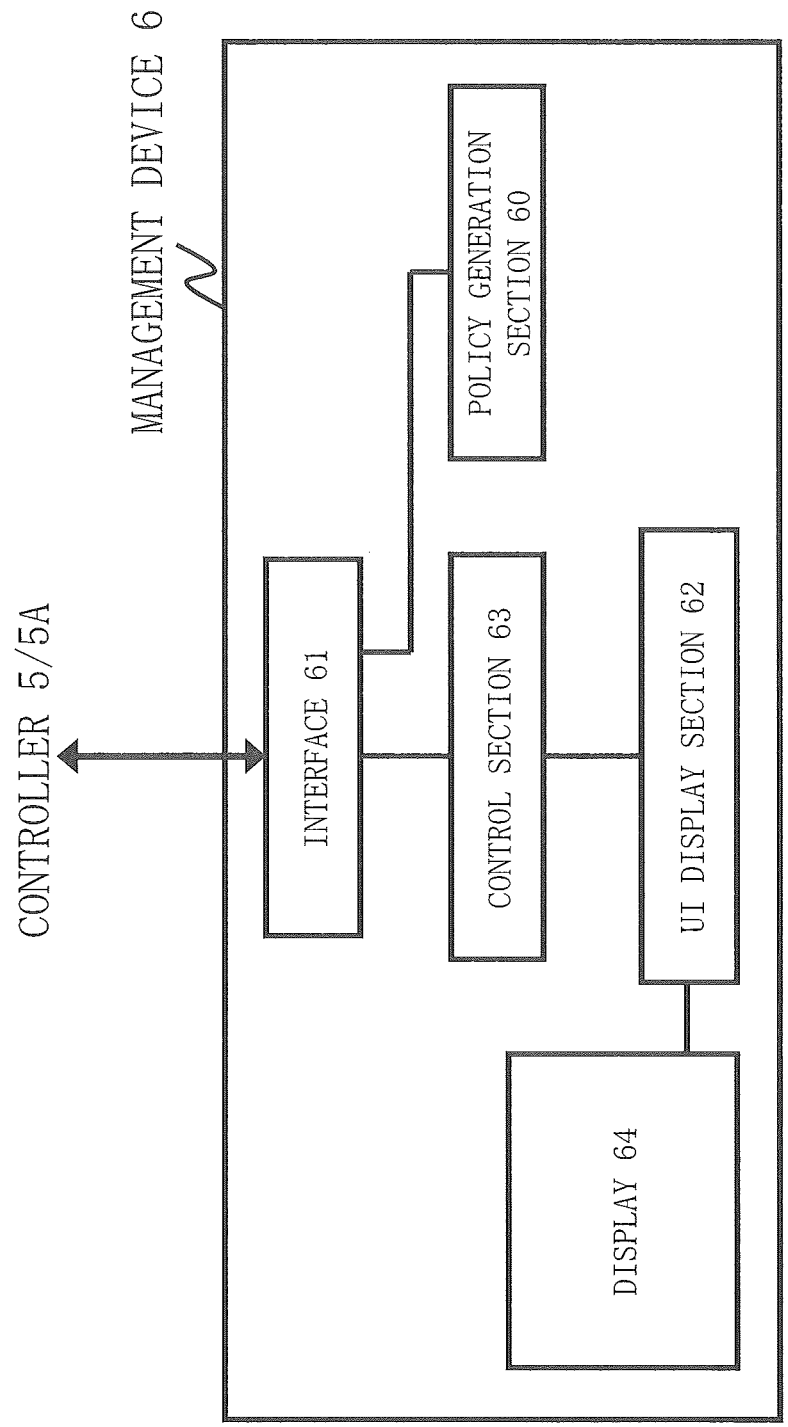
FIG. 48 is a block diagram showing a second example of the management device according to the eighth exemplary embodiment of the present invention.

A management device 6 illustrated in FIG. 48 includes a UI (User Interface) display section 62, a cpntrol section 63, and a display 64, in addition to the configuration shown in FIG. 47.

Figure 49:
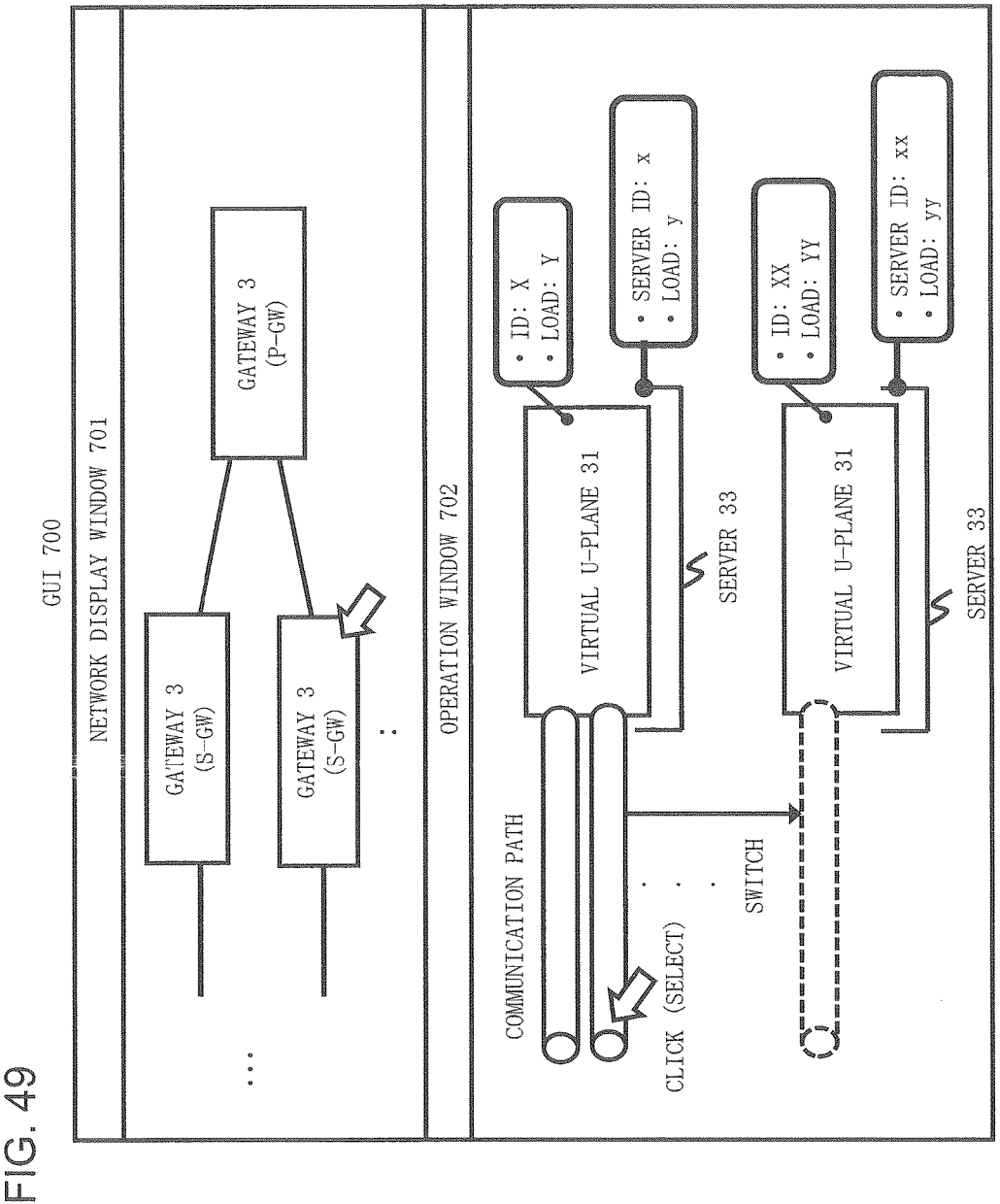
FIG. 49 is a schematic diagram showing an example of a user interface of the management device according to the eighth exemplary embodiment of the present invention.

The UI display section 62 displays a user interface like an example shown in FIG. 49. An operator of the communication system can manipulate the user interface illustrated in FIG. 49 to operate associations between communication paths and virtual gateways.

The control section 63 operates the routing information DB 50 of the controller 5, based on associations between communication paths and virtual gateways that are determined according to the manipulation of the operator. For example, it is assumed that the operator has changed a virtual gateway associated with a communication path of communication path identifier "A" from a virtual gateway (a) to a virtual gateway (e). In this case, the control section 63 operates the routing information DB 50 to change a virtual gateway associated with communication path identifier "A" from the virtual gateway (a) to the virtual gateway (e).

FIG. 49 shows an example of a GUI (Graphical User Interface) 700 that the UI display section 62 displays on the display 64. The GUI 700 includes a network display window 701 and an operation window 702. The network display window 701 displays an outline of the network structure of the communication system.

Referring to FIG. 49, when the operator clicks a network entity (e.g., an S-GW) displayed on the network display window 701, the operation window 702 displays information concerning virtual U-planes 31 included in the clicked entity.

For example, the operation window 702 can display network objects including communication paths, virtual U-planes 31 included in a gateway, and servers 33 corresponding to the individual virtual U-planes 31.

The operation window 702 can display information concerning properties of network objects including communication paths and virtual U-planes 31. For example, the operator can select a virtual U-plane 31 to be associated with a communication path by referring to the information concerning properties of network objects. For example, the operation window 702 can display the IDs of the virtual U-planes 31 and the servers 33 and the loads on the virtual U-planes 31 and the servers 33. Further, for example, the operation window 702 can display the number of communication paths associated with each virtual U-plane 31, the throughputs of the virtual U-planes 31, the available communication bandwidths of the virtual U-planes 31, or the like, as properties of network objects. For example, the operation window 702 can display the QCIs of the communication paths, SLAs on the services of the communication paths, or the like, as properties of network objects. It is also possible that the operation window 702 displays multiple properties. The operation window 702 can display a communication path or communication paths configured at each virtual U-plane 31.

The operator can switch a communication path displayed on the window 702 to another virtual U-plane 31 by a drag & drop operation. For example, the operator can switch a communication path to a virtual U-plane 31 with lighter load by referring to the loads on the virtual U-planes 31 and the servers 33 displayed on the window 702.

In response to an operation of the operator, the control section 63 can make a change to associations between communication paths and virtual U-planes 31 by manipulating the routing information DB 50 of the controller 5. For example, the control section 63 can make a change to the routing information DB 50 by generating control information concerning associations between communication paths and virtual U-planes 31, depending on the combination of network objects, and notifying the generated control information to the controller 5. For example, the controller 5, in response to the change to the routing information DB 50, notifies the communication device 4 of the change in associations between communication paths and virtual U-planes 31.

8.3) Management Device (Third Example)

Figure 50:
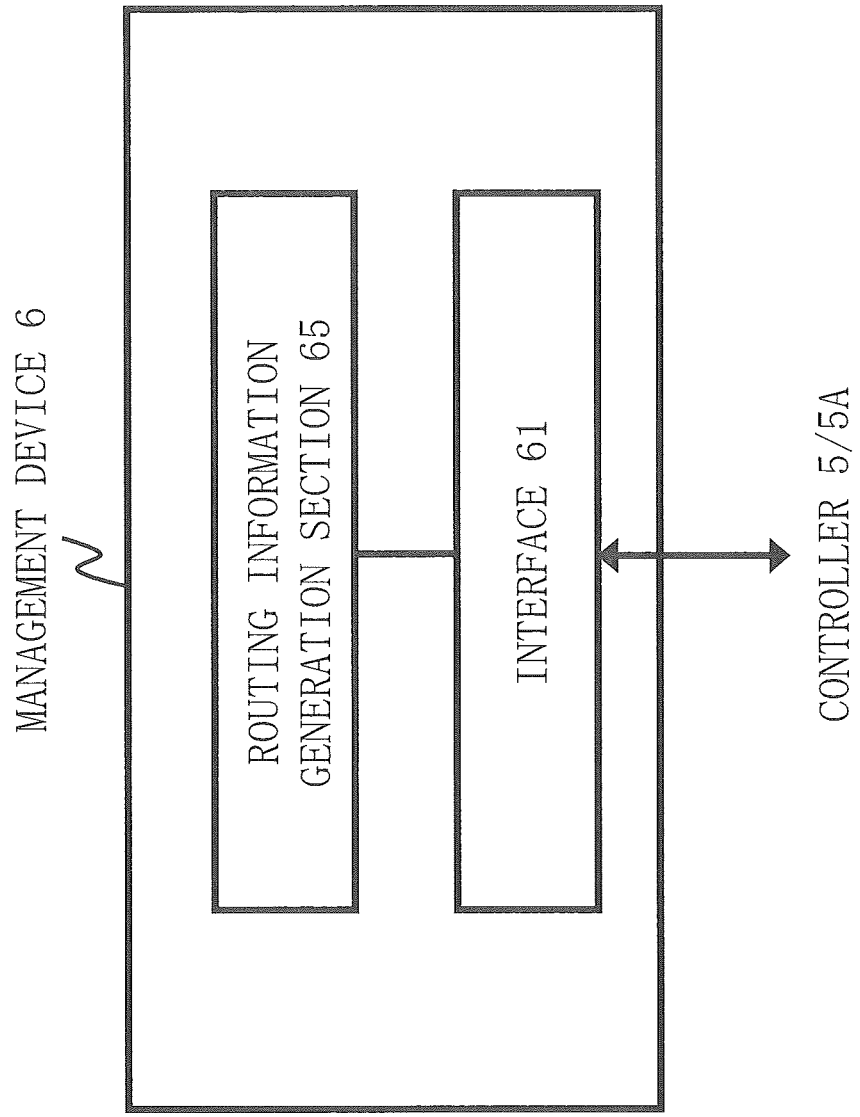
FIG. 50 is a block diagram showing a third example of the management device according to the eighth exemplary embodiment of the present invention.

A management device 6 illustrated in FIG. 50 can directly control the routing information DB 50 of the controller 5, without generating information to be stored in the policy DB 54. The management device 6 includes a routing information generation section 65 and an interface 61.

The routing information generation section 65 can generate control information for the controller 5 to select a virtual U-plane 31 to be associated with a communication path. For example, the routing information generation section 65 generates control information such that a virtual U-plane 31 responding to a request for the communication quality of a communication path will be selected. For example, the routing information generation section 65 generates control information in response to the installation of a virtual U-plane 31. Information to be stored in the routing information DB 50 of the controller 5 is generated as control information. The routing information generation section 65 determines an association between a communication path and a gateway. The routing information generation section 65 sets the association between the communication path and the gateway in the routing information DB 50 of the controller 5 via the interface 61.

It is also possible that the routing information generation section 65 generates control information for managing gateways associated with communication paths in units of communication path groups (e.g., a database structured as illustrated in the sixth exemplary embodiment).

For example, the routing information generation section 65 can generate information to be set in the routing information DB 50, based on a policy as illustrated in the seventh exemplary embodiment. For example, the routing information generation section 65 can generate information to be set in the routing information DB 50, based on the policy illustrated in FIG. 42, 44 or 46. For example, the routing information generation section 65 can collect, via the controller 5, information (e.g., the communication volume or communication duration of a communication path, the frequency of installing a virtual gateway, or the like) required to generate information to be set in the routing information DB 50. For example, the routing information generation section 65 can generate information to be set in the routing information DB 50, based on a policy as illustrated in the eighth Exemplary Embodiment (any of the above-described policies (1 to (5)).

9. Ninth Exemplary Embodiment

Hereinafter, a ninth exemplary embodiment will be described with reference to examples shown in FIGS. 51 to 56. The ninth exemplary embodiment is also applicable to any of the technologies disclosed in the above-described first to eighth exemplary embodiments.

In the ninth exemplary embodiment, an operator groups and manages communication paths via a management device 6. By grouping communication paths, the operator can efficiently perform management and the like of associations between communication paths and virtual U-planes 31. Moreover, the management device 6 groups and visualizes communication paths, apart from the grouping for the control performed by the controller 5 in the sixth exemplary embodiment, whereby the operator can efficiently manage communication paths and virtual U-planes 31.

Note that although an example of the management device 6 for controlling associations between communication paths and virtual U-planes 31 is shown in the ninth exemplary embodiment, it is also possible to use the management device 6 to control associations between gateways 3 and communication paths as illustrated in the first and second exemplary embodiments.

Figure 51:
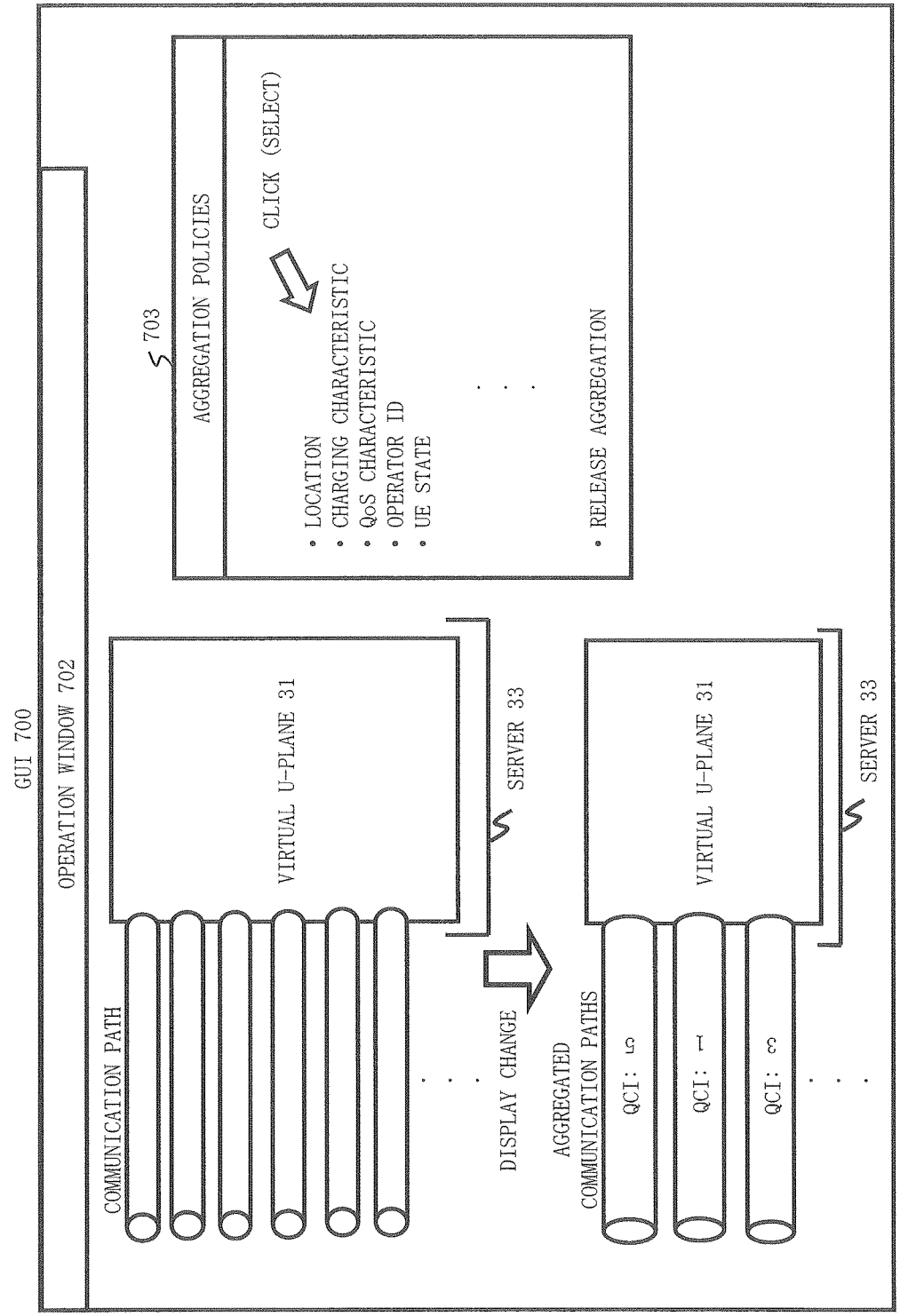
FIG. 51 is a schematic diagram showing a first example of a user interface of a management device according to a ninth exemplary embodiment of the present invention.

According to a GUI 700 illustrated in FIG. 51, an operator can group communication paths by using the GUI 700 displayed by the management device 6.

An operation window 702 illustrated in FIG. 51 displays aggregation policies 703 for aggregating (grouping) communication paths configured at a virtual gateway 3. For example, the aggregation policies 703 are set, based on properties of communication paths. The following are examples of the aggregation policies 703.

Area where a mobile terminal 1 is residing (E-UTRAN cell ID or the like)

Characteristic of charging on a mobile terminal 1 (normal charging, prepaid charging, flat rate, or the like)

Operator ID (the ID of an operator of a core network to which a mobile terminal 1 is connecting)

State of a mobile terminal 1 (IDLE state or CONNECTED state)

QoS characteristic

Packet Data Network (PDNs) to which a mobile terminal 1 is connecting

Service type that requires chaining after leaving a communication path

The management device 6 can aggregate communication paths, based on any of the above examples of the aggregation policies 703. For the aggregation policies 703, it is also possible to use, for example, the policies disclosed in the sixth exemplary embodiment as conditions to group communication paths.

For example, the control section 63 of the management device 6, in response to an operator's clicking any one of the policies displayed in the aggregation policies 703, aggregates communication paths based on the clicked policy. For example, the control section 63 aggregates communication paths that have the same property under an aggregation policy. For example, when "QoS CHARACTERISTIC" is selected as an aggregation policy, the control section 63 aggregates those communication paths having the same QCI value, as illustrated in FIG. 51.

For example, the control section 63, in response to a clicking of "RELEASE AGGREGATION" displayed in the aggregation policies 703, releases the aggregation of communication paths and displays each of the communication paths discretely.

An operator's management costs can be greatly reduced by aggregating communication paths based on an aggregation policy. For example, when communication paths are aggregated based on QCIs as in the example of FIG. 51, the number of communication paths managed on the GUI 700 will be aggregated into a maximum of nine types (nine QCIs are defined by standardization specifications of 3GPP and the like) on each virtual gateway 3. By aggregating communication paths based on an aggregation policy, it is possible to reduce in a pseudo manner the number of communication paths managed by an operator, so that the operator's management costs are greatly reduced.

The control section 63 can change the routing information DB 50 of the controller 5, in response to an operator's aggregating communication paths based on an aggregation policy.

FIG. 52 shows an example of the routing information DB 50 when communication paths are aggregated based on QCIs. The control section 63 aggregates communication paths based on properties under an aggregation policy (QCIs in the example of FIG. 52) and establishes a correspondence between each of the aggregated communication paths and a property of the aggregation policy ("Group ID" in FIG. 52). In the example of FIG. 52, the control section 63 changes the routing information DB 50 so that correspondences are made between the communication paths aggregated based on QCIs and QCI values ("Group ID"). The management device 6 changes the routing information DB 50 as described above, whereby the controller 5 will be able to control the communication device 4 in the manner illustrated in the sixth exemplary embodiment.

For example, the control section 63 of the management device 6 or the control section 51 of the controller 5 can perform communication path reconfiguration when the state of a communication path is changed from a property under an aggregation policy. Communication path reconfiguration means that after a communication path is released, the communication path is configured again. For example, when the state of a communication path is changed from a property under an aggregation policy, the control section 63 or 51 can perform reconfiguration of this communication path. For example, when the communication volume per unit period of a mobile terminal 1 exceeds a predefined value, the control section 63 or 51 prompts reconfiguration of the relevant communication path. Moreover, the routing information DB 50 may be also changed as necessary. Reconfiguration of a communication path allows the communication path to belong to a group suitable to its current state. The controller 5 or management device 6 allows a communication path to belong to a group suitable to its current state in this manner, whereby it is possible to prevent it from occurring that the load of processing for reassigning a communication path to a virtual U-plane 31 becomes excessively heavy when a virtual U-plane 31 is installed/uninstalled. This is because if a communication path exists that does not belong to a group suitable for its current state, individual control of this communication path is needed, apart from grouping-based control.

Figure 53:
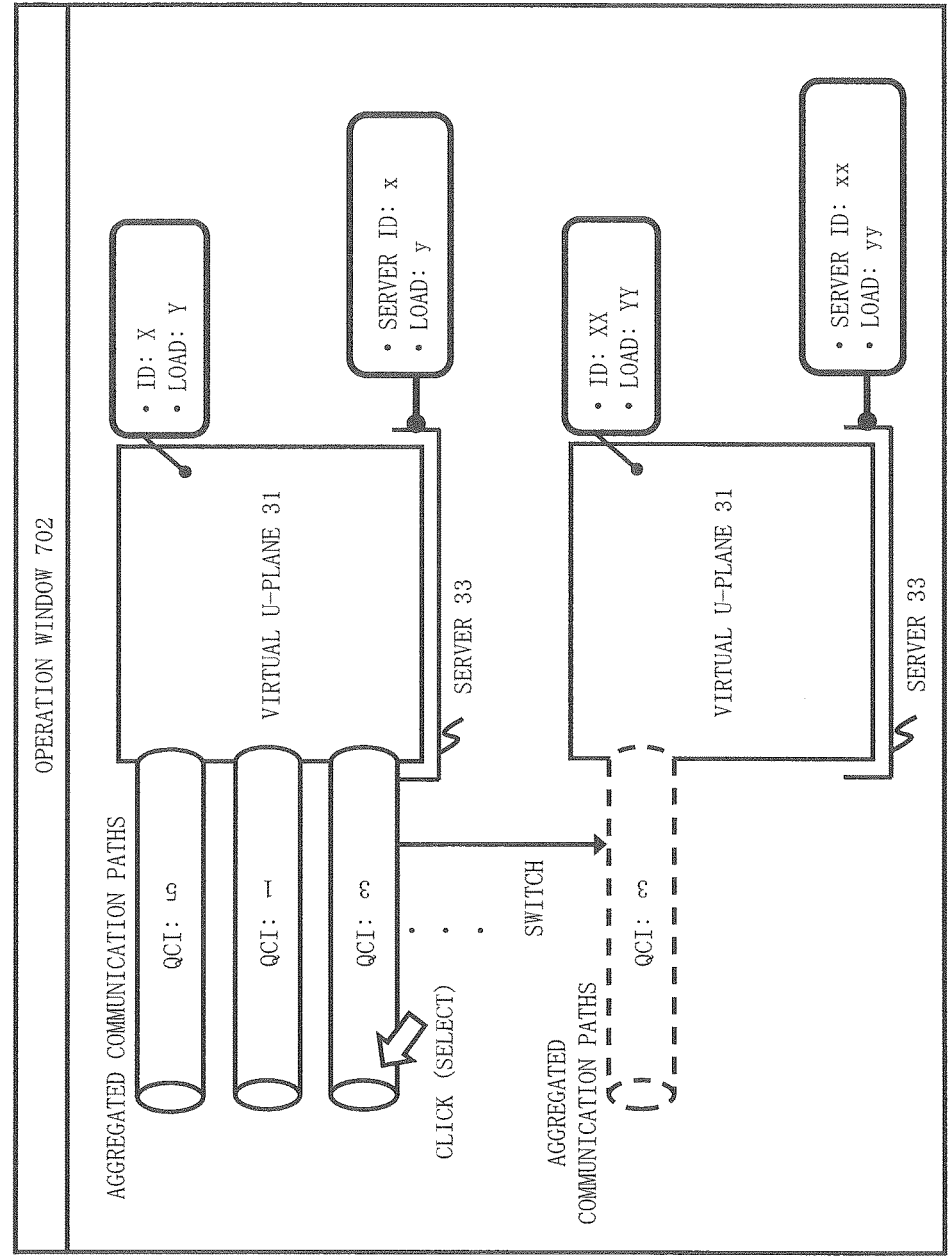
FIG. 53 is a schematic diagram showing a second example of the user interface of the management device according to the ninth exemplary embodiment of the present invention.

FIG. 53 shows an example in which an operator manages aggregated communication paths. For example, the operator selects aggregated communication paths and drags & drops the selected communication paths onto another virtual gateway 3, thereby changing an association between the aggregated communication paths and a virtual gateway 3. In response to the change of an association between the aggregated communication paths and a virtual gateway 3, the control section 63 changes the routing information DB 50 of the controller 5.

Figure 54:
FIG. 54 is a structural diagram showing a second example of the routing information DB at the management device according to the ninth exemplary embodiment of the present invention.

FIG. 54 shows an example in which the control section 63 changes the routing information DB 50. The control section 63 changes a gateway associated with a group by using a group ID (an ID corresponding to a QCI value in the example of FIG. 54) as a key. In the examples of FIGS. 53 and 54, the control section 63 changes a virtual gateway 3 associated with aggregated communication paths of QCI value "3" from a gateway of ID "X" to a gateway of ID "XX". The controller 5, in response to the change in the routing information DB 50, changes the routing information DB 42 of the communication device 4, for example, in the manner illustrated in the sixth exemplary embodiment.

As described above, the control section 63 can change a gateway associated with aggregated communication paths as a single unit by using a group ID as a key. Accordingly, the control device 63 can greatly reduce the amounts of control signals and time required to change a gateway, compared with a case where a gateway corresponding to each entry in the routing information DB 50 is changed.

Figure 55:
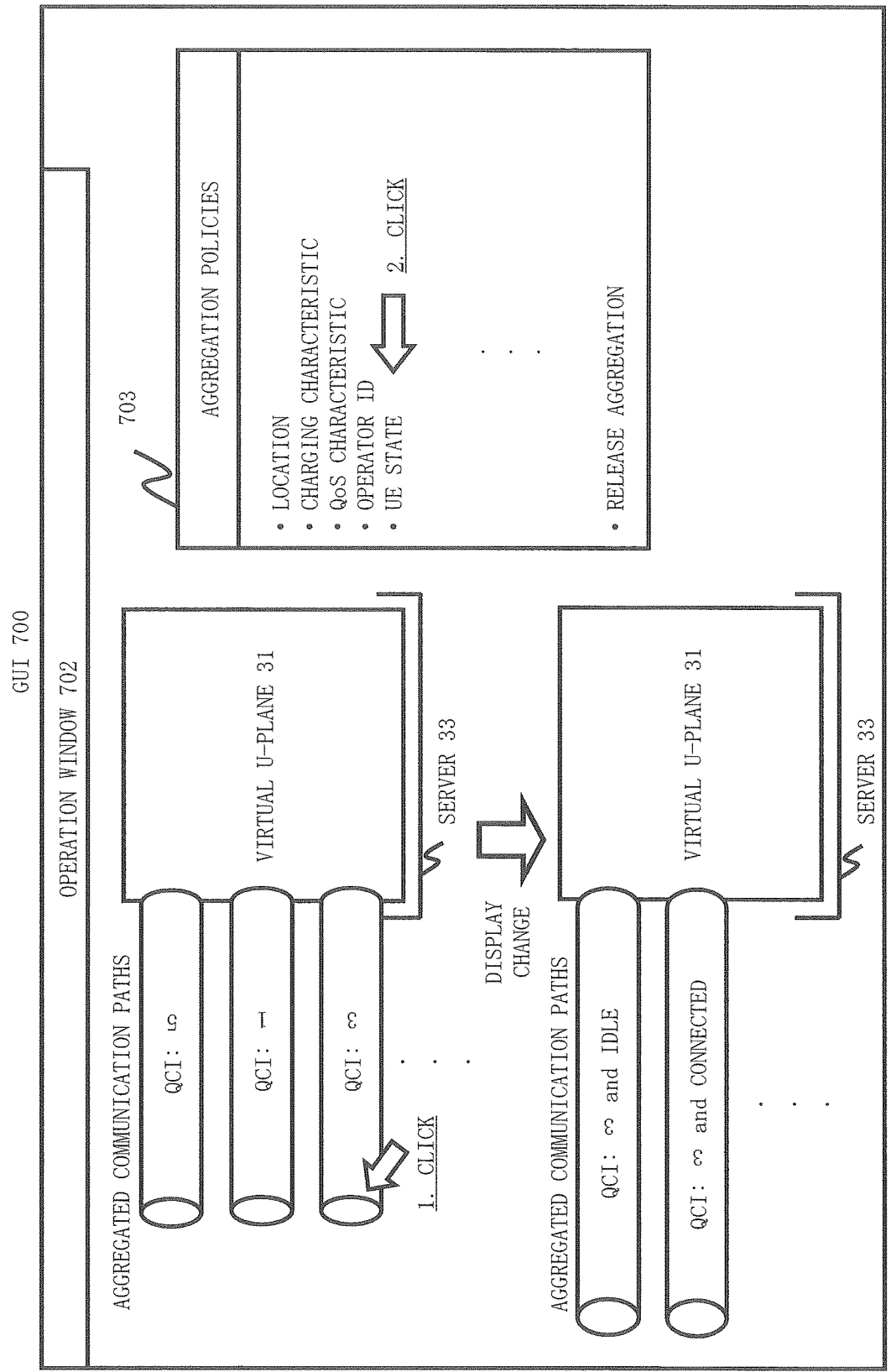
FIG. 55 is a schematic diagram showing a third example of the user interface of the management device according to the ninth exemplary embodiment of the present invention.

FIG. 55 shows an example in which the management device 6 aggregates communication paths, based on multiple aggregation policies. In the example of FIG. 55, communication paths are aggregated based on the QCIs of communication paths and the states of mobile terminals 1.

Referring to FIG. 55, an operator selects communication paths aggregated based on a QCI value ("1. CLICK") and then selects another aggregation policy ("2. CLICK"). Based on the operator's operations, the management device 6 displays the aggregated communication paths of a QCI value of "3" in such a manner that they are divided according to the states of mobile terminal 1 (IDLE state or CONNECTED state).

The control section 63 changes the routing information 50 of the controller 5, in response to the communication paths being aggregated based on the multiple aggregation policies. FIG. 56 shows an example of the routing information DB 50 based on the multiple aggregation policies. The control section 63, in response to the further addition of the aggregation policy concerning the states of mobile terminals 1 to the aggregated communication paths of a QCI value of "3" as in the example of FIG. 55, changes the routing information DB 50 as in the example of FIG. 56.

Exemplary embodiments of the present invention have been described hereinabove. However, the present invention is not limited to each of the above-described embodiments. The present invention can be implemented based on a modification of, a substitution of, and/or an adjustment to each exemplary embodiment. Moreover, the present invention can be also implemented by combining any of the exemplary embodiments. That is, the present invention incorporates the entire disclosure of this description, and any types of modifications and adjustments thereof that can be implemented based on technical ideas. Furthermore, the present invention can be also applied to the technical field of SDN (Software-Defined Network).

The present invention is applicable to communication systems in general in which communication are performed over communication paths.

The invention claimed is:

1. A communication device that performs communication over a communication path configured in a network, said communication device comprising:
   a communication interface with a control apparatus which controls the communication device;
   a first unit configured to identify the communication path to which a received packet belongs; and
   a second unit configured to forward the received packet to a virtual network node associated with the communication path to which the received packet belongs, among a plurality of virtual network nodes that include at least one control-plane node and at least one user-plane node, wherein the virtual network nodes are configured on at least one server,
   wherein the first unit and the second unit are controlled by the control apparatus notifying the communication device of an instruction such that the second unit is configured to change a route of the communication path to forward the received packet to one of the plurality of virtual network nodes based on identifier information of the communication path, and
   wherein the instruction includes a condition for identifying the communication path and the virtual network node to be a forward destination of the received packet which matches the condition.

2. The communication device according to claim 1, wherein the second unit is configured to conceal a change of the virtual network node associated with the communication path from a mobile terminal using the communication path.

3. The communication device according to claim 1, wherein the second unit is configured to forward the received packet having a common address assigned to the plurality of virtual network nodes as its destination, to the virtual network node associated with the communication path to which the received packet belongs.

4. The communication device according to claim 1, wherein the second section unit is configured to translate a destination address of the received packet to an address assigned to the virtual network node associated with the communication path to which the received packet belongs, and forward the received packet to the virtual network node.

5. The communication device according to claim 1, wherein the second unit is configured to translate a source address of the received packet received from the virtual network node to a common address assigned to the plurality of virtual network nodes, and forward the received packet.

6. The communication device according to claim 1, wherein the second unit is configured to forward the received packet to the virtual network node associated with the communication path to which the received packet belongs, among the plurality of virtual network nodes which are configured by using software.

7. The communication device according to claim 1, further comprising:
   a control unit that is configured to activate the plurality of virtual network nodes configured by using software on the communication device,
   wherein the second unit is configured to forward the received packet to the virtual network node associated with the communication path to which the received packet belongs, among the plurality of virtual network nodes.

8. The communication device according to claim 1, wherein the second unit is configured to forward the received packet based on an instruction notified from a controller which manages associations between the communication paths and the virtual network nodes.

9. The communication device according to claim 1, further comprising:
   a control unit that is configured to activate a controller for managing associations between the communication paths and the virtual network nodes on the communication device,
   wherein the second unit is configured to forward the received packet based on an instruction notified from the controller.

10. The communication device according to claim 1, further comprising:
    a control unit that is configured to activate a controller on the communication device, wherein the controller can notify an instruction for switching a route of the received packet to the second section in response to a change of the virtual network node associated with the communication path,
    wherein the second unit is configured to forward the received packet based on the instruction.

11. A control apparatus comprising:
    a communication interface with a communication device which performs communication through a communication path configured in a virtual network;
    a database which stores information on an association between the communication path and a virtual network node which can terminate the communication path; and
    a control unit that is configured to notify the communication device of an instruction for forwarding a received packet to a virtual network node associated with the communication path to which the received packet belongs among a plurality of virtual network nodes, based on the information,
    wherein a unit in each communication device is configured to forward the received packet to a virtual network node associated with the communication path to which the received packet belongs, among a plurality of virtual network nodes that include at least one control-plane node and at least one user-plane node, wherein the virtual network nodes are configured on at least one server, and
    wherein the instruction includes a condition for identifying the communication path and the virtual network node to be a forward destination of the received packet which matches the condition, by which a route for forwarding the received packet is changed based on information for identifying the communication paths associated with the plurality of virtual network nodes, respectively.

12. The control apparatus according to claim 11, wherein the control unit is configured to notify the communication device of the instruction for concealing a change of the virtual network node associated with the communication path from a mobile terminal using the communication path.

13. The control apparatus according to claim 11, wherein the control unit is configured to notify the communication device of the instruction for forwarding the received packet having a common address assigned to the plurality of virtual network nodes as its destination to the virtual network node associated with the communication path to which this received packet belongs.

14. The control apparatus according to claim 11, wherein the control unit is configured to notify the communication device of the instruction for translating a destination address of the received packet to an address assigned to the virtual network node associated with the communication path to which the received packet belongs, and forwarding the received packet to the virtual network node.

15. The control apparatus according to claim 12, wherein the control unit is configured to notify the communication device of the instruction for translating a source address of the received packet received from the virtual network node to a common address assigned to the plurality of virtual network nodes, and forwarding the received packet.

16. A communication method for performing communication over a communication path configured in a network, comprising:
    identifying the communication path to which a received packet belongs; and
    forwarding the received packet to a virtual network node associated with the communication path to which the received packet belongs, among a plurality of virtual network nodes that include at least one control-plane node and at least one user-plane node, wherein the virtual network nodes are configured on at least one server,
    wherein forwarding the received packet is performed based on information for identifying the communication paths associated with the plurality of virtual network nodes, respectively, and
    wherein an instruction for forwarding a received packet includes a condition for identifying the communication path and the virtual network node to be a forward destination of the received packet which matches the condition.

17. The communication method according to claim 16, wherein a change of the virtual network node associated with the communication path is concealed from a mobile terminal using the communication path.

18. The communication method according to claim 16, wherein the received packet having a common address assigned to the plurality of virtual network nodes as its destination is forwarded to the virtual network node associated with the communication path to which the received packet belongs.

19. The communication method according to claim 16, wherein forwarding the received packet to the virtual network node is performed after translating a destination address of the received packet to an address assigned to the virtual network node associated with the communication path to which the received packet belongs.

20. The communication method according to claim 16, further comprising:
    forwarding the received packet received from the virtual network node after translating a source address of the received packet to a common address assigned to the plurality of virtual network nodes.

* * * * *